US012647441B1

(12) United States Patent
Frenkel et al.

(10) Patent No.: US 12,647,441 B1
(45) Date of Patent: Jun. 2, 2026

(54) RANKING ENTITY IMPORTANCE VIA NETWORK MONITORING

(71) Applicant: ExtraHop Networks, Inc., Seattle, WA (US)

(72) Inventors: Lila Breina Frenkel, Seattle, WA (US); Mark Douglas Bramley, Port Orchard, WA (US); Caroline Elizabeth Caldwell, Seattle, WA (US); Swagat Dasgupta, Bothell, WA (US); Marc Adam Winners, Seattle, WA (US); Craig Michael Griffin, Pinedale, WY (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

(21) Appl. No.: 19/530,156

(22) Filed: Feb. 4, 2026

(51) Int. Cl.
    *H04L 9/40* (2022.01)
(52) U.S. Cl.
    CPC ................................. *H04L 63/1425* (2013.01)
(58) Field of Classification Search
    CPC ..................................................... H04L 63/1425
    USPC ........................................................ 709/223
    See application file for complete search history.

(56) References Cited

U.S. PATENT DOCUMENTS

| | | | |
|---|---|---|---|
| 5,027,269 A | 6/1991 | Grant et al. | |
| 5,430,727 A | 7/1995 | Callon et al. | |
| 5,541,995 A | 7/1996 | Normile et al. | |

| | | | |
|---|---|---|---|
| 5,548,646 A | 8/1996 | Aziz et al. | |
| 5,715,464 A | 2/1998 | Crump et al. | |
| 5,787,237 A | 7/1998 | Reilly | |
| 5,802,599 A | 9/1998 | Cabrera et al. | |
| 5,835,726 A | 11/1998 | Shwed et al. | |
| 5,857,188 A | 1/1999 | Douglas | |
| 5,867,661 A | 2/1999 | Bittinger et al. | |
| 5,928,363 A | 7/1999 | Ruvolo | |
| 6,040,834 A | 3/2000 | Jain et al. | |

(Continued)

FOREIGN PATENT DOCUMENTS

| | | |
|---|---|---|
| AU | 2003287262 A1 | 5/2004 |
| AU | 2003287262 A8 | 5/2004 |

(Continued)

OTHER PUBLICATIONS

Office Communication for U.S. Appl. No. 13/831,908 mailed Jan. 13, 2014, 31 Pages.

(Continued)

*Primary Examiner* — Ruolei Zong
(74) *Attorney, Agent, or Firm* — John W. Branch; Branch Partners PLLC

(57) ABSTRACT

Embodiments rank entity importance in monitored networks by analyzing network traffic to collect metrics representing relationships between entities. Network monitoring engines construct network graphs where nodes represent entities and edges represent relationships based on collected metrics. The system employs graph clustering algorithms to partition entities into logical clusters based on interaction patterns. Within each cluster, entities may be ranked by topological importance using metrics to identify primary entities that represent their clusters. Monitoring resources may be allocated preferentially to primary entities from each cluster. The topology-based ranking approach distributes monitoring resources throughout the network.

20 Claims, 14 Drawing Sheets

(56) References Cited

U.S. PATENT DOCUMENTS

| | | | |
|---|---|---|---|
| 6,058,429 A | 5/2000 | Ames et al. |
| 6,141,686 A | 10/2000 | Jackowski et al. |
| 6,263,049 B1 | 7/2001 | Kuhn |
| 6,321,338 B1 | 11/2001 | Porras et al. |
| 6,385,729 B1 | 5/2002 | Digiorgio et al. |
| 6,401,150 B1 | 6/2002 | Reilly |
| 6,405,250 B1 | 6/2002 | Lin et al. |
| 6,412,000 B1 | 6/2002 | Riddle et al. |
| 6,526,044 B1 | 2/2003 | Cookmeyer, II et al. |
| 6,560,636 B2 | 5/2003 | Cohen et al. |
| 6,597,777 B1 | 7/2003 | Ho |
| 6,636,838 B1 | 10/2003 | Perlman et al. |
| 6,704,311 B1 | 3/2004 | Chuah et al. |
| 6,704,874 B1 | 3/2004 | Porras et al. |
| 6,760,775 B1 | 7/2004 | Anerousis et al. |
| 6,765,909 B1 | 7/2004 | Sen et al. |
| 6,789,203 B1 | 9/2004 | Belissent |
| 6,789,206 B1 | 9/2004 | Wierzbicki et al. |
| 6,807,156 B1 | 10/2004 | Veres et al. |
| 6,807,565 B1 | 10/2004 | Dodrill et al. |
| 6,883,015 B1 | 4/2005 | Geen et al. |
| 6,901,517 B1 | 5/2005 | Redmore |
| 6,944,599 B1 | 9/2005 | Vogel et al. |
| 6,948,060 B1 | 9/2005 | Ramanathan |
| 6,968,554 B1 | 11/2005 | Macdonald et al. |
| 6,999,729 B2 | 2/2006 | Wandel |
| 7,042,888 B2 | 5/2006 | Berggreen et al. |
| 7,047,303 B2 | 5/2006 | Lingafelt et al. |
| 7,089,326 B2 | 8/2006 | Boucher et al. |
| RE39,360 E | 10/2006 | Aziz et al. |
| 7,133,365 B2 | 11/2006 | Klinker et al. |
| 7,143,153 B1 | 11/2006 | Black et al. |
| 7,177,930 B1 | 2/2007 | Lopresti |
| 7,181,769 B1 | 2/2007 | Keanini et al. |
| 7,193,968 B1 | 3/2007 | Kapoor et al. |
| 7,222,366 B2 | 5/2007 | Bruton, III et al. |
| 7,313,141 B2 | 12/2007 | Kan et al. |
| 7,342,897 B1 | 3/2008 | Nader et al. |
| 7,424,532 B1 | 9/2008 | Subbiah |
| 7,454,499 B2 | 11/2008 | Cantrell et al. |
| 7,457,870 B1 | 11/2008 | Lownsbrough et al. |
| 7,474,654 B2 | 1/2009 | Guru |
| 7,480,292 B2 | 1/2009 | Busi et al. |
| 7,509,680 B1 | 3/2009 | Sallam |
| 7,535,906 B2 | 5/2009 | Engbersen et al. |
| 7,543,146 B1 | 6/2009 | Karandikar et al. |
| 7,545,499 B2 | 6/2009 | Overbeck et al. |
| 7,554,983 B1 | 6/2009 | Muppala |
| 7,561,517 B2 | 7/2009 | Klinker et al. |
| 7,580,356 B1 | 8/2009 | Mishra et al. |
| 7,594,273 B2 | 9/2009 | Keanini et al. |
| 7,602,731 B2 | 10/2009 | Jain |
| 7,606,706 B1 | 10/2009 | Rubin et al. |
| 7,609,630 B2 | 10/2009 | Gobeil |
| 7,619,988 B2 | 11/2009 | Shimada et al. |
| 7,620,986 B1 | 11/2009 | Jagannathan et al. |
| 7,636,305 B1 | 12/2009 | Taylor et al. |
| 7,639,613 B1 | 12/2009 | Ghannadian et al. |
| 7,644,150 B1 | 1/2010 | Nucci et al. |
| 7,660,883 B2 | 2/2010 | Fowlow |
| 7,724,905 B2 | 5/2010 | Bleumer et al. |
| 7,739,497 B1 | 6/2010 | Fink et al. |
| 7,774,456 B1 | 8/2010 | Lownsbrough et al. |
| 7,809,829 B2 | 10/2010 | Kelly et al. |
| 7,810,151 B1 | 10/2010 | Guruswamy |
| 7,817,549 B1 | 10/2010 | Kasralikar et al. |
| 7,849,502 B1 | 12/2010 | Bloch et al. |
| 7,864,764 B1 | 1/2011 | Ma et al. |
| 7,916,652 B1 | 3/2011 | Lima et al. |
| 7,917,647 B2 | 3/2011 | Cooper et al. |
| 7,936,682 B2 | 5/2011 | Singh et al. |
| 7,937,755 B1 | 5/2011 | Guruswamy |
| 7,944,822 B1 | 5/2011 | Nucci et al. |
| 7,975,139 B2 | 7/2011 | Coulier |
| 7,979,555 B2 | 7/2011 | Rothstein et al. |
| 7,979,694 B2 | 7/2011 | Touitou et al. |
| 8,040,798 B2 | 10/2011 | Chandra et al. |
| 8,079,083 B1 | 12/2011 | Bennett et al. |
| 8,102,783 B1 | 1/2012 | Narayanaswamy et al. |
| 8,107,397 B1 | 1/2012 | Bagchi et al. |
| 8,125,908 B2 | 2/2012 | Rothstein et al. |
| 8,145,633 B1 | 3/2012 | Manolis et al. |
| 8,185,953 B2 | 5/2012 | Rothstein et al. |
| 8,194,542 B2 | 6/2012 | Vaeaenaenen et al. |
| 8,332,765 B2 | 12/2012 | Ergan et al. |
| 8,352,725 B1 | 1/2013 | O'toole, Jr. |
| 8,402,540 B2 | 3/2013 | Kapoor et al. |
| 8,411,677 B1 | 4/2013 | Colloff |
| 8,418,249 B1 | 4/2013 | Nucci et al. |
| 8,443,190 B2 | 5/2013 | Breton et al. |
| 8,457,127 B2 | 6/2013 | Eastham et al. |
| 8,494,985 B1 | 7/2013 | Keralapura et al. |
| 8,504,456 B2 | 8/2013 | Griffin et al. |
| 8,533,254 B1 | 9/2013 | Whitson, Jr. et al. |
| 8,555,383 B1 | 10/2013 | Marshall et al. |
| 8,561,177 B1 | 10/2013 | Aziz et al. |
| 8,577,817 B1 | 11/2013 | Keralapura et al. |
| 8,578,024 B1 | 11/2013 | Keralapura et al. |
| 8,601,531 B1 | 12/2013 | Zolfonoon et al. |
| 8,613,089 B1 | 12/2013 | Holloway et al. |
| 8,619,579 B1 | 12/2013 | Rothstein et al. |
| 8,621,615 B2 | 12/2013 | Zhao |
| 8,626,912 B1 | 1/2014 | Rothstein et al. |
| 8,627,422 B2 | 1/2014 | Hawkes et al. |
| 8,635,441 B2 | 1/2014 | Frenkel et al. |
| 8,667,151 B2 | 3/2014 | Mizikovsky et al. |
| 8,699,357 B2 | 4/2014 | Deshpande et al. |
| 8,707,440 B2 | 4/2014 | Gula et al. |
| 8,744,894 B2 | 6/2014 | Christiansen et al. |
| 8,782,393 B1 | 7/2014 | Rothstein et al. |
| 8,817,655 B2 | 8/2014 | Szabo et al. |
| 8,843,627 B1 | 9/2014 | Baldi et al. |
| 8,848,744 B1 | 9/2014 | Rothstein et al. |
| 8,861,397 B2 | 10/2014 | Kind et al. |
| 8,867,343 B2 | 10/2014 | Rothstein et al. |
| 8,959,643 B1 | 2/2015 | Invernizzi et al. |
| 8,964,548 B1 | 2/2015 | Keralapura et al. |
| 8,971,196 B2 | 3/2015 | Degioanni et al. |
| 9,003,065 B2 | 4/2015 | Rothstein et al. |
| 9,026,467 B2 | 5/2015 | Bammi et al. |
| 9,036,493 B2 | 5/2015 | Degioanni et al. |
| 9,038,178 B1 | 5/2015 | Lin |
| 9,049,216 B2 | 6/2015 | Mccanne et al. |
| 9,054,952 B2 | 6/2015 | Rothstein et al. |
| 9,083,740 B1 | 7/2015 | Ma et al. |
| 9,094,288 B1 | 7/2015 | Nucci et al. |
| 9,094,326 B2 | 7/2015 | Sundararajan et al. |
| 9,152,808 B1 | 10/2015 | Ramalingam et al. |
| 9,158,604 B1 | 10/2015 | Christodorescu et al. |
| 9,166,994 B2 | 10/2015 | Ward et al. |
| 9,176,838 B2 | 11/2015 | Li et al. |
| 9,183,573 B2 | 11/2015 | Tseng |
| 9,189,318 B2 | 11/2015 | Li et al. |
| 9,191,288 B2 | 11/2015 | Rothstein et al. |
| 9,191,400 B1 | 11/2015 | Ptasinski et al. |
| 9,203,865 B2 | 12/2015 | Linden et al. |
| 9,210,135 B2 | 12/2015 | Rothstein et al. |
| 9,264,288 B1 | 2/2016 | Arora et al. |
| 9,300,554 B1 | 3/2016 | Kosai et al. |
| 9,306,818 B2 | 4/2016 | Aumann et al. |
| 9,323,426 B2 | 4/2016 | Yang |
| 9,338,147 B1 | 5/2016 | Rothstein et al. |
| 9,357,410 B2 | 5/2016 | Nedeltchev et al. |
| 9,367,687 B1 | 6/2016 | Warshenbrot |
| 9,369,479 B2 | 6/2016 | Lin |
| 9,378,361 B1 | 6/2016 | Yen et al. |
| 9,380,489 B2 | 6/2016 | Kotecha et al. |
| 9,391,866 B1 | 7/2016 | Martin et al. |
| 9,400,871 B1 | 7/2016 | Hewinson |
| 9,401,925 B1 | 7/2016 | Guo et al. |
| 9,426,036 B1 | 8/2016 | Roy |
| 9,430,646 B1 | 8/2016 | Mushtaq et al. |
| 9,432,430 B1 | 8/2016 | Klenz |
| 9,460,299 B2 | 10/2016 | Weiss et al. |

(56) References Cited

U.S. PATENT DOCUMENTS

| | | | |
|---|---|---|---|
| 9,461,875 | B2 | 10/2016 | Groat et al. |
| 9,479,405 | B1 | 10/2016 | Tongaonkar et al. |
| 9,483,742 | B1 | 11/2016 | Ahmed |
| 9,516,053 | B1 | 12/2016 | Muddu et al. |
| 9,531,736 | B1 | 12/2016 | Torres et al. |
| 9,565,202 | B1 | 2/2017 | Kindlund et al. |
| 9,565,203 | B2 | 2/2017 | Bernstein et al. |
| 9,584,381 | B1 | 2/2017 | Leone |
| 9,591,015 | B1 | 3/2017 | Amin et al. |
| 9,621,443 | B2 | 4/2017 | Kosai et al. |
| 9,621,523 | B2 | 4/2017 | Rothstein et al. |
| 9,654,485 | B1 | 5/2017 | Neumann |
| 9,654,503 | B1 | 5/2017 | Kowalyshyn |
| 9,660,879 | B1 | 5/2017 | Rothstein et al. |
| 9,692,658 | B2 | 6/2017 | Guo et al. |
| 9,705,895 | B1 | 7/2017 | Gutzmann |
| 9,715,820 | B1 | 7/2017 | Boss et al. |
| 9,729,416 | B1 | 8/2017 | Khanal et al. |
| 9,756,061 | B1 | 9/2017 | Roeh et al. |
| 9,813,311 | B1 | 11/2017 | Leone |
| 9,860,209 | B2 | 1/2018 | Buchanan et al. |
| 9,876,810 | B2 | 1/2018 | Mcdougal et al. |
| 9,888,021 | B2 | 2/2018 | Horesh et al. |
| 9,893,897 | B2 | 2/2018 | Li et al. |
| 9,967,292 | B1 | 5/2018 | Higgins et al. |
| 10,009,364 | B2 | 6/2018 | Dasgupta et al. |
| 10,009,793 | B2 | 6/2018 | Wetterwald et al. |
| 10,027,689 | B1 | 7/2018 | Rathor et al. |
| 10,028,167 | B2 | 7/2018 | Calin et al. |
| 10,033,766 | B2 | 7/2018 | Gupta et al. |
| 10,037,546 | B1 | 7/2018 | Benisch et al. |
| 10,038,611 | B1 | 7/2018 | Wu et al. |
| 10,050,982 | B1 | 8/2018 | Guerra et al. |
| 10,063,434 | B1 | 8/2018 | Khanal et al. |
| 10,116,679 | B1 | 10/2018 | Wu et al. |
| 10,122,748 | B1 | 11/2018 | Currie |
| 10,148,677 | B2 | 12/2018 | Muddu et al. |
| 10,176,323 | B2 | 1/2019 | Zhang et al. |
| 10,198,667 | B2 | 2/2019 | Ryan, Jr. et al. |
| 10,204,211 | B2 | 2/2019 | Hammerle et al. |
| 10,237,294 | B1 | 3/2019 | Zadeh et al. |
| 10,243,978 | B2 | 3/2019 | Roeh et al. |
| 10,263,863 | B2 | 4/2019 | Mukerji et al. |
| 10,263,883 | B2 | 4/2019 | Kamble |
| 10,264,003 | B1 | 4/2019 | Wu et al. |
| 10,270,794 | B1 | 4/2019 | Mukerji et al. |
| 10,277,618 | B1 | 4/2019 | Wu et al. |
| 10,291,637 | B1 | 5/2019 | Bardenstein |
| 10,305,928 | B2 | 5/2019 | Mcgrew et al. |
| 10,320,749 | B2 | 6/2019 | Sengupta et al. |
| 10,321,344 | B2 | 6/2019 | Barton et al. |
| 10,326,676 | B1 | 6/2019 | Driggs et al. |
| 10,326,741 | B2 | 6/2019 | Rothstein et al. |
| 10,332,005 | B1 | 6/2019 | Liao et al. |
| 10,341,206 | B1 | 7/2019 | Hammerle et al. |
| 10,348,767 | B1 | 7/2019 | Lee et al. |
| 10,375,155 | B1 | 8/2019 | Cai et al. |
| 10,380,498 | B1 | 8/2019 | Chaoji et al. |
| 10,382,296 | B2 | 8/2019 | Khanal et al. |
| 10,382,303 | B2 | 8/2019 | Khanal et al. |
| 10,382,401 | B1 | 8/2019 | Lee et al. |
| 10,389,574 | B1 | 8/2019 | Wu et al. |
| 10,389,611 | B2 | 8/2019 | Szabo et al. |
| 10,411,978 | B1 | 9/2019 | Ball et al. |
| 10,411,982 | B1 | 9/2019 | Driggs et al. |
| 10,412,080 | B1 | 9/2019 | Edwards et al. |
| 10,419,454 | B2 | 9/2019 | El-Moussa et al. |
| 10,476,673 | B2 | 11/2019 | Higgins et al. |
| 10,484,334 | B1 | 11/2019 | Lee et al. |
| 10,511,499 | B2 | 12/2019 | Mukerji et al. |
| 10,536,268 | B2 | 1/2020 | Anderson et al. |
| 10,536,475 | B1 | 1/2020 | Mccorkle, Jr. et al. |
| 10,554,665 | B1 | 2/2020 | Badawy et al. |
| 10,581,915 | B2 | 3/2020 | Scherman et al. |
| 10,587,638 | B2 | 3/2020 | Mukerji et al. |
| 10,594,664 | B2 | 3/2020 | Zaifman et al. |
| 10,594,709 | B2 | 3/2020 | Wu et al. |
| 10,594,718 | B1 | 3/2020 | Deaguero et al. |
| 10,616,084 | B2 | 4/2020 | Hammerle et al. |
| 10,673,870 | B2 | 6/2020 | Pierce |
| 10,728,126 | B2 | 7/2020 | Wu et al. |
| 10,742,530 | B1 | 8/2020 | Wu et al. |
| 10,742,677 | B1 | 8/2020 | Wu et al. |
| 10,778,700 | B2 | 9/2020 | Azvine et al. |
| 10,783,262 | B2 | 9/2020 | Goyal et al. |
| 10,805,338 | B2 | 10/2020 | Kohout et al. |
| 10,841,194 | B2 | 11/2020 | Kim et al. |
| 10,944,769 | B2 | 3/2021 | Singh |
| 10,965,546 | B2 | 3/2021 | Pignataro et al. |
| 10,965,702 | B2 | 3/2021 | Higgins et al. |
| 10,979,282 | B2 | 4/2021 | Wu et al. |
| 10,979,446 | B1 | 4/2021 | Stevens et al. |
| 10,984,122 | B2 | 4/2021 | Thomas |
| 10,992,693 | B2 | 4/2021 | Luo et al. |
| 11,012,329 | B2 | 5/2021 | Ball et al. |
| 11,055,300 | B2 | 7/2021 | Zhang et al. |
| 11,057,420 | B2 | 7/2021 | Mcgrew et al. |
| 11,093,518 | B1 | 8/2021 | Lu et al. |
| 11,106,442 | B1 | 8/2021 | Hsiao et al. |
| 11,157,446 | B1 | 10/2021 | Kuruvada et al. |
| 11,159,549 | B2 | 10/2021 | El-Moussa et al. |
| 11,165,814 | B2 | 11/2021 | Lee et al. |
| 11,165,823 | B2 | 11/2021 | Wu et al. |
| 11,165,831 | B2 | 11/2021 | Higgins et al. |
| 11,188,550 | B2 | 11/2021 | Haggie et al. |
| 11,194,901 | B2 | 12/2021 | El-Moussa et al. |
| 11,200,246 | B2 | 12/2021 | Kharisma et al. |
| 11,201,876 | B2 | 12/2021 | Kallos et al. |
| 11,232,298 | B1 | 1/2022 | Abraham et al. |
| 11,296,967 | B1 | 4/2022 | Rothstein et al. |
| 11,310,256 | B2 | 4/2022 | Higgins et al. |
| 11,323,467 | B2 | 5/2022 | Deaguero et al. |
| 11,349,861 | B1 | 5/2022 | Costlow et al. |
| 11,388,072 | B2 | 7/2022 | Wu et al. |
| 11,431,744 | B2 | 8/2022 | Mukerji et al. |
| 11,438,247 | B2 | 9/2022 | Wu et al. |
| 11,463,299 | B2 | 10/2022 | Wu et al. |
| 11,463,465 | B2 | 10/2022 | Wu et al. |
| 11,463,466 | B2 | 10/2022 | Higgins et al. |
| 11,496,378 | B2 | 11/2022 | Ball et al. |
| 11,546,153 | B2 | 1/2023 | Higgins et al. |
| 11,558,413 | B2 | 1/2023 | Higgins et al. |
| 11,652,714 | B2 | 5/2023 | Wu et al. |
| 11,665,207 | B2 | 5/2023 | Higgins et al. |
| 11,706,233 | B2 | 7/2023 | Higgins et al. |
| 11,843,606 | B2 | 12/2023 | Wu et al. |
| 11,916,771 | B2 | 2/2024 | Rothstein et al. |
| 11,985,142 | B2 | 5/2024 | Lawson |
| 12,088,599 | B1 | 9/2024 | McCarson |
| 12,107,888 | B2 | 10/2024 | Wu et al. |
| 12,225,030 | B2 | 2/2025 | Costlow et al. |
| 12,309,192 | B2 | 5/2025 | Lee et al. |
| 12,355,816 | B2 | 7/2025 | Wu et al. |
| 12,483,384 | B1 | 11/2025 | Rongo et al. |
| 2001/0054157 | A1 | 12/2001 | Fukumoto |
| 2002/0023080 | A1 | 2/2002 | Uga et al. |
| 2002/0024964 | A1 | 2/2002 | Baum et al. |
| 2002/0035604 | A1 | 3/2002 | Cohen et al. |
| 2002/0055998 | A1 | 5/2002 | Riddle et al. |
| 2002/0059517 | A1 | 5/2002 | Haviv et al. |
| 2002/0065912 | A1 | 5/2002 | Catchpole et al. |
| 2002/0078382 | A1 | 6/2002 | Sheikh et al. |
| 2002/0080720 | A1 | 6/2002 | Pegrum et al. |
| 2002/0091844 | A1 | 7/2002 | Craft et al. |
| 2002/0097724 | A1 | 7/2002 | Halme et al. |
| 2002/0107953 | A1 | 8/2002 | Ontiveros et al. |
| 2002/0133586 | A1 | 9/2002 | Shanklin et al. |
| 2002/0133622 | A1 | 9/2002 | Pinto |
| 2002/0152209 | A1 | 10/2002 | Merugu et al. |
| 2002/0156880 | A1 | 10/2002 | Mokuya |
| 2002/0175934 | A1 | 11/2002 | Hand et al. |
| 2002/0178360 | A1 | 11/2002 | Wenocur et al. |
| 2002/0184362 | A1 | 12/2002 | Banerjee et al. |
| 2002/0194483 | A1 | 12/2002 | Wenocur et al. |

(56) References Cited

U.S. PATENT DOCUMENTS

| | | |
|---|---|---|
| 2002/0194501 A1 | 12/2002 | Wenocur et al. |
| 2002/0199096 A1 | 12/2002 | Wenocur et al. |
| 2002/0199098 A1 | 12/2002 | Davis |
| 2003/0014628 A1 | 1/2003 | Freed et al. |
| 2003/0018891 A1 | 1/2003 | Hall et al. |
| 2003/0023733 A1 | 1/2003 | Lingafelt et al. |
| 2003/0084279 A1 | 5/2003 | Campagna |
| 2003/0093514 A1 | 5/2003 | Valdes et al. |
| 2003/0131116 A1 | 7/2003 | Jain et al. |
| 2003/0133443 A1 | 7/2003 | Klinker et al. |
| 2003/0135667 A1 | 7/2003 | Mann et al. |
| 2003/0145225 A1 | 7/2003 | Bruton, III et al. |
| 2003/0149887 A1 | 8/2003 | Yadav |
| 2003/0152094 A1 | 8/2003 | Colavito et al. |
| 2003/0156715 A1 | 8/2003 | Reeds et al. |
| 2003/0188189 A1 | 10/2003 | Desai et al. |
| 2003/0204621 A1 | 10/2003 | Poletto et al. |
| 2003/0212900 A1 | 11/2003 | Liu et al. |
| 2003/0214913 A1 | 11/2003 | Kan et al. |
| 2003/0217144 A1 | 11/2003 | Fu et al. |
| 2003/0233361 A1 | 12/2003 | Cady |
| 2004/0003094 A1 | 1/2004 | See |
| 2004/0010714 A1 | 1/2004 | Stewart |
| 2004/0010718 A1 | 1/2004 | Porras et al. |
| 2004/0047325 A1 | 3/2004 | Hameleers et al. |
| 2004/0049699 A1 | 3/2004 | Griffith et al. |
| 2004/0073512 A1 | 4/2004 | Maung |
| 2004/0088544 A1 | 5/2004 | Tariq et al. |
| 2004/0088557 A1 | 5/2004 | Malcolm et al. |
| 2004/0093414 A1 | 5/2004 | Orton |
| 2004/0093513 A1 | 5/2004 | Cantrell et al. |
| 2004/0146006 A1 | 7/2004 | Jackson |
| 2004/0162070 A1 | 8/2004 | Baral et al. |
| 2004/0199630 A1 | 10/2004 | Sarkissian et al. |
| 2004/0250059 A1 | 12/2004 | Ramelson et al. |
| 2005/0015455 A1 | 1/2005 | Liu |
| 2005/0015622 A1 | 1/2005 | Williams et al. |
| 2005/0044406 A1 | 2/2005 | Stute |
| 2005/0050316 A1 | 3/2005 | Peles |
| 2005/0055578 A1 | 3/2005 | Wright et al. |
| 2005/0060427 A1 | 3/2005 | Phillips et al. |
| 2005/0066196 A1 | 3/2005 | Yagi |
| 2005/0086255 A1 | 4/2005 | Schran et al. |
| 2005/0091341 A1 | 4/2005 | Knight et al. |
| 2005/0091357 A1 | 4/2005 | Krantz et al. |
| 2005/0100000 A1 | 5/2005 | Faulkner et al. |
| 2005/0111367 A1 | 5/2005 | Jonathan Chao et al. |
| 2005/0120105 A1* | 6/2005 | Popescu ............... H04L 69/329 709/230 |
| 2005/0125553 A1 | 6/2005 | Wu et al. |
| 2005/0125684 A1 | 6/2005 | Schmidt |
| 2005/0182833 A1 | 8/2005 | Duffie, III et al. |
| 2005/0193245 A1 | 9/2005 | Hayden et al. |
| 2005/0201363 A1 | 9/2005 | Gilchrist et al. |
| 2005/0207413 A1 | 9/2005 | Lerner |
| 2005/0210242 A1 | 9/2005 | Troxel et al. |
| 2005/0234920 A1 | 10/2005 | Rhodes |
| 2005/0249125 A1 | 11/2005 | Yoon et al. |
| 2005/0251009 A1 | 11/2005 | Morita et al. |
| 2005/0262237 A1 | 11/2005 | Fulton et al. |
| 2005/0270975 A1 | 12/2005 | Meylan et al. |
| 2005/0271072 A1 | 12/2005 | Anderson et al. |
| 2006/0029096 A1 | 2/2006 | Babbar et al. |
| 2006/0045016 A1 | 3/2006 | Dawdy et al. |
| 2006/0045017 A1 | 3/2006 | Yamasaki |
| 2006/0075358 A1 | 4/2006 | Ahokas |
| 2006/0085379 A1 | 4/2006 | Heidloff et al. |
| 2006/0085526 A1 | 4/2006 | Gulland |
| 2006/0101068 A1 | 5/2006 | Stuhec et al. |
| 2006/0106743 A1 | 5/2006 | Horvitz |
| 2006/0114832 A1 | 6/2006 | Hamilton et al. |
| 2006/0123477 A1 | 6/2006 | Raghavan et al. |
| 2006/0171333 A1 | 8/2006 | Shimada et al. |
| 2006/0174343 A1 | 8/2006 | Duthie et al. |
| 2006/0184535 A1 | 8/2006 | Kaluskar et al. |
| 2006/0188494 A1 | 8/2006 | Bach et al. |
| 2006/0191008 A1 | 8/2006 | Fernando et al. |
| 2006/0191009 A1 | 8/2006 | Ito et al. |
| 2006/0200572 A1 | 9/2006 | Schcolnik |
| 2006/0230452 A1 | 10/2006 | Field |
| 2006/0230456 A1 | 10/2006 | Nagabhushan et al. |
| 2006/0233349 A1 | 10/2006 | Cooper |
| 2006/0248407 A1 | 11/2006 | Adams et al. |
| 2007/0039051 A1 | 2/2007 | Duthie et al. |
| 2007/0043861 A1 | 2/2007 | Baron et al. |
| 2007/0067841 A1 | 3/2007 | Yegneswaran et al. |
| 2007/0077931 A1 | 4/2007 | Glinka |
| 2007/0088845 A1 | 4/2007 | Memon et al. |
| 2007/0110053 A1 | 5/2007 | Soni et al. |
| 2007/0143852 A1 | 6/2007 | Keanini et al. |
| 2007/0153689 A1 | 7/2007 | Strub et al. |
| 2007/0156886 A1 | 7/2007 | Srivastava |
| 2007/0156919 A1 | 7/2007 | Potti et al. |
| 2007/0157306 A1 | 7/2007 | Elrod et al. |
| 2007/0169190 A1 | 7/2007 | Kolton et al. |
| 2007/0188494 A1 | 8/2007 | Agutter et al. |
| 2007/0192863 A1 | 8/2007 | Kapoor et al. |
| 2007/0211625 A1 | 9/2007 | Liu et al. |
| 2007/0239639 A1 | 10/2007 | Loughmiller et al. |
| 2007/0245420 A1 | 10/2007 | Yong et al. |
| 2007/0256122 A1 | 11/2007 | Foo et al. |
| 2007/0271592 A1 | 11/2007 | Noda et al. |
| 2008/0019275 A1 | 1/2008 | Mudireddy et al. |
| 2008/0022401 A1 | 1/2008 | Cameron et al. |
| 2008/0031141 A1 | 2/2008 | Lean et al. |
| 2008/0034424 A1 | 2/2008 | Overcash et al. |
| 2008/0034425 A1 | 2/2008 | Overcash et al. |
| 2008/0059582 A1 | 3/2008 | Hartikainen et al. |
| 2008/0062995 A1 | 3/2008 | Kaas et al. |
| 2008/0069002 A1 | 3/2008 | Savoor et al. |
| 2008/0103610 A1 | 5/2008 | Ebrom et al. |
| 2008/0130645 A1 | 6/2008 | Deshpande et al. |
| 2008/0130659 A1 | 6/2008 | Polland |
| 2008/0133517 A1 | 6/2008 | Kapoor et al. |
| 2008/0133518 A1 | 6/2008 | Kapoor et al. |
| 2008/0134330 A1 | 6/2008 | Kapoor et al. |
| 2008/0141275 A1 | 6/2008 | Borgendale et al. |
| 2008/0141374 A1 | 6/2008 | Sidiroglou et al. |
| 2008/0147818 A1 | 6/2008 | Sabo |
| 2008/0162390 A1 | 7/2008 | Kapoor et al. |
| 2008/0172416 A1 | 7/2008 | Ito |
| 2008/0174343 A1 | 7/2008 | Cha et al. |
| 2008/0209045 A1 | 8/2008 | Rothstein et al. |
| 2008/0212586 A1 | 9/2008 | Wang et al. |
| 2008/0219261 A1 | 9/2008 | Lin et al. |
| 2008/0222717 A1 | 9/2008 | Rothstein et al. |
| 2008/0225740 A1 | 9/2008 | Martin et al. |
| 2008/0232359 A1 | 9/2008 | Kim et al. |
| 2008/0279111 A1 | 11/2008 | Atkins et al. |
| 2008/0282080 A1 | 11/2008 | Hyndman et al. |
| 2008/0294384 A1 | 11/2008 | Fok et al. |
| 2008/0307219 A1 | 12/2008 | Karandikar |
| 2008/0320297 A1 | 12/2008 | Sabo et al. |
| 2009/0010259 A1 | 1/2009 | Sirotkin |
| 2009/0034426 A1 | 2/2009 | Luft et al. |
| 2009/0063665 A1 | 3/2009 | Bagepalli et al. |
| 2009/0089326 A1 | 4/2009 | Balasubramanian |
| 2009/0109973 A1 | 4/2009 | Ilnicki |
| 2009/0141634 A1 | 6/2009 | Rothstein et al. |
| 2009/0168657 A1 | 7/2009 | Puri et al. |
| 2009/0187653 A1 | 7/2009 | Fu et al. |
| 2009/0204723 A1 | 8/2009 | Tonsing et al. |
| 2009/0220080 A1 | 9/2009 | Herne et al. |
| 2009/0225675 A1 | 9/2009 | Baum et al. |
| 2009/0228330 A1 | 9/2009 | Karras et al. |
| 2009/0245083 A1 | 10/2009 | Hamzeh |
| 2009/0265344 A1 | 10/2009 | Etoh et al. |
| 2009/0268605 A1 | 10/2009 | Campbell et al. |
| 2009/0271469 A1 | 10/2009 | Benco et al. |
| 2009/0271511 A1 | 10/2009 | Peracha |
| 2009/0292954 A1 | 11/2009 | Jiang et al. |
| 2009/0296593 A1 | 12/2009 | Prescott |
| 2009/0316602 A1 | 12/2009 | Nandy et al. |
| 2009/0319773 A1 | 12/2009 | Frenkel et al. |

(56)  References Cited

U.S. PATENT DOCUMENTS

| | | |
|---|---|---|
| 2009/0320138 A1 | 12/2009 | Keanini et al. |
| 2009/0327695 A1 | 12/2009 | Molsberry et al. |
| 2009/0328219 A1 | 12/2009 | Narayanaswamy |
| 2010/0027432 A1 | 2/2010 | Gopalan et al. |
| 2010/0088670 A1 | 4/2010 | Paster |
| 2010/0091770 A1 | 4/2010 | Ishikawa |
| 2010/0095367 A1 | 4/2010 | Narayanaswamy |
| 2010/0131755 A1 | 5/2010 | Zhu et al. |
| 2010/0135498 A1 | 6/2010 | Long et al. |
| 2010/0167713 A1 | 7/2010 | Hoffman |
| 2010/0191856 A1 | 7/2010 | Gupta et al. |
| 2010/0192225 A1 | 7/2010 | Ma et al. |
| 2010/0201573 A1 | 8/2010 | Lamming |
| 2010/0226301 A1 | 9/2010 | Lohmar et al. |
| 2010/0235481 A1 | 9/2010 | Deutsch et al. |
| 2010/0250918 A1 | 9/2010 | Tremblay et al. |
| 2010/0250928 A1 | 9/2010 | Goto |
| 2010/0268937 A1 | 10/2010 | Blom et al. |
| 2010/0278056 A1 | 11/2010 | Meloche et al. |
| 2010/0281539 A1 | 11/2010 | Burns et al. |
| 2010/0299158 A1 | 11/2010 | Siegel |
| 2010/0316216 A1 | 12/2010 | Fukushima et al. |
| 2010/0322248 A1 | 12/2010 | Ivanov |
| 2010/0332618 A1 | 12/2010 | Norton et al. |
| 2011/0019574 A1 | 1/2011 | Malomsoky et al. |
| 2011/0055138 A1 | 3/2011 | Khanduja et al. |
| 2011/0073490 A1 | 3/2011 | Hayamizu et al. |
| 2011/0098973 A1 | 4/2011 | Seidman |
| 2011/0122792 A1 | 5/2011 | Duffield et al. |
| 2011/0126259 A1 | 5/2011 | Krishnamurthi et al. |
| 2011/0126275 A1 | 5/2011 | Anderson et al. |
| 2011/0141913 A1 | 6/2011 | Clemens et al. |
| 2011/0150220 A1 | 6/2011 | Breton et al. |
| 2011/0173441 A1 | 7/2011 | Bagepalli et al. |
| 2011/0173490 A1 | 7/2011 | Narayanaswamy et al. |
| 2011/0197276 A1 | 8/2011 | Dorrendorf et al. |
| 2011/0231652 A1 | 9/2011 | Bollay et al. |
| 2011/0231935 A1 | 9/2011 | Gula et al. |
| 2011/0280149 A1 | 11/2011 | Okada et al. |
| 2011/0296002 A1 | 12/2011 | Caram |
| 2011/0320394 A1 | 12/2011 | Mckeown et al. |
| 2011/0321160 A1 | 12/2011 | Mohandas et al. |
| 2012/0016977 A1 | 1/2012 | Robertson et al. |
| 2012/0030731 A1 | 2/2012 | Bhargava et al. |
| 2012/0084838 A1 | 4/2012 | Inforzato et al. |
| 2012/0130745 A1 | 5/2012 | Jones |
| 2012/0131330 A1 | 5/2012 | Toensing et al. |
| 2012/0159267 A1 | 6/2012 | Gyorffy |
| 2012/0166962 A1 | 6/2012 | Lunsford |
| 2012/0176917 A1 | 7/2012 | Matityahu et al. |
| 2012/0210385 A1 | 8/2012 | Cirstea et al. |
| 2012/0215328 A1 | 8/2012 | Schmelzer |
| 2012/0216282 A1 | 8/2012 | Pappu et al. |
| 2012/0233311 A1 | 9/2012 | Parker et al. |
| 2012/0233694 A1 | 9/2012 | Baliga et al. |
| 2012/0243533 A1 | 9/2012 | Leong |
| 2012/0266209 A1 | 10/2012 | Gooding et al. |
| 2012/0278261 A1* | 11/2012 | Lin .......................... G06N 5/01 |
| | | 707/690 |
| 2012/0278477 A1 | 11/2012 | Terrell et al. |
| 2012/0278625 A1 | 11/2012 | Narayanan et al. |
| 2012/0278890 A1 | 11/2012 | Maeaettae et al. |
| 2012/0284791 A1 | 11/2012 | Miller et al. |
| 2012/0290711 A1 | 11/2012 | Upham et al. |
| 2012/0294305 A1 | 11/2012 | Rose et al. |
| 2012/0324585 A1 | 12/2012 | Beckett, III et al. |
| 2013/0007296 A1 | 1/2013 | Mukherjee et al. |
| 2013/0010600 A1 | 1/2013 | Jocha et al. |
| 2013/0010608 A1 | 1/2013 | Ramachandran et al. |
| 2013/0041896 A1 | 2/2013 | Ghani et al. |
| 2013/0042323 A1 | 2/2013 | Narayanaswamy et al. |
| 2013/0054758 A1 | 2/2013 | Imes et al. |
| 2013/0061036 A1 | 3/2013 | Oliver |
| 2013/0064084 A1 | 3/2013 | Babbar et al. |
| 2013/0067034 A1 | 3/2013 | Degioanni et al. |
| 2013/0097203 A1 | 4/2013 | Bhattacharjee et al. |
| 2013/0103734 A1 | 4/2013 | Boldyrev et al. |
| 2013/0111543 A1 | 5/2013 | Brown et al. |
| 2013/0133032 A1 | 5/2013 | Li et al. |
| 2013/0136011 A1 | 5/2013 | Tardo et al. |
| 2013/0166730 A1 | 6/2013 | Wilkinson |
| 2013/0176842 A1 | 7/2013 | Bauchot et al. |
| 2013/0188645 A1 | 7/2013 | Mack-Crane |
| 2013/0198512 A1 | 8/2013 | Rubin et al. |
| 2013/0198827 A1 | 8/2013 | Bhaskaran et al. |
| 2013/0212297 A1 | 8/2013 | Varga |
| 2013/0227259 A1 | 8/2013 | Kim |
| 2013/0227689 A1 | 8/2013 | Pietrowicz et al. |
| 2013/0232104 A1 | 9/2013 | Goyal et al. |
| 2013/0262655 A1 | 10/2013 | Deschenes et al. |
| 2013/0283373 A1 | 10/2013 | Zisapel et al. |
| 2013/0291107 A1 | 10/2013 | Marck et al. |
| 2013/0305357 A1 | 11/2013 | Ayyagari et al. |
| 2013/0305392 A1 | 11/2013 | Bar-El et al. |
| 2013/0315260 A1 | 11/2013 | Adiraju et al. |
| 2013/0339514 A1 | 12/2013 | Crank et al. |
| 2013/0347018 A1 | 12/2013 | Limp et al. |
| 2014/0007222 A1 | 1/2014 | Qureshi et al. |
| 2014/0013434 A1 | 1/2014 | Ranum et al. |
| 2014/0020067 A1 | 1/2014 | Kim et al. |
| 2014/0026193 A1 | 1/2014 | Saxman et al. |
| 2014/0040451 A1 | 2/2014 | Agrawal et al. |
| 2014/0068035 A1 | 3/2014 | Croy et al. |
| 2014/0075536 A1 | 3/2014 | Davis et al. |
| 2014/0077956 A1 | 3/2014 | Sampath et al. |
| 2014/0109168 A1 | 4/2014 | Ashley et al. |
| 2014/0149456 A1 | 5/2014 | Carr et al. |
| 2014/0164584 A1 | 6/2014 | Joe et al. |
| 2014/0165207 A1 | 6/2014 | Engel et al. |
| 2014/0177497 A1 | 6/2014 | Backholm et al. |
| 2014/0181248 A1 | 6/2014 | Deutsch et al. |
| 2014/0189093 A1 | 7/2014 | Du Toit et al. |
| 2014/0195666 A1 | 7/2014 | Dumitriu et al. |
| 2014/0195797 A1 | 7/2014 | Du Toit |
| 2014/0201838 A1 | 7/2014 | Varsanyi et al. |
| 2014/0214800 A1 | 7/2014 | Liang et al. |
| 2014/0222998 A1 | 8/2014 | Vasseur et al. |
| 2014/0223325 A1 | 8/2014 | Melendez et al. |
| 2014/0241164 A1 | 8/2014 | Cociglio et al. |
| 2014/0242972 A1 | 8/2014 | Slotznick |
| 2014/0244851 A1 | 8/2014 | Lee |
| 2014/0245423 A1 | 8/2014 | Lee |
| 2014/0258511 A1 | 9/2014 | Sima et al. |
| 2014/0269276 A1 | 9/2014 | Rothstein et al. |
| 2014/0269777 A1 | 9/2014 | Rothstein et al. |
| 2014/0280907 A1 | 9/2014 | Rothstein et al. |
| 2014/0280908 A1 | 9/2014 | Rothstein et al. |
| 2014/0304211 A1 | 10/2014 | Horvitz |
| 2014/0304339 A1 | 10/2014 | Hamilton |
| 2014/0310392 A1 | 10/2014 | Ho |
| 2014/0317288 A1 | 10/2014 | Krueger et al. |
| 2014/0337500 A1 | 11/2014 | Lee |
| 2014/0344633 A1 | 11/2014 | Li et al. |
| 2014/0351415 A1 | 11/2014 | Harrigan et al. |
| 2015/0006896 A1 | 1/2015 | Franck |
| 2015/0007314 A1 | 1/2015 | Vaughan |
| 2015/0007316 A1 | 1/2015 | Ben-Shalom et al. |
| 2015/0019867 A1 | 1/2015 | Rothstein et al. |
| 2015/0019991 A1 | 1/2015 | Kristjánsson |
| 2015/0023168 A1 | 1/2015 | Kotecha et al. |
| 2015/0026027 A1 | 1/2015 | Priess et al. |
| 2015/0036501 A1 | 2/2015 | Rothstein et al. |
| 2015/0039749 A1 | 2/2015 | Kwan et al. |
| 2015/0058987 A1 | 2/2015 | Thure et al. |
| 2015/0063158 A1 | 3/2015 | Nedeltchev et al. |
| 2015/0074258 A1 | 3/2015 | Ferreira et al. |
| 2015/0074462 A1 | 3/2015 | Jacoby |
| 2015/0089034 A1 | 3/2015 | Stickle et al. |
| 2015/0096022 A1 | 4/2015 | Vincent et al. |
| 2015/0097683 A1 | 4/2015 | Sloo et al. |
| 2015/0100780 A1 | 4/2015 | Rubin et al. |
| 2015/0106616 A1 | 4/2015 | Nix |
| 2015/0106930 A1 | 4/2015 | Honda et al. |
| 2015/0113588 A1 | 4/2015 | Wing et al. |

(56) References Cited

U.S. PATENT DOCUMENTS

| | | |
|---|---|---|
| 2015/0121461 A1 | 4/2015 | Dulkin et al. |
| 2015/0134554 A1 | 5/2015 | Clais et al. |
| 2015/0134776 A1 | 5/2015 | Kruglick |
| 2015/0149828 A1 | 5/2015 | Mukerji et al. |
| 2015/0180759 A1 | 6/2015 | Fallon |
| 2015/0180890 A1 | 6/2015 | Ronen et al. |
| 2015/0188702 A1 | 7/2015 | Men et al. |
| 2015/0199229 A1 | 7/2015 | Amendjian et al. |
| 2015/0199613 A1 | 7/2015 | Ruiz et al. |
| 2015/0227859 A1 | 8/2015 | Ames, II |
| 2015/0229661 A1 | 8/2015 | Balabine et al. |
| 2015/0242627 A1 | 8/2015 | Lee et al. |
| 2015/0249512 A1 | 9/2015 | Adimatyam et al. |
| 2015/0254439 A1 | 9/2015 | Ao et al. |
| 2015/0254555 A1 | 9/2015 | Williams et al. |
| 2015/0269358 A1 | 9/2015 | Hesketh et al. |
| 2015/0277802 A1 | 10/2015 | Oikarinen et al. |
| 2015/0304350 A1 | 10/2015 | Lin et al. |
| 2015/0331771 A1 | 11/2015 | Conway |
| 2015/0341379 A1 | 11/2015 | Lefebvre et al. |
| 2015/0350167 A1 | 12/2015 | Djakovic |
| 2015/0365438 A1 | 12/2015 | Carver et al. |
| 2016/0006766 A1 | 1/2016 | Joo |
| 2016/0007314 A1 | 1/2016 | Rezvani et al. |
| 2016/0026922 A1 | 1/2016 | Vasseur et al. |
| 2016/0028755 A1 | 1/2016 | Vasseur et al. |
| 2016/0036647 A1 | 2/2016 | Gonzalez et al. |
| 2016/0043919 A1 | 2/2016 | Connelly et al. |
| 2016/0055335 A1 | 2/2016 | Herwono et al. |
| 2016/0056959 A1 | 2/2016 | Blom et al. |
| 2016/0080236 A1 | 3/2016 | Nikolaev et al. |
| 2016/0093205 A1 | 3/2016 | Boyer |
| 2016/0105471 A1 | 4/2016 | Nunes et al. |
| 2016/0112475 A1 | 4/2016 | Lawson et al. |
| 2016/0112521 A1 | 4/2016 | Lawson et al. |
| 2016/0119215 A1 | 4/2016 | Deschenes et al. |
| 2016/0127401 A1 | 5/2016 | Chauhan et al. |
| 2016/0134659 A1 | 5/2016 | Reddy et al. |
| 2016/0142435 A1 | 5/2016 | Bernstein et al. |
| 2016/0147583 A1 | 5/2016 | Ben et al. |
| 2016/0173288 A1 | 6/2016 | Li et al. |
| 2016/0173556 A1 | 6/2016 | Park et al. |
| 2016/0182274 A1 | 6/2016 | Kiesekamp et al. |
| 2016/0197949 A1 | 7/2016 | Nyhuis et al. |
| 2016/0219066 A1 | 7/2016 | Vasseur et al. |
| 2016/0226913 A1 | 8/2016 | Sood et al. |
| 2016/0241574 A1 | 8/2016 | Kumar et al. |
| 2016/0255115 A1 | 9/2016 | Mital et al. |
| 2016/0262044 A1 | 9/2016 | Calin et al. |
| 2016/0285752 A1 | 9/2016 | Joshi |
| 2016/0294870 A1 | 10/2016 | Banerjee et al. |
| 2016/0301624 A1 | 10/2016 | Gonzalez et al. |
| 2016/0301709 A1 | 10/2016 | Hassanzadeh et al. |
| 2016/0308725 A1 | 10/2016 | Tang et al. |
| 2016/0315916 A1 | 10/2016 | Rothstein et al. |
| 2016/0337312 A1 | 11/2016 | Buchanan et al. |
| 2016/0352761 A1 | 12/2016 | Mcgrew et al. |
| 2016/0357964 A1 | 12/2016 | Mulchandani |
| 2016/0357967 A1 | 12/2016 | Mulchandani |
| 2016/0359872 A1 | 12/2016 | Yadav et al. |
| 2016/0359915 A1 | 12/2016 | Gupta et al. |
| 2016/0366020 A1 | 12/2016 | Ramachandran et al. |
| 2016/0366186 A1 | 12/2016 | Kamble |
| 2016/0373414 A1 | 12/2016 | Maccarthaigh |
| 2016/0380851 A1 | 12/2016 | Kosai et al. |
| 2016/0380885 A1 | 12/2016 | Jani et al. |
| 2017/0012836 A1 | 1/2017 | Tongaonkar et al. |
| 2017/0041296 A1 | 2/2017 | Ford et al. |
| 2017/0048109 A1 | 2/2017 | Kant et al. |
| 2017/0070416 A1 | 3/2017 | Narayanan et al. |
| 2017/0076206 A1 | 3/2017 | Lastras-Montano et al. |
| 2017/0085445 A1 | 3/2017 | Layman et al. |
| 2017/0085459 A1 | 3/2017 | Xia et al. |
| 2017/0085590 A1 | 3/2017 | Hsu et al. |
| 2017/0090906 A1 | 3/2017 | Reynolds |
| 2017/0093796 A1 | 3/2017 | Wang et al. |
| 2017/0093891 A1 | 3/2017 | Mitchell |
| 2017/0093897 A1 | 3/2017 | Cochin et al. |
| 2017/0097982 A1 | 4/2017 | Zhang et al. |
| 2017/0099196 A1 | 4/2017 | Barsheshet et al. |
| 2017/0111272 A1 | 4/2017 | Liu et al. |
| 2017/0118092 A1 | 4/2017 | Dixon et al. |
| 2017/0123886 A1 | 5/2017 | Vaideeswaran |
| 2017/0126472 A1 | 5/2017 | Margalit et al. |
| 2017/0126709 A1 | 5/2017 | Baradaran et al. |
| 2017/0134937 A1 | 5/2017 | Miller et al. |
| 2017/0195353 A1 | 7/2017 | Taylor et al. |
| 2017/0201810 A1 | 7/2017 | Anderson et al. |
| 2017/0220739 A1 | 8/2017 | Hammerle et al. |
| 2017/0228253 A1 | 8/2017 | Layman et al. |
| 2017/0230270 A1 | 8/2017 | Padinhakara et al. |
| 2017/0230417 A1 | 8/2017 | Amar et al. |
| 2017/0270105 A1 | 9/2017 | Ninan et al. |
| 2017/0279837 A1 | 9/2017 | Dasgupta et al. |
| 2017/0279838 A1 | 9/2017 | Dasgupta et al. |
| 2017/0279839 A1 | 9/2017 | Vasseur et al. |
| 2017/0288974 A1 | 10/2017 | Yoshihira et al. |
| 2017/0288987 A1 | 10/2017 | Pasupathy et al. |
| 2017/0289104 A1 | 10/2017 | Shankar et al. |
| 2017/0289168 A1 | 10/2017 | Bar et al. |
| 2017/0289185 A1 | 10/2017 | Mandyam |
| 2017/0289847 A1 | 10/2017 | Wetterwald et al. |
| 2017/0310703 A1 | 10/2017 | Ackerman et al. |
| 2017/0317941 A1 | 11/2017 | Eggleston et al. |
| 2017/0324758 A1 | 11/2017 | Hart et al. |
| 2017/0353437 A1 | 12/2017 | Ayyadevara et al. |
| 2017/0353477 A1 | 12/2017 | Faigon et al. |
| 2017/0364794 A1 | 12/2017 | Mahkonen et al. |
| 2017/0366526 A1 | 12/2017 | Wood et al. |
| 2018/0004972 A1 | 1/2018 | Ruggiero et al. |
| 2018/0007087 A1 | 1/2018 | Grady et al. |
| 2018/0013650 A1 | 1/2018 | Khanal et al. |
| 2018/0033089 A1 | 2/2018 | Goldman et al. |
| 2018/0034783 A1 | 2/2018 | Rothstein et al. |
| 2018/0075240 A1 | 3/2018 | Chen |
| 2018/0077189 A1 | 3/2018 | Doppke et al. |
| 2018/0084011 A1 | 3/2018 | Joseph et al. |
| 2018/0089286 A1 | 3/2018 | Marquardt et al. |
| 2018/0091391 A1 | 3/2018 | Turow et al. |
| 2018/0091413 A1 | 3/2018 | Richards et al. |
| 2018/0091534 A1 | 3/2018 | Dubrovsky et al. |
| 2018/0103056 A1 | 4/2018 | Kohout et al. |
| 2018/0109507 A1 | 4/2018 | Caldera et al. |
| 2018/0109557 A1 | 4/2018 | Yoo et al. |
| 2018/0115566 A1 | 4/2018 | Azvine et al. |
| 2018/0124078 A1 | 5/2018 | Hajmasan et al. |
| 2018/0131675 A1 | 5/2018 | Sengupta et al. |
| 2018/0131711 A1 | 5/2018 | Chen et al. |
| 2018/0137001 A1 | 5/2018 | Zong et al. |
| 2018/0139227 A1 | 5/2018 | Martin et al. |
| 2018/0145995 A1 | 5/2018 | Roeh et al. |
| 2018/0167310 A1 | 6/2018 | Kamble |
| 2018/0191755 A1 | 7/2018 | Monaco et al. |
| 2018/0198812 A1 | 7/2018 | Christodorescu et al. |
| 2018/0219879 A1 | 8/2018 | Pierce |
| 2018/0260715 A1 | 9/2018 | Yan et al. |
| 2018/0262487 A1 | 9/2018 | Zaifman et al. |
| 2018/0276561 A1 | 9/2018 | Pasternack et al. |
| 2018/0278419 A1 | 9/2018 | Higgins et al. |
| 2018/0324061 A1 | 11/2018 | Khanal et al. |
| 2018/0329935 A1 | 11/2018 | Mugali et al. |
| 2018/0351781 A1 | 12/2018 | Movsisyan et al. |
| 2018/0351970 A1 | 12/2018 | Majumder et al. |
| 2018/0365593 A1 | 12/2018 | Galitsky |
| 2018/0375882 A1 | 12/2018 | Kallos et al. |
| 2018/0375893 A1 | 12/2018 | Jordan et al. |
| 2019/0005205 A1 | 1/2019 | Dargar et al. |
| 2019/0007283 A1 | 1/2019 | Kieviet et al. |
| 2019/0012441 A1 | 1/2019 | Tuli et al. |
| 2019/0020669 A1 | 1/2019 | Glatfelter et al. |
| 2019/0028357 A1 | 1/2019 | Kokkula et al. |
| 2019/0052554 A1 | 2/2019 | Mukerji et al. |
| 2019/0052675 A1 | 2/2019 | Krebs |
| 2019/0068465 A1 | 2/2019 | Khanal et al. |

(56)             References Cited

U.S. PATENT DOCUMENTS

| | | |
|---|---|---|
| 2019/0079979 A1 | 3/2019 | Chan |
| 2019/0095478 A1 | 3/2019 | Tankersley et al. |
| 2019/0102469 A1 | 4/2019 | Makovsky et al. |
| 2019/0121979 A1 | 4/2019 | Chari et al. |
| 2019/0124123 A1 | 4/2019 | Higgins et al. |
| 2019/0132358 A1 | 5/2019 | Divalentin et al. |
| 2019/0132359 A1 | 5/2019 | Kraenzel et al. |
| 2019/0163678 A1 | 5/2019 | Bath et al. |
| 2019/0171725 A1 | 6/2019 | Shen et al. |
| 2019/0196912 A1 | 6/2019 | Didehban et al. |
| 2019/0199609 A1 | 6/2019 | Hammerle et al. |
| 2019/0230095 A1 | 7/2019 | Mcgrew et al. |
| 2019/0230124 A1 | 7/2019 | Hodgman et al. |
| 2019/0236149 A1 | 8/2019 | Kuruvada et al. |
| 2019/0245734 A1 | 8/2019 | Wu et al. |
| 2019/0245759 A1 | 8/2019 | Mukerji et al. |
| 2019/0245763 A1 | 8/2019 | Wu et al. |
| 2019/0245873 A1 | 8/2019 | Wu et al. |
| 2019/0253445 A1 | 8/2019 | Mukerji et al. |
| 2019/0260764 A1 | 8/2019 | Humphrey et al. |
| 2019/0266999 A1 | 8/2019 | Chandrasekaran et al. |
| 2019/0268379 A1 | 8/2019 | Narayanaswamy et al. |
| 2019/0303198 A1 | 10/2019 | Kim et al. |
| 2019/0318109 A1 | 10/2019 | Thomas |
| 2019/0327156 A1 | 10/2019 | Hammerle et al. |
| 2019/0340554 A1 | 11/2019 | Dotan-cohen et al. |
| 2019/0372827 A1 | 12/2019 | Vasseur et al. |
| 2019/0372828 A1 | 12/2019 | Wu et al. |
| 2019/0372864 A1 | 12/2019 | Pignataro et al. |
| 2019/0387005 A1 | 12/2019 | Zawoad et al. |
| 2020/0034528 A1 | 1/2020 | Yang et al. |
| 2020/0052985 A1 | 2/2020 | Ball et al. |
| 2020/0067952 A1 | 2/2020 | Deaguero et al. |
| 2020/0076597 A1 | 3/2020 | Higgins et al. |
| 2020/0082081 A1 | 3/2020 | Sarin et al. |
| 2020/0099703 A1 | 3/2020 | Singh |
| 2020/0167349 A1 | 5/2020 | Marquardt et al. |
| 2020/0201850 A1 | 6/2020 | Haggie et al. |
| 2020/0202256 A1 | 6/2020 | Chaudhari et al. |
| 2020/0220849 A1 | 7/2020 | Zaifman et al. |
| 2020/0236131 A1 | 7/2020 | Vejman et al. |
| 2020/0250139 A1 | 8/2020 | Muffat et al. |
| 2020/0287879 A1 | 9/2020 | Chandoor |
| 2020/0287885 A1 | 9/2020 | Rodniansky |
| 2020/0287927 A1 | 9/2020 | Zadeh et al. |
| 2020/0321087 A1 | 10/2020 | Willis et al. |
| 2020/0366691 A1 | 11/2020 | Pierce |
| 2020/0382529 A1 | 12/2020 | Higgins et al. |
| 2020/0389469 A1 | 12/2020 | Litichever et al. |
| 2021/0006589 A1 | 1/2021 | Kohout et al. |
| 2021/0012020 A1 | 1/2021 | Malton et al. |
| 2021/0037033 A1 | 2/2021 | Mukerji et al. |
| 2021/0037043 A1 | 2/2021 | Lee et al. |
| 2021/0044608 A1 | 2/2021 | Deaguero et al. |
| 2021/0160283 A1 | 5/2021 | St. Pierre |
| 2021/0185087 A1 | 6/2021 | Wu et al. |
| 2021/0194781 A1 | 6/2021 | Wu et al. |
| 2021/0194908 A1 | 6/2021 | Wu et al. |
| 2021/0211466 A1 | 7/2021 | Sellers |
| 2021/0218714 A1 | 7/2021 | Wang et al. |
| 2021/0250368 A1 | 8/2021 | Hearty et al. |
| 2021/0286830 A1 | 9/2021 | Galitsky |
| 2021/0288895 A1 | 9/2021 | Wu et al. |
| 2021/0288993 A1 | 9/2021 | Kraning et al. |
| 2021/0303783 A1 | 9/2021 | Misra et al. |
| 2021/0342337 A1 | 11/2021 | Lu et al. |
| 2021/0350276 A1 | 11/2021 | Ashlock et al. |
| 2021/0356292 A1* | 11/2021 | Lin ........................ G01C 21/32 |
| 2021/0360004 A1 | 11/2021 | Mcgrew et al. |
| 2021/0360011 A1 | 11/2021 | O'hara et al. |
| 2022/0019688 A1 | 1/2022 | Nelluri et al. |
| 2022/0021694 A1 | 1/2022 | Higgins et al. |
| 2022/0029875 A1 | 1/2022 | Wu et al. |
| 2022/0053022 A1 | 2/2022 | Wu et al. |
| 2022/0060503 A1 | 2/2022 | Lee et al. |
| 2022/0060518 A1 | 2/2022 | Higgins et al. |
| 2022/0067177 A1 | 3/2022 | Chugunov |
| 2022/0070073 A1 | 3/2022 | Ball et al. |
| 2022/0070188 A1 | 3/2022 | Sheedy et al. |
| 2022/0094706 A1 | 3/2022 | Higgins et al. |
| 2022/0224716 A1 | 7/2022 | Salji |
| 2022/0239685 A1 | 7/2022 | Higgins et al. |
| 2022/0247771 A1 | 8/2022 | Higgins et al. |
| 2022/0345384 A1 | 10/2022 | Wu et al. |
| 2022/0407881 A1 | 12/2022 | Costlow et al. |
| 2023/0087451 A1 | 3/2023 | Rothstein et al. |
| 2023/0214203 A1* | 7/2023 | S. ........................ G06Q 10/087 |
| | | 717/170 |
| 2023/0319047 A1 | 10/2023 | Wu et al. |
| 2023/0418683 A1* | 12/2023 | Wang ................... G06F 16/285 |
| 2024/0265114 A1 | 8/2024 | Lambotte |
| 2024/0267400 A1* | 8/2024 | Gazit ................... G06F 21/552 |
| 2024/0289356 A1 | 8/2024 | Fox et al. |
| 2024/0356926 A1 | 10/2024 | Wu et al. |
| 2024/0414190 A1 | 12/2024 | Lal et al. |
| 2025/0007950 A1 | 1/2025 | Wuest et al. |
| 2025/0016192 A1 | 1/2025 | Montgomery et al. |
| 2025/0023914 A1 | 1/2025 | Wu et al. |
| 2025/0039235 A1 | 1/2025 | Hanes et al. |
| 2025/0061195 A1 | 2/2025 | Salman |
| 2025/0080579 A1 | 3/2025 | Mushtaq |
| 2025/0097236 A1 | 3/2025 | Tiwari et al. |
| 2025/0133102 A1 | 4/2025 | Mitev et al. |
| 2025/0168186 A1 | 5/2025 | McDonald et al. |
| 2025/0173423 A1 | 5/2025 | Strogov et al. |
| 2025/0175456 A1 | 5/2025 | Crabtree et al. |
| 2025/0175498 A1 | 5/2025 | Strogov et al. |
| 2025/0240322 A1 | 7/2025 | Rodriguez et al. |
| 2025/0307222 A1 | 10/2025 | D'agostino |
| 2025/0307290 A1 | 10/2025 | D'agostino |
| 2025/0307561 A1 | 10/2025 | D'agostino |
| 2025/0307834 A1 | 10/2025 | D'agostino |
| 2025/0310280 A1 | 10/2025 | D'agostino |
| 2025/0310376 A1 | 10/2025 | Strogov et al. |
| 2025/0328560 A1 | 10/2025 | Madisetti et al. |

FOREIGN PATENT DOCUMENTS

| | | | | |
|---|---|---|---|---|
| AU | 2008328833 A1 | 6/2009 | | |
| CN | 105071987 A | 11/2015 | | |
| CN | 105323247 A | 2/2016 | | |
| CN | 106170008 A | 11/2016 | | |
| CN | 106341375 A | 1/2017 | | |
| CN | 107646190 A | 1/2018 | | |
| CN | 107667510 A | 2/2018 | | |
| CN | 106533665 B | 8/2018 | | |
| CN | 109104441 A | 12/2018 | | |
| CN | 109542772 A | 3/2019 | | |
| CN | 110113349 A | 8/2019 | | |
| CN | 107667510 B | 11/2020 | | |
| CN | 112085039 A | 12/2020 | | |
| CN | 112398876 A | 2/2021 | | |
| CN | 107646190 B | 3/2021 | | |
| CN | 115996249 A | * | 4/2023 | |
| CN | 118590917 A | * | 9/2024 | ........ H04W 28/0958 |
| CN | 120658435 A | * | 9/2025 | ............ H04L 41/12 |
| CN | 121459576 A | * | 2/2026 | |
| DE | 69533953 | 3/2005 | | |
| DE | 69533953 T2 | 4/2006 | | |
| EP | 0702477 A2 | 3/1996 | | |
| EP | 0702477 A3 | 7/1999 | | |
| EP | 1026867 A2 | 8/2000 | | |
| EP | 1579629 A2 | 5/2004 | | |
| EP | 0702477 B1 | 1/2005 | | |
| EP | 2057576 A2 | 3/2008 | | |
| EP | 1579629 A4 | 11/2009 | | |
| EP | 2215801 B1 | 4/2011 | | |
| EP | 2057576 A4 | 4/2012 | | |
| EP | 3089424 A1 | 11/2016 | | |
| EP | 3094061 A1 | 11/2016 | | |
| EP | 3113443 A1 | 1/2017 | | |
| EP | 3306890 A1 | 4/2018 | | |
| EP | 3442164 A1 | 2/2019 | | |
| EP | 3477904 A1 | 5/2019 | | |

(56) References Cited

FOREIGN PATENT DOCUMENTS

| EP | 3794800 | A1 | 11/2019 |
|----|---------|-----|---------|
| EP | 3834376 | A1 | 2/2020 |
| EP | 3394784 | B1 | 10/2020 |
| EP | 3272095 | B1 | 3/2021 |
| EP | 3477904 | B1 | 11/2021 |
| EP | 4218212 | A1 | 3/2022 |
| EP | 3794800 | B1 | 11/2022 |
| EP | 3089424 | B1 | 6/2023 |
| EP | 3442164 | B1 | 8/2023 |
| EP | 3834376 | B1 | 9/2023 |
| FR | 2924552 | A1 | 6/2009 |
| GB | 2545910 | A | 7/2017 |
| GB | 2545910 | B | 2/2018 |
| KR | 96-12819 | A | 4/1996 |
| KR | 10-0388606 | B1 | 11/2003 |
| KR | 10-2014-0093060 | A | 7/2014 |
| KR | 10-1662614 | B1 | 10/2016 |
| NZ | 586270 | A | 12/2011 |
| WO | 2004/040423 | A2 | 5/2004 |
| WO | 2004/040423 | A3 | 7/2004 |
| WO | 2008/026212 | A2 | 3/2008 |
| WO | 2009/015461 | A1 | 2/2009 |
| WO | 2008/026212 | A3 | 5/2009 |
| WO | 2009/068603 | A2 | 6/2009 |
| WO | 2015/128613 | A1 | 9/2015 |
| WO | 2016/118131 | A1 | 7/2016 |
| WO | 2016/144932 | A1 | 9/2016 |
| WO | 2016/146610 | A1 | 9/2016 |
| WO | 2016/191486 | A1 | 12/2016 |
| WO | 2017/108575 | A1 | 6/2017 |
| WO | 2017/108576 | A1 | 6/2017 |
| WO | 2018/204237 | A1 | 11/2018 |
| WO | 2019/032137 | A1 | 2/2019 |
| WO | 2019/083555 | A1 | 5/2019 |
| WO | 2019/221911 | A1 | 11/2019 |
| WO | 2020/033005 | A1 | 2/2020 |
| WO | 2020/131740 | A1 | 6/2020 |
| WO | 2022/066910 | A1 | 3/2022 |
| WO | WO-2022167840 | A1 * | 8/2022 ............. G06N 3/044 |

OTHER PUBLICATIONS

Office Communication for U.S. Appl. No. 14/518,996 mailed Apr. 20, 2015, 37 Pages.
Office Communication for U.S. Appl. No. 14/695,690 mailed Sep. 9, 2015, 41 Pages.
Office Communication for U.S. Appl. No. 15/014,932 mailed Aug. 1, 2017, 27 Pages.
Office Communication for U.S. Appl. No. 15/014,932 mailed Mar. 3, 2017, 6 Pages.
Office Communication for U.S. Appl. No. 15/219,016 mailed Nov. 22, 2016, 12 Pages.
Office Communication for U.S. Appl. No. 15/443,868 mailed Aug. 11, 2017, 11 Pages.
Office Communication for U.S. Appl. No. 15/457,886 mailed Jan. 5, 2018, 11 Pages.
Office Communication for U.S. Appl. No. 15/585,887 mailed Aug. 28, 2020, 30 Pages.
Office Communication for U.S. Appl. No. 16/384,574 mailed Jan. 13, 2020, 8 Pages.
Office Communication for U.S. Appl. No. 16/384,574 mailed May 31, 2019, 12 Pages.
Office Communication for U.S. Appl. No. 16/384,574 mailed Oct. 8, 2019, 13 Pages.
Office Communication for U.S. Appl. No. 11/683,643 mailed Apr. 28, 2010, 35 Pages.
Office Communication for U.S. Appl. No. 11/683,643 mailed Jan. 23, 2012, 22 Pages.
Office Communication for U.S. Appl. No. 11/683,643 mailed Oct. 14, 2010, 43 Pages.
Office Communication for U.S. Appl. No. 12/326,672 mailed Dec. 23, 2010, 15 Pages.

Office Communication for U.S. Appl. No. 12/326,672 mailed Jun. 22, 2011, 16 Pages.
Office Communication for U.S. Appl. No. 12/326,672 mailed Jun. 9, 2010, 9 Pages.
Office Communication for U.S. Appl. No. 12/326,672 mailed Oct. 24, 2011, 9 Pages.
Office Communication for U.S. Appl. No. 13/831,626 mailed Sep. 3, 2013, 17 Pages.
Office Communication for U.S. Appl. No. 13/831,673 mailed Mar. 6, 2014, 12 Pages.
Office Communication for U.S. Appl. No. 13/831,673 mailed May 22, 2014, 5 Pages.
Office Communication for U.S. Appl. No. 13/831,673 mailed Sep. 30, 2013, 10 Pages.
Office Communication for U.S. Appl. No. 13/831,908 mailed Apr. 9, 2014, 3 Pages.
Office Communication for U.S. Appl. No. 13/831,908 mailed Aug. 9, 2013, 29 Pages.
Office Communication for U.S. Appl. No. 13/831,908 mailed Jun. 25, 2014, 15 Pages.
Office Communication for U.S. Appl. No. 13/831,959 mailed Aug. 22, 2013, 9 Pages.
Office Communication for U.S. Appl. No. 14/107,580 mailed Mar. 17, 2015, 5 Pages.
Office Communication for U.S. Appl. No. 14/107,580 mailed Mar. 6, 2014, 13 Pages.
Office Communication for U.S. Appl. No. 14/107,580 mailed Sep. 15, 2014, 15 Pages.
Office Communication for U.S. Appl. No. 14/107,631 mailed Dec. 30, 2014, 12 Pages.
Office Communication for U.S. Appl. No. 14/107,631 mailed Feb. 20, 2014, pp. 1-16,.
Office Communication for U.S. Appl. No. 14/107,631 mailed Sep. 26, 2014, pp. 1-14.
Office Communication for U.S. Appl. No. 14/500,893 mailed Feb. 18, 2015, 11 Pages.
Office Communication for U.S. Appl. No. 14/500,893 mailed Jun. 15, 2015, 12 Pages.
Office Communication for U.S. Appl. No. 14/500,893 mailed Nov. 20, 2014, 15 Pages.
Office Communication for U.S. Appl. No. 14/518,996 mailed Jul. 21, 2015, 17 Pages.
Office Communication for U.S. Appl. No. 14/518,996 mailed Nov. 20, 2014, 41 Pages.
Office Communication for U.S. Appl. No. 14/695,690 mailed Feb. 24, 2016, 11 Pages.
Office Communication for U.S. Appl. No. 14/750,905 mailed Jan. 19, 2016, 5 Pages.
Office Communication for U.S. Appl. No. 14/750,905 mailed Sep. 22, 2015, 12 Pages.
Office Communication for U.S. Appl. No. 15/014,932 mailed May 15, 2018, 23 Pages.
Office Communication for U.S. Appl. No. 15/014,932 mailed Dec. 14, 2016, 26 Pages.
Office Communication for U.S. Appl. No. 15/014,932 mailed Jul. 16, 2018, 4 Pages.
Office Communication for U.S. Appl. No. 15/014,932 mailed Jun. 10, 2016, 20 Pages.
Office Communication for U.S. Appl. No. 15/014,932 mailed Nov. 23, 2018, 10 Pages.
Office Communication for U.S. Appl. No. 15/082,925 mailed Feb. 1, 2017, 6 Pages.
Office Communication for U.S. Appl. No. 15/082,925 mailed Sep. 13, 2016, 7 Pages.
Office Communication for U.S. Appl. No. 15/150,354 mailed Feb. 8, 2017, 8 Pages.
Office Communication for U.S. Appl. No. 15/150,354 mailed Jul. 5, 2016, 18 Pages.
Office Communication for U.S. Appl. No. 15/971,843 mailed Oct. 27, 2020, 11 Pages.
Office Communication for U.S. Appl. No. 15/984,197 mailed Aug. 31, 2018, 25 Pages.

US 12,647,441 B1

Page 9

(56) References Cited

OTHER PUBLICATIONS

Office Communication for U.S. Appl. No. 16/048,939 mailed Dec. 5, 2019, 9 Pages.

Office Communication for U.S. Appl. No. 16/048,939 mailed Feb. 18, 2020, 6 Pages.

Office Communication for U.S. Appl. No. 16/048,939 mailed Jun. 20, 2019, 8 Pages.

Office Communication for U.S. Appl. No. 16/048,939 mailed Mar. 26, 2020, 6 Pages.

Office Communication for U.S. Appl. No. 16/048,939 mailed Sep. 19, 2018, 9 Pages.

Office Communication for U.S. Appl. No. 16/100,116 mailed May 30, 2019, 5 Pages.

Office Communication for U.S. Appl. No. 16/100,116 mailed Nov. 15, 2018, 7 Pages.

Office Communication for U.S. Appl. No. 16/107,509 mailed Apr. 1, 2019, 21 Pages.

Office Communication for U.S. Appl. No. 16/107,509 mailed Aug. 21, 2019, 25 Pages.

Office Communication for U.S. Appl. No. 16/107,509 mailed Jan. 23, 2020, 12 Pages.

Office Communication for U.S. Appl. No. 16/107,509 mailed Jun. 14, 2019, 5 Pages.

Office Communication for U.S. Appl. No. 16/107,509 mailed Oct. 26, 2018, 26 Pages.

Office Communication for U.S. Appl. No. 16/113,442 mailed Jun. 5, 2019, 7 Pages.

Office Communication for U.S. Appl. No. 16/113,442 mailed Nov. 6, 2018, 10 Pages.

Office Communication for U.S. Appl. No. 16/174,051 mailed Jan. 29, 2019, 21 Pages.

Office Communication for U.S. Appl. No. 16/384,697 mailed May 30, 2019, 12 Pages.

Office Communication for U.S. Appl. No. 16/384,697 mailed Oct. 17, 2019, 8 Pages.

Office Communication for U.S. Appl. No. 16/424,387 mailed Feb. 24, 2020, 15 Pages.

Office Communication for U.S. Appl. No. 16/424,387 mailed Nov. 24, 2020, 23 Pages.

Office Communication for U.S. Appl. No. 16/459,472 mailed Aug. 14, 2019, 15 Pages.

Office Communication for U.S. Appl. No. 16/459,472 mailed Feb. 3, 2020, 7 Pages.

Office Communication for U.S. Appl. No. 16/525,290 mailed Jun. 15, 2021, 4 Pages.

Office Communication for U.S. Appl. No. 16/525,290 mailed Mar. 12, 2020, 10 Pages.

Office Communication for U.S. Appl. No. 16/525,290 mailed Mar. 31, 2021, 11 Pages.

Office Communication for U.S. Appl. No. 16/525,290 mailed Oct. 31, 2019, 9 Pages.

Office Communication for U.S. Appl. No. 16/525,290 mailed Sep. 23, 2020, 10 Pages.

Office Communication for U.S. Appl. No. 16/532,275 mailed Oct. 24, 2019, 29 Pages.

Office Communication for U.S. Appl. No. 16/543,243 mailed Apr. 7, 2020, 22 Pages.

Office Communication for U.S. Appl. No. 16/543,243 mailed Dec. 16, 2020, 13 Pages.

Office Communication for U.S. Appl. No. 16/543,243 mailed Sep. 27, 2019, 24 Pages.

Office Communication for U.S. Appl. No. 16/560,886 mailed Apr. 22, 2020, 10 Pages.

Office Communication for U.S. Appl. No. 16/560,886 mailed Dec. 6, 2019, 17 Pages.

Office Communication for U.S. Appl. No. 16/565,109 mailed Jan. 19, 2021, 9 Pages.

Office Communication for U.S. Appl. No. 16/565,109 mailed May 8, 2020, 19 Pages.

Office Communication for U.S. Appl. No. 16/565,109 mailed Nov. 27, 2019, 18 Pages.

Office Communication for U.S. Appl. No. 16/679,055 mailed Feb. 14, 2020, 32 Pages.

Office Communication for U.S. Appl. No. 16/679,055 mailed Jul. 26, 2021, 34 Pages.

Office Communication for U.S. Appl. No. 16/679,055 mailed Jun. 3, 2022, 34 Pages.

Office Communication for U.S. Appl. No. 16/679,055 mailed Mar. 16, 2021, 33 Pages.

Office Communication for U.S. Appl. No. 16/679,055 mailed Mar. 2, 2022, 35 Pages.

Office Communication for U.S. Appl. No. 16/679,055 mailed May 11, 2022, 3 Pages.

Office Communication for U.S. Appl. No. 16/679,055 mailed Nov. 12, 2021, 34 Pages.

Office Communication for U.S. Appl. No. 16/679,055 mailed Oct. 12, 2021, 3 Pages.

Office Communication for U.S. Appl. No. 16/679,055 mailed Sep. 21, 2022, 25 Pages.

Office Communication for U.S. Appl. No. 16/679,055 mailed Sep. 28, 2022, 2 Pages.

Office Communication for U.S. Appl. No. 16/679,055 mailed Sep. 4, 2020, 5 Pages.

Office Communication for U.S. Appl. No. 16/718,050 mailed Feb. 27, 2020, 21 Pages.

Office Communication for U.S. Appl. No. 16/718,050 mailed Jul. 27, 2021, 23 Pages.

Postel Jon, "Transmission Control Protocol", DARPA Internet Program, RFC: 793, Sep. 1981, 91 pages.

Office Communication for U.S. Appl. No. 16/113,442 mailed Mar. 22, 2019, 9 Pages.

Office Communication for U.S. Appl. No. 16/243,001 mailed Apr. 3, 2019, 16 Pages.

Office Communication for U.S. Appl. No. 16/391,216 mailed Jul. 8, 2019, 15 Pages.

Office Communication for U.S. Appl. No. 16/391,216 mailed Oct. 24, 2019, 16 Pages.

Office Communication for U.S. Appl. No. 16/424,387 mailed Oct. 18, 2019, 5 Pages.

Office Communication for U.S. Appl. No. 16/442,257 mailed Jul. 16, 2019, 11 Pages.

Office Communication for U.S. Appl. No. 16/989,025 mailed Jun. 8, 2022, 2 Pages.

Office Communication for U.S. Appl. No. 17/337,299 mailed Jun. 15, 2022, 2 Pages.

Office Communication for U.S. Appl. No. 17/483,148 mailed Mar. 2, 2022, 2 Pages.

Office Communication for U.S. Appl. No. 17/712,521 mailed Nov. 13, 2023, 8 Pages.

Office Communication for U.S. Appl. No. 17/712,521 mailed Oct. 11, 2023, 4 Pages.

Office Communication for U.S. Appl. No. 17/826,011 mailed Sep. 14, 2023, 13 Pages.

Office Communication for U.S. Appl. No. 15/466,248 mailed Apr. 15, 2019, 4 Pages.

Office Communication for U.S. Appl. No. 15/466,248 mailed Feb. 7, 2019, 32 Pages.

Office Communication for U.S. Appl. No. 15/585,887 mailed Sep. 11, 2023, 5 Pages.

Office Communication for U.S. Appl. No. 17/826,011 mailed Dec. 26, 2023, 11 Pages.

Examination Report for European Patent Application No. 16166907.2 mailed Mar. 9, 2018, 4 Pages.

Examination Report for European Patent Application No. 17210996.9 mailed May 21, 2021, 6 Pages.

Examination Report for European Patent Application No. 17210996.9 mailed May 27, 2020, 3 Pages.

Extended European Search Report for European Patent Application No. 16166907.2 mailed Sep. 30, 2016, 7 Pages.

Extended European Search Report for European Patent Application No. 17210995.1 mailed Jul. 6, 2018, 11 Pages.

(56) References Cited

OTHER PUBLICATIONS

Extended European Search Report for European Patent Application No. 17210996.9 mailed Jun. 13, 2018, 7 Pages.
Extended European Search Report for European Patent Application No. 19846527.0 mailed Apr. 4, 2022, 9 Pages.
International Search Report and Written Opinion for International Patent Application No. PCT/US2017/068585 mailed Jul. 4, 2018, 9 Pages.
International Search Report and Written Opinion for International Patent Application No. PCT/US2017/068586 mailed Aug. 9, 2018, 12 Pages.
International Search Report and Written Opinion for International Patent Application No. PCT/US2018/030145 mailed Aug. 10, 2018, 10 Pages.
International Search Report and Written Opinion for International Patent Application No. PCT/US2019/018097 mailed May 28, 2019, 9 Pages.
International Search Report and Written Opinion for International Patent Application No. PCT/US2019/030015 mailed Aug. 7, 2019, 6 Pages.
International Search Report and Written Opinion for International Patent Application No. PCT/US2021/051757 mailed Jan. 11, 2022, 8 Pages.
Office Communication for U.S. Appl. No. 16/525,290 mailed Jul. 9, 2021, 7 Pages.
Office Communication for U.S. Appl. No. 16/532,275 mailed Apr. 20, 2020, 8 Pages.
Office Communication for U.S. Appl. No. 15/855,769 mailed on May 1, 2019, 7 Pages.
Office Communication for U.S. Appl. No. 16/048,939 mailed on Jan. 31, 2019, 7 Pages.
Office Communication for U.S. Appl. No. 16/989,343 mailed Aug. 11, 2022, 9 Pages.
Office Communication for U.S. Appl. No. 16/989,343 mailed Aug. 17, 2022, 5 Pages.
Office Communication for U.S. Appl. No. 17/483,435 mailed Nov. 30, 2021, 21 Pages.
Office Communication for U.S. Appl. No. 17/721,514 mailed Jul. 21, 2022, 7 Pages.
Office Communication for U.S. Appl. No. 11/683,643 mailed Aug. 25, 2011, 43 Pages.
"Kerberos Overview—An Authentication Service for Open Network Systems," Cisco Systems, Inc., Jan. 19, 2006, https://www.cisco.comlclen/us/support/docs/security-vpn/kerberos/16087-1.html, Accessed: Feb. 9, 2022, pp. 1-16.
Beckett et al., "New Sensing Technique for Detecting Application Layer DDOS Attacks Targeting Back-end Database Resources," IEEE International Conference on Communications (ICC 2017), May 2017, 7 Pages.
Conry-Murray, Andrew, "Security Event Management Gets Specialized," Network Magazine, CMP Media, vol. 20, Nov. 2005, 6 Pages.
Digital Imaging and Communications in Medicine (DICOM), Part 6: Data Dictionary, PS 3.6-2011. 2011, http://dicorn.nerna.org/Dicom12011 111_06pu.pdf, pp. 1-216.
Fuertes, "Evaluation of OSPF Extensions in MANET Routing," Paris, 2007, 192 pages.
Handel et al., "Hiding Data in the OSI Network Model", Los Alamos, New Mexico, 1996, vol. 1174, pp. 23-38.
Handley et al., "Network Intrusion Detection: Evasion, Traffic Normalization, and End-to-End Protocol Semantics," 2011, International Computer Science Institute, 17 pages.
Health Level Seven, Version 2.6, Appendix A, Nov. 2007, 255 Pages.
Information Sciences Institute, "Internet Protocol Darpa Internet Program Protocol Specification," Sep. 1981, 36 pages.
Lin, Mark, "An Overview of Session Hijacking at the Network and Application Levels," Jan. 18, 2005, 16 Pages.

Mozilla Developer Network, "NSS Key Log Format," https://developer.mozilla, orgien-USlclocs/Mozilla/ProjectsINSSIKey_Log_Format, Jan. 8, 2010, p. 1.
Berners-Lee et al. "Uniform Resource Identifiers (URI): Generic Syntax" Network Working Group, Request for Comments: 2396, Aug. 1998, 40 pages.
Hamid et al., "A Methodology to Develop Dynamic Cost-Centric Risk Impact Metrics", Dec. 2015, International Conference on Developments of E-Systems Engineering, pp. 53-59 (Year: 2015).
Kristol et al. "HTTP State Management Mechanism", Network Working Group, Request for Comments: 2109, Feb. 1997, 21 Pages.
Kristol et al. "HTTP State Management Mechanism", Network Working Group, Request for Comments: 2965, Oct. 2000, 26 Pages.
Intention to Grant for European Application No. 16166907.2 mailed on Jan. 20, 2023, 8 Pages.
Intention to Grant for European Application No. 17210995.1 mailed on Jun. 2, 2021, 8 Pages.
Intention to Grant for European Patent Application No. 19804040.4 mailed Jun. 23, 2022, 8 Pages.
Intention to Grant for European Patent Application No. 17210996.9 mailed Mar. 29, 2023, 10 Pages.
Intention to Grant for European Patent Application No. 19846527.0 mailed Apr. 5, 2023, 9 Pages.
International Preliminary Report on Patentability Chapter I for International Patent Application No. PCT/US2017/068585 mailed May 7, 2020, 8 Pages.
International Preliminary Report on Patentability Chapter I for International Patent Application No. PCT/US2017/068586 mailed Feb. 20, 2020, 11 Pages.
International Preliminary Report on Patentability Chapter I for International Patent Application No. PCT/US2018/030145 mailed Nov. 14, 2019, 8 Pages.
International Preliminary Report on Patentability Chapter I for International Patent Application No. PCT/US2019/018097 mailed Feb. 18, 2021, 8 Pages.
International Preliminary Report on Patentability Chapter I for International Patent Application No. PCT/US2019/030015 mailed Dec. 3, 2020, 5 Pages.
International Preliminary Report on Patentability Chapter I for International Patent Application No. PCT/US2021/051757 mailed Apr. 6, 2023, 7 Pages.
Office Communication for U.S. Appl. No. 16/525,290 mailed Jul. 28, 2021, 2 Pages.
Office Communication for U.S. Appl. No. 16/048,939 mailed on Apr. 12, 2019, 5 Pages.
Office Communication for U.S. Appl. No. 17/708,311 mailed on Dec. 21, 2022, 4 pages.
Office Communication for U.S. Appl. No. 17/708,311 mailed on Jun. 2, 2023, 16 pages.
Office Communication for U.S. Appl. No. 17/708,311 mailed on Jun. 20, 2022, 15 pages.
Office Communication for U.S. Appl. No. 17/708,311 mailed on Oct. 5, 2022, 15 pages.
Office Communication for U.S. Appl. No. 17/708,311 mailed on Sep. 13, 2023, 11 pages.
Office Communication for U.S. Appl. No. 11/679,356 mailed Dec. 11, 2009, 23 Pages.
Office Communication for U.S. Appl. No. 11/679,356 mailed Feb. 22, 2010, 3 Pages.
Office Communication for U.S. Appl. No. 11/679,356 mailed Jun. 22, 2009, 21 Pages.
Office Communication for U.S. Appl. No. 11/679,356 mailed Mar. 4, 2011, 15 Pages.
Office Communication for U.S. Appl. No. 11/679,356 mailed Sep. 9, 2010, 27 Pages.
Office Communication for U.S. Appl. No. 14/500,893 mailed Apr. 28, 2015, 6 Pages.
Office Communication for U.S. Appl. No. 14/500,893 mailed Aug. 31, 2015, 7 Pages.
Office Communication for U.S. Appl. No. 15/014,932 mailed Dec. 19, 2018, 2 Pages.
Office Communication for U.S. Appl. No. 15/457,886 mailed Oct. 12, 2018, 3 Pages.

(56) References Cited

OTHER PUBLICATIONS

Office Communication for U.S. Appl. No. 15/466,248 mailed Sep. 27, 2018, 3 Pages.

Office Communication for U.S. Appl. No. 15/585,887 mailed Apr. 27, 2018, 25 Pages.

Office Communication for U.S. Appl. No. 15/585,887 mailed Jan. 15, 2019, 6 Pages.

Office Communication for U.S. Appl. No. 15/585,887 mailed Mar. 8, 2018, 6 Pages.

Office Communication for U.S. Appl. No. 15/585,887 mailed Nov. 18, 2019, 9 Pages.

Office Communication for U.S. Appl. No. 15/585,887 mailed Oct. 23, 2018, 27 Pages.

Office Communication for U.S. Appl. No. 15/585,887 mailed Sep. 3, 2019, 29 Pages.

Office Communication for U.S. Appl. No. 15/675,216 mailed Mar. 22, 2018, 9 Pages.

Office Communication for U.S. Appl. No. 15/694,229 mailed Jan. 9, 2019, 11 Pages.

Office Communication for U.S. Appl. No. 15/694,229 mailed Jul. 26, 2018, 16 Pages.

Office Communication for U.S. Appl. No. 15/793,880 mailed Mar. 1, 2018, 9 Pages.

Office Communication for U.S. Appl. No. 15/891,273 mailed Mar. 13, 2019, 6 Pages.

Office Communication for U.S. Appl. No. 15/891,311 mailed Dec. 11, 2018, 4 Pages.

Office Communication for U.S. Appl. No. 15/891,311 mailed Mar. 13, 2019, 2 Pages.

Office Communication for U.S. Appl. No. 15/893,519 mailed Dec. 12, 2018, 4 Pages.

Office Communication for U.S. Appl. No. 15/893,519 mailed Feb. 1, 2019, 21 Pages.

Office Communication for U.S. Appl. No. 15/893,519 mailed May 4, 2018, 10 Pages.

Office Communication for U.S. Appl. No. 15/893,519 mailed Sep. 27, 2018, 17 Pages.

Communication for U.S. Appl. No. 16/100,116 mailed Jul. 10, 2019, 4 Pages.

Office Communication for U.S. Appl. No. 16/718,050 mailed Sep. 4, 2020, 23 Pages.

Office Communication for U.S. Appl. No. 16/813,649 mailed Apr. 1, 2022, 4 Pages.

Office Communication for U.S. Appl. No. 16/813,649 mailed Dec. 20, 2021, 44 Pages.

Office Communication for U.S. Appl. No. 16/813,649 mailed Feb. 24, 2021, 7 Pages.

Office Communication for U.S. Appl. No. 16/813,649 mailed May 11, 2022, 16 Pages.

Office Communication for U.S. Appl. No. 16/820,582 mailed Jan. 14, 2022, 13 Pages.

Office Communication for U.S. Appl. No. 16/820,582 mailed May 10, 2021, 24 Pages.

Office Communication for U.S. Appl. No. 16/820,582 mailed Sep. 27, 2021, 25 Pages.

Office Communication for U.S. Appl. No. 16/989,025 mailed Jan. 19, 2022, 12 Pages.

Office Communication for U.S. Appl. No. 16/989,025 mailed May 23, 2022, 14 Pages.

Office Communication for U.S. Appl. No. 16/989,343 mailed Mar. 29, 2022, 5 Pages.

Office Communication for U.S. Appl. No. 17/214,555 mailed Mar. 21, 2023, 25 Pages.

Office Communication for U.S. Appl. No. 17/214,555 mailed Nov. 10, 2022, 21 Pages.

Office Communication for U.S. Appl. No. 17/226,947 mailed Dec. 30, 2021, 6 Pages.

Office Communication for U.S. Appl. No. 17/226,947 mailed Jul. 11, 2022, 13 Pages.

Office Communication for U.S. Appl. No. 17/318,423 mailed Mar. 29, 2022, 21 Pages.

Office Communication for U.S. Appl. No. 17/318,423 mailed Sep. 13, 2022, 15 Pages.

Office Communication for U.S. Appl. No. 17/318,423 mailed Sep. 22, 2022, 2 Pages.

Office Communication for U.S. Appl. No. 17/337,299 mailed Feb. 17, 2022, 14 Pages.

Office Communication for U.S. Appl. No. 17/337,299 mailed Oct. 21, 2021, 34 Pages.

Office Communication for U.S. Appl. No. 17/351,866 mailed Feb. 9, 2022, 9 Pages.

Office Communication for U.S. Appl. No. 17/351,866 mailed Oct. 18, 2021, 12 Pages.

Office Communication for U.S. Appl. No. 17/483,148 mailed Dec. 13, 2021, 12 Pages.

Office Communication for U.S. Appl. No. 17/515,963 mailed Feb. 1, 2023, 2 Pages.

Office Communication for U.S. Appl. No. 17/515,963 mailed Jan. 24, 2023, 8 Pages.

Office Communication for U.S. Appl. No. 17/515,963 mailed Oct. 7, 2022, 27 Pages.

Office Communication for U.S. Appl. No. 17/516,063 mailed Aug. 11, 2023, 11 Pages.

Office Communication for U.S. Appl. No. 17/516,063 mailed Jul. 31, 2023, 3 Pages.

Office Communication for U.S. Appl. No. 17/516,063 mailed May 19, 2023, 10 pages.

Office Communication for U.S. Appl. No. 17/516,063 mailed Oct. 31, 2022, 10 Pages.

Office Communication for U.S. Appl. No. 17/712,521 mailed Aug. 2, 2023, 14 Pages.

Office Communication for U.S. Appl. No. 17/712,521 mailed Mar. 21, 2023, 13 Pages.

Office Communication for U.S. Appl. No. 17/721,514 mailed Oct. 11, 2022, 2 Pages.

Office Communication for U.S. Appl. No. 17/721,514 mailed Sep. 20, 2022, 8 pages.

Office Communication for U.S. Appl. No. 17/722,217 mailed Jul. 15, 2022, 7 Pages.

Office Communication for U.S. Appl. No. 17/722,217 mailed Jun. 29, 2022, 23 Pages.

Office Communication for U.S. Appl. No. 17/861,373 mailed Jan. 11, 2023, 10 Pages.

Office Communication for U.S. Appl. No. 17/861,373 mailed Jan. 19, 2023, 2 Pages.

Office Communication for U.S. Appl. No. 17/861,373 mailed Sep. 9, 2022, 18 Pages.

Parsons, "Moving Across the Internet: Code-Bodies, Code-Corpses, and Network Architecture," May 9, 2010, 20 pages.

Shaver, Jim, "Decrypting TLS Browser Traffic with Wreshark the easy way", https://jimshaver.net/2015/02/11/decrypting-tls-browser-traffic-with-wireshark-the-easy-way/, Feb. 11, 2015, pp. 1-30.

Supplementary European Search Report for European Patent Application No. 19804040.4 mailed Jan. 25, 2022, 4 Pages.

Svoboda, Jakub, "Network Traffic Analysis with Deep Packet inspection Method," Masaryk University, Faculty of Informatics, Master's Thesis, 2014, 74 Pages.

Wade, Susan Marie, "SCADA Honeynets: The attractiveness of honeypots as critical infrastructure security tools for the detection and analysis of advanced threats" (2011). Graduate Theses and Dissertations. 12138. https://lib.dr.iastate.edu/etd/12138, 67 Pages.

Zander et al., "Covert Channels and Countermeasures in Computer Network Protocols," Dec. 2007, 7 pages.

Examination Report for European Patent Application No. 16166907.2 mailed Dec. 19, 2019, 6 Pages.

Office Communication for U.S. Appl. No. 15/585,887 mailed Jan. 26, 2024, 44 Pages.

Office Communication for U.S. Appl. No. 17/516,063 mailed Feb. 7, 2024, 11 Pages.

Office Communication for U.S. Appl. No. 17/826,011 mailed Feb. 16, 2024, 6 Pages.

(56) References Cited

OTHER PUBLICATIONS

Office Communication for U.S. Appl. No. 17/516,529 mailed Feb. 29, 2024, 20 Pages.
Office Communication for U.S. Appl. No. 15/207,213 mailed Feb. 23, 2017, 24 Pages.
Office Communication for U.S. Appl. No. 15/207,213 mailed Jun. 1, 2017, 24 Pages.
Office Communication for U.S. Appl. No. 15/207,213 mailed May 8, 2017, 6 Pages.
Office Communication for U.S. Appl. No. 15/207,213 mailed Oct. 25, 2016, 18 Pages.
Office Communication for U.S. Appl. No. 15/219,016 mailed Mar. 16, 2017, 9 Pages.
Office Communication for U.S. Appl. No. 15/289,760 mailed Dec. 12, 2016, 12 Pages.
Office Communication for U.S. Appl. No. 15/356,381 mailed Jan. 6, 2017, 57 Pages.
Office Communication for U.S. Appl. No. 15/356,381 mailed Jul. 3, 2017, 21 Pages.
Office Communication for U.S. Appl. No. 15/443,868 mailed Apr. 27, 2017, 7 Pages.
Office Communication for U.S. Appl. No. 15/457,886 mailed Jul. 18, 2018, 11 Pages.
Office Communication for U.S. Appl. No. 15/457,886 mailed Mar. 20, 2019, 9 Pages.
Office Communication for U.S. Appl. No. 15/466,248 mailed Jan. 11, 2018, 2 Pages.
Office Communication for U.S. Appl. No. 15/466,248 mailed Jul. 11, 2018, 31 Pages.
Office Communication for U.S. Appl. No. 15/466,248 mailed Jun. 5, 2017, 30 Pages.
Office Communication for U.S. Appl. No. 15/466,248 mailed Mar. 8, 2018, 34 Pages.
Office Communication for U.S. Appl. No. 15/466,248 mailed May 16, 2019, 33 Pages.
Office Communication for U.S. Appl. No. 15/466,248 mailed Oct. 18, 2018, 31 Pages.
Office Communication for U.S. Appl. No. 15/466,248 mailed Oct. 3, 2017, 34 Pages.
Office Communication for U.S. Appl. No. 15/466,248 mailed Sep. 10, 2019, 27 Pages.
Office Communication for U.S. Appl. No. 15/585,887 mailed Aug. 17, 2021, 41 Pages.
Office Communication for U.S. Appl. No. 15/585,887 mailed Dec. 22, 2022, 38 Pages.
Office Communication for U.S. Appl. No. 15/585,887 mailed Jan. 22, 2020, 28 Pages.
Office Communication for U.S. Appl. No. 15/585,887 mailed Jun. 27, 2017, 24 Pages.
Office Communication for U.S. Appl. No. 15/585,887 mailed Jun. 7, 2023, 43 pages.
Office Communication for U.S. Appl. No. 15/585,887 mailed Mar. 20, 2019, 26 Pages.
Office Communication for U.S. Appl. No. 15/585,887 mailed Mar. 24, 2022, 40 Pages.
Office Communication for U.S. Appl. No. 15/585,887 mailed Mar. 26, 2021, 31 Pages.
Office Communication for U.S. Appl. No. 15/585,887 mailed Nov. 2, 2021, 4 Pages.
Office Communication for U.S. Appl. No. 15/585,887 mailed Nov. 21, 2022, 6 Pages.
Office Communication for U.S. Appl. No. 15/585,887 mailed Nov. 28, 2017, 23 Pages.
Office Communication for U.S. Appl. No. 15/585,887 mailed Sep. 1, 2022, 39 Pages.
Office Communication for U.S. Appl. No. 15/671,060 mailed May 8, 2019, 19 Pages.
Office Communication for U.S. Appl. No. 15/675,216 mailed Aug. 28, 2018, 14 Pages.

Office Communication for U.S. Appl. No. 15/675,216 mailed Jan. 29, 2019, 8 Pages.
Office Communication for U.S. Appl. No. 15/675,216 mailed Jun. 7, 2018, 4 Pages.
Office Communication for U.S. Appl. No. 15/675,216 mailed Nov. 20, 2017, 7 Pages.
Office Communication for U.S. Appl. No. 15/690,135 mailed Jan. 18, 2018, 6 Pages.
Office Communication for U.S. Appl. No. 15/690,135 mailed May 22, 2018, 7 Pages.
Office Communication for U.S. Appl. No. 15/855,769 mailed Feb. 5, 2019, 10 Pages.
Office Communication for U.S. Appl. No. 15/891,273 mailed Jan. 15, 2019, 23 Pages.
Office Communication for U.S. Appl. No. 15/891,273 mailed Jun. 19, 2018, 20 Pages.
Office Communication for U.S. Appl. No. 15/891,273 mailed May 28, 2019, 14 Pages.
Office Communication for U.S. Appl. No. 15/891,311 mailed Apr. 23, 2018, 18 Pages.
Office Communication for U.S. Appl. No. 15/891,311 mailed Jan. 29, 2019, 8 Pages.
Office Communication for U.S. Appl. No. 15/891,311 mailed Sep. 24, 2018, 14 Pages.
Office Communication for U.S. Appl. No. 15/892,327 mailed Apr. 23, 2018, 6 Pages.
Office Communication for U.S. Appl. No. 15/971,843 mailed Jul. 28, 2021, 9 Pages.
Office Communication for U.S. Appl. No. 15/971,843 mailed Mar. 26, 2020, 14 Pages.
Office Communication for U.S. Appl. No. 15/971,843 mailed May 5, 2021, 9 Pages.
Office Communication for U.S. Appl. No. 15/971,843 mailed Oct. 22, 2019, 15 Pages.
Office Communication for U.S. Appl. No. 15/585,887 mailed May 3, 2024, 45 Pages.
Office Communication for U.S. Appl. No. 17/516,063 mailed Apr. 19, 2024, 4 Pages.
Office Communication for U.S. Appl. No. 15/585,887 mailed Jun. 7, 2024, 4 Pages.
Office Communication for U.S. Appl. No. 17/516,063 mailed Jun. 4, 2024, 13 Pages.
Office Communication for U.S. Appl. No. 17/516,529 mailed Jul. 2, 2024, 12 Pages.
Office Communication for U.S. Appl. No. 17/826,011 mailed Jul. 8, 2024, 12 Pages.
Office Communication for U.S. Appl. No. 15/585,887 mailed Aug. 15, 2024, 45 Pages.
Extended European Search Report for European Patent Application No. 21873430.9 mailed Sep. 16, 2024, 14 Pages.
Perez Eloy, "Kerberos (I): How does Kerberos work?—Theory", Mar. 20, 2019, BlackArrow, Tarlogic, Available online at <https://www.tarlogic.com/blog/how-kerberos-works/>, 23 pages.
Office Communication for U.S. Appl. No. 17/516,063 mailed Oct. 17, 2024, 13 Pages.
Office Communication for U.S. Appl. No. 17/826,011 mailed Oct. 24, 2024, 7 Pages.
Office Communication for U.S. Appl. No. 18/901,801 mailed Nov. 21, 2024, 21 Pages.
Office Communication for U.S. Appl. No. 15/585,887 mailed Jan. 15, 2025, 46 Pages.
Office Communication for U.S. Appl. No. 17/516,063 mailed Feb. 4, 2025, 7 Pages.
Office Communication for U.S. Appl. No. 17/516,063 mailed Jan. 6, 2025, 4 Pages.
Office Communication for U.S. Appl. No. 18/901,801 mailed Mar. 5, 2025, 12 Pages.
Office Communication for U.S. Appl. No. 15/585,887 mailed Apr. 10, 2025, 3 Pages.
Office Communication for U.S. Appl. No. 19/181,210 mailed Jun. 24, 2025, 21 Pages.
Office Communication for U.S. Appl. No. 15/585,887 mailed Aug. 1, 2025, 45 Pages.

(56) References Cited

OTHER PUBLICATIONS

Office Communication for U.S. Appl. No. 18/530,616 mailed Aug. 21, 2025, 12 Pages.
Office Communication for U.S. Appl. No. 19/181,210 mailed Oct. 22, 2025, 10 Pages.
Office Communication for U.S. Appl. No. 15/585,887 mailed Jan. 12, 2026, 46 Pages.
Office Communication for U.S. Appl. No. 19/364,763 mailed Dec. 11, 2025, 17 Pages.
Office Communication for U.S. Appl. No. 18/530,616 mailed Feb. 10, 2026, 9 Pages.

* cited by examiner

Figure 3:
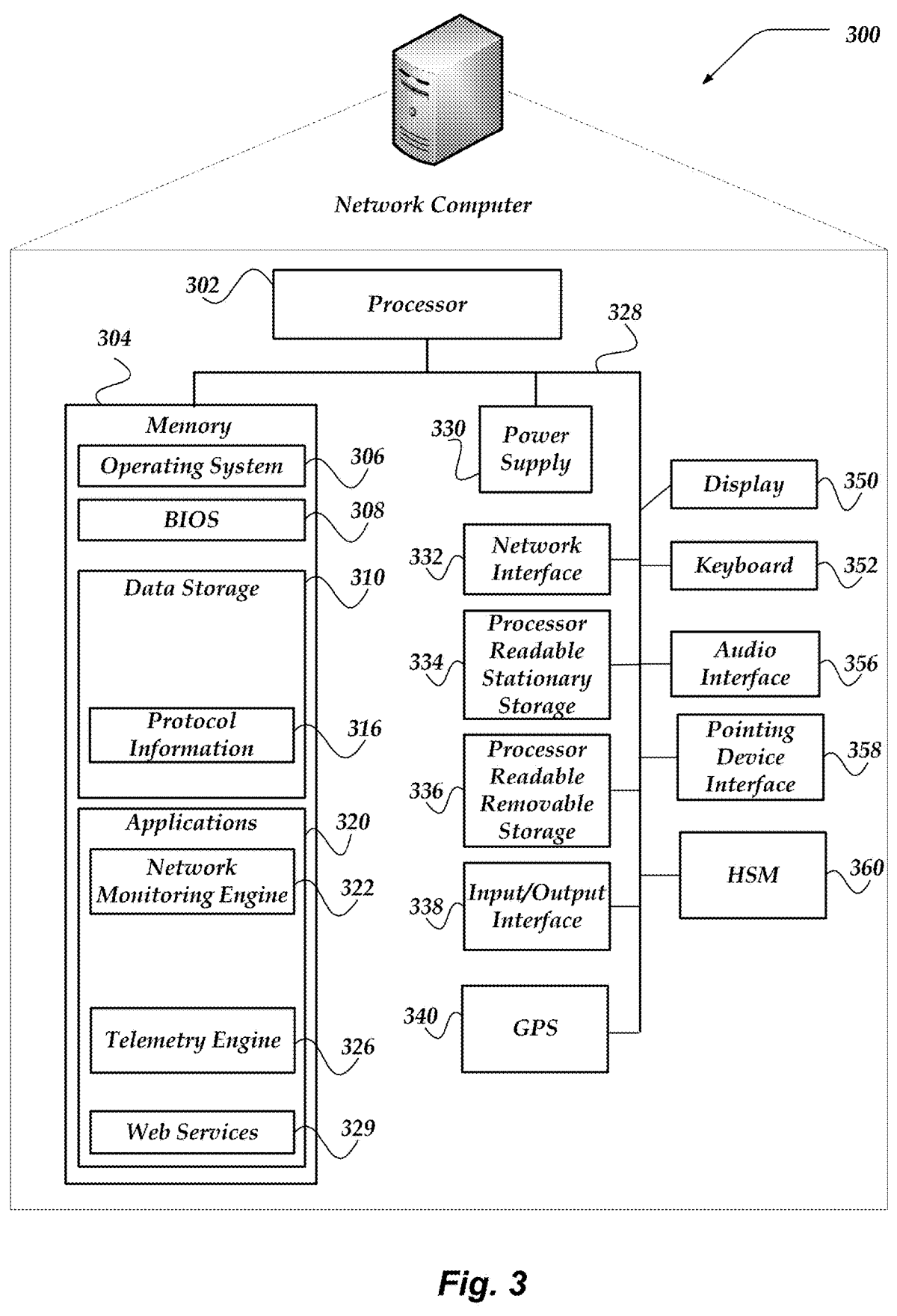

Network Computer

302 — Processor

328

304 — Memory

Operating System — 306

BIOS — 308

Data Storage — 310

Protocol Information — 316

Applications — 320

Network Monitoring Engine — 322

Telemetry Engine — 326

Web Services — 329

330 — Power Supply

332 — Network Interface

334 — Processor Readable Stationary Storage

336 — Processor Readable Removable Storage

338 — Input/Output Interface

340 — GPS

Display — 350

Keyboard — 352

Audio Interface — 356

Pointing Device Interface — 358

HSM — 360

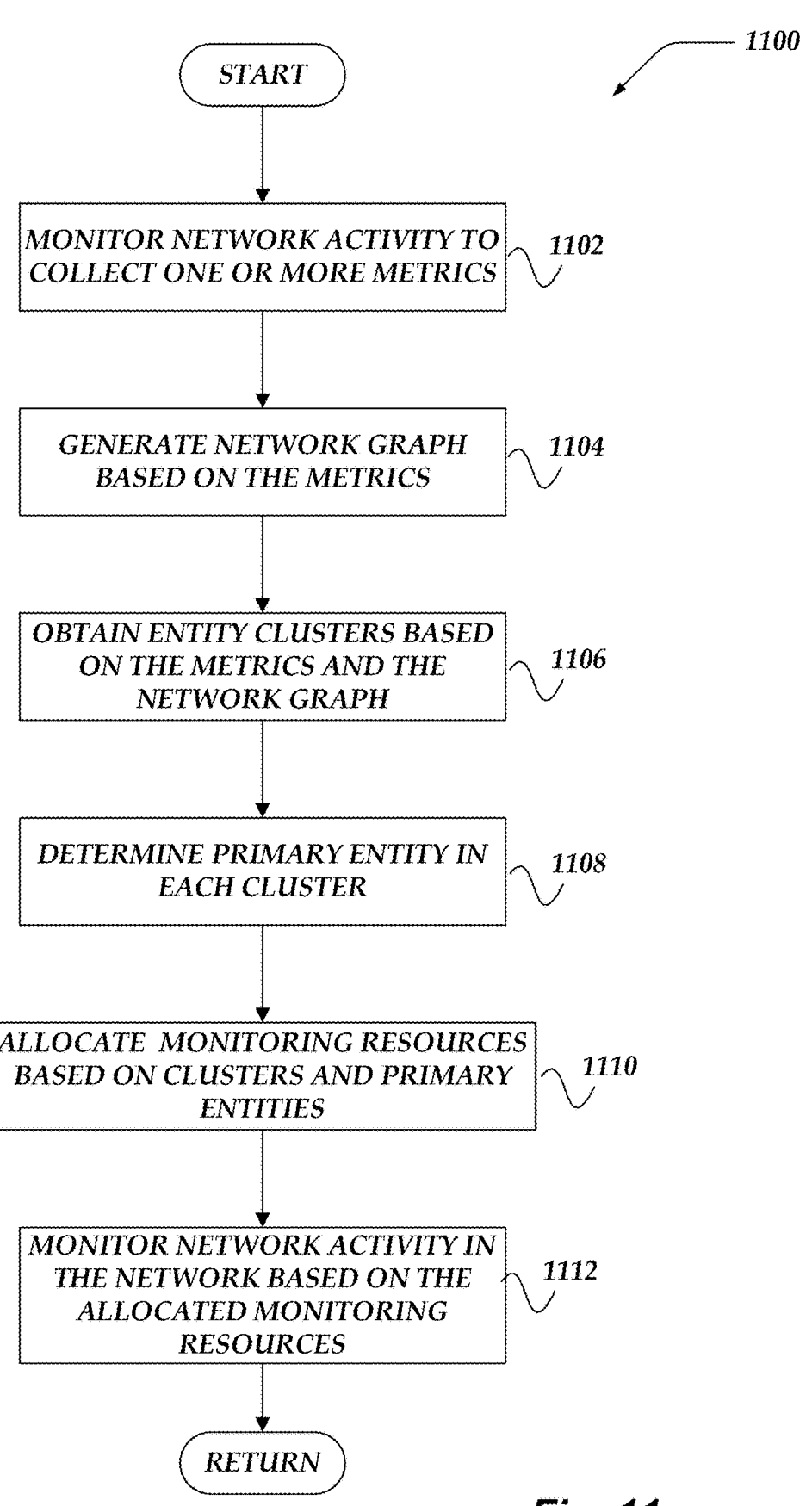

*1100*

START

MONITOR NETWORK ACTIVITY TO COLLECT ONE OR MORE METRICS ~ *1102*

GENERATE NETWORK GRAPH BASED ON THE METRICS ~ *1104*

OBTAIN ENTITY CLUSTERS BASED ON THE METRICS AND THE NETWORK GRAPH ~ *1106*

DETERMINE PRIMARY ENTITY IN EACH CLUSTER ~ *1108*

ALLOCATE MONITORING RESOURCES BASED ON CLUSTERS AND PRIMARY ENTITIES ~ *1110*

MONITOR NETWORK ACTIVITY IN THE NETWORK BASED ON THE ALLOCATED MONITORING RESOURCES ~ *1112*

RETURN

START

MONITOR USER INTERACTIONS WITH NETWORK MONITORING ENGINE    *1402*

MONITOR DISPLAY ORIENTATION/CHARACTERISTICS    *1404*

GENERATE TELEMETRY INFORMATION AND TELEMETRY METRICS    *1406*

PROVIDE TELEMETRY INFORMATION AND TELEMETRY METRICS    *1408*

MODIFY VISUAL APPEARANCE OF USER INTERFACE(S) BASED ON TELEMETRY INFORMATION OR TELEMETRY METRICS    *1410*

NO    TERMINATE?    *1412*

YES

RETURN

RANKING ENTITY IMPORTANCE VIA NETWORK MONITORING

TECHNICAL FIELD

The present invention relates generally to network monitoring, and more particularly, but not exclusively, to ranking entity importance via network monitoring.

BACKGROUND

In most computer networks, bits of data arranged in bytes are packaged into collections of bytes called packets. These packets are generally communicated between computing devices over networks in a wired or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from seven to four, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software entity running on the client or server. In virtual environments, port mirroring may be performed on a virtual switch that is incorporated within the hypervisor.

Increasingly, organizations may be selectively applying threat detection/network monitoring resources for various reasons, such as performance impacts, costs, or the like. However, such ad hoc selection criteria or selection methods may introduce disadvantages based on biases, low information, or the like. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 3 illustrates a schematic embodiment of a network computer;

FIG. 11 illustrates an overview flowchart of a process for ranking entity importance via network monitoring in accordance with one or more of the various embodiments;

DETAILED DESCRIPTION OF VARIOUS EMBODIMENTS

Figure 1:
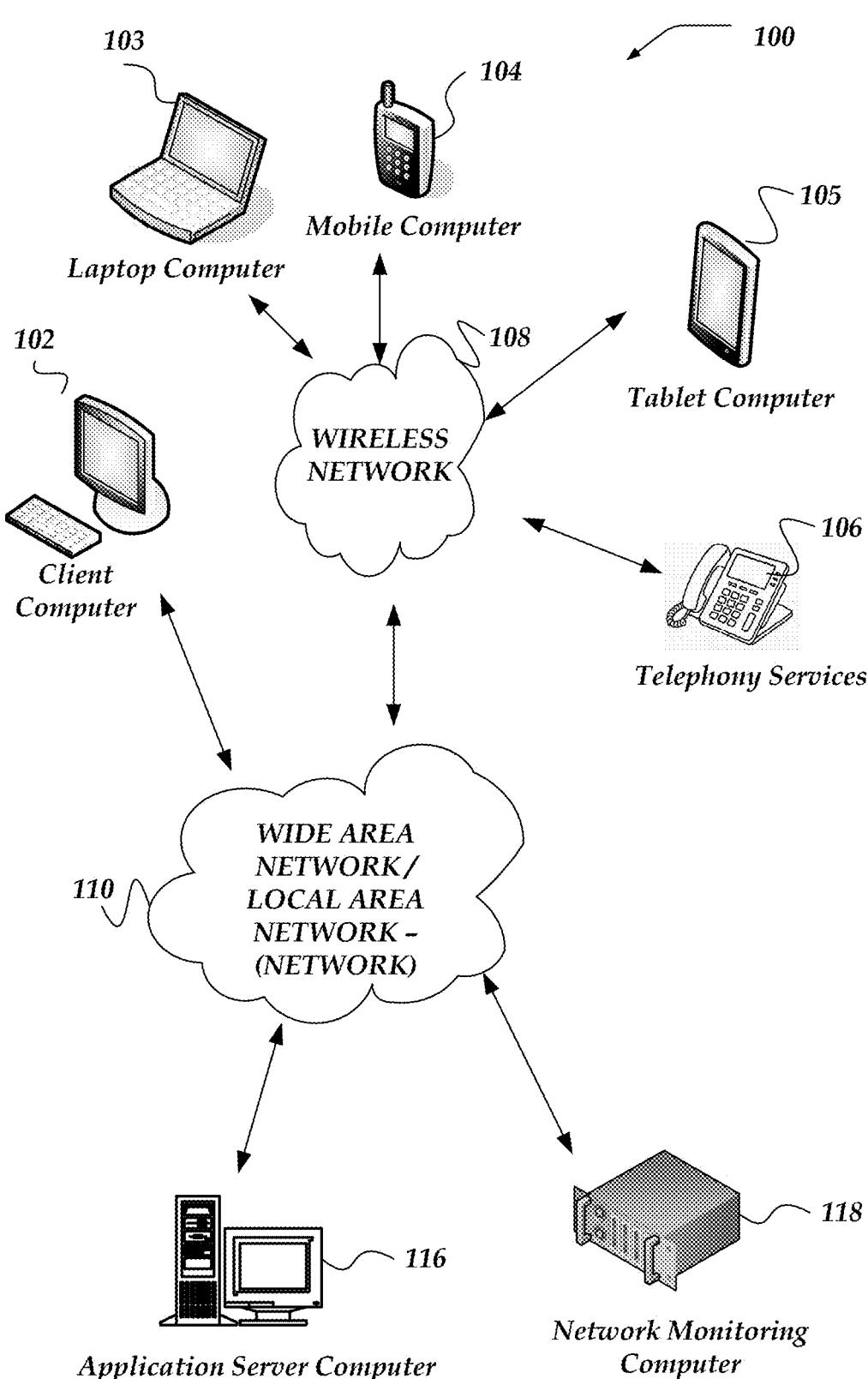
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In one or more of the various embodiments, flows may be useful if one or more of the endpoints of a session may be behind a network traffic management device, such as a firewall, switch, router, load balancer, or the like. In one or more of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like. In cases, related flows may be flows in different networks or network segments that may be associated with the same user, application, client computer, source, destination, or the like.

As used herein, the terms "network monitor", "network monitoring engine," "network monitoring computer", or "NMC" refer to an application (software, hardware, or some combination) that is arranged to monitor and record flows of packets in communication with at least two endpoints over at least one network. NMCs may provide information for assessing different aspects of these monitored flows. In one or more embodiments, NMCs may passively monitor network packet traffic without participating in the communication protocols. This monitoring may be performed for a variety of reasons, including troubleshooting and proactive remediation, anomaly detection, end-user experience monitoring, SLA monitoring, capacity planning, application lifecycle management, infrastructure change management, infrastructure optimization, business intelligence, security, regulatory compliance, or the like. NMCs may receive network communication for monitoring through a variety of means including network taps, wireless receivers, port mirrors or directed tunnels from network switches, clients or servers that include the endpoints themselves, or other infrastructure devices. In at least some of the various embodiments, NMCs may receive a copy of each packet on particular network segments or virtual local area networks (VLANs). Also, for at least some of the various embodiments, NMCs may receive these packet copies through port mirrors on managed Ethernet switches, e.g., Switched Port Analyzers (SPANs) port, Roving Analysis Ports (RAPs), or the like, or combination thereof. Port mirroring may enable analysis and debugging of network communications. Port mirroring may be performed for inbound or outbound traffic (or both) on single or multiple interfaces.

NMCs may track network connections from and to end points such as a client or a server. NMCs may also extract information from network packets including protocol information at various layers of communication protocol stacks. NMCs may reassemble or reconstruct the stream of data exchanged between the endpoints. In some cases, NMCs may perform decryption of the payload at various layers of the protocol stack. NMCs may passively monitor the network traffic, or it may participate in the protocols as a proxy. NMCs may attempt to classify the network traffic based on the communication protocols that are used.

NMCs may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, NMCs may use adaptive protocol classification techniques where information used to classify the protocols may be accumulated or applied over time to further classify the observed protocols. In some embodiments, NMCs may be arranged to employ stateful analysis. Accordingly, for each supported protocol, NMCs may use network packet payload data to drive a state machine that mimics the protocol state changes in the client/server flows being monitored. NMCs may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In addition, in one or more of the various embodiments, NMCs or NMC functionality may be implemented using hardware or software based proxy devices that may be arranged to intercept network traffic in the monitored networks rather than being restricted to passive (pass through) monitoring.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicate data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "entity" refers to an actor in the monitored network. Entities may include applications, services, programs, processes, network devices, network computers, client computers, or the like, operating in the monitored network. For example, individual entities may include, web clients, web servers, database clients, database servers, mobile app clients, payment processors, groupware clients, groupware services, or the like. In some cases, multiple entities may co-exist on or in the same network computer, process, application, compute container, or cloud compute instance.

As used herein, the term "observation port" refers to network taps, wireless receivers, port mirrors or directed tunnels from network switches, clients or servers, virtual machines, cloud computing instances, other network infrastructure devices or processes, or the like, or combination thereof. Observation ports may provide a copy of each network packet included in wire traffic on a particular network segment or virtual local area network (VLAN). Also, for at least some of the various embodiments, observation ports may provide NMCs network packet copies through a port mirror on a managed Ethernet switch, e.g., a Switched Port Analyzer (SPAN) port, or a Roving Analysis Port (RAP).

As used herein, the term, "protocol" refers generally to network protocols that may be employed in a network, including data-link layer protocols, transport layer protocols, application layer protocols, or the like. Thus, unless otherwise indicated, innovations described as working with or being associated with a protocol may be applicable to protocols of various OSI layers, or the like, or combination thereof.

As used herein, the term "capture flow" refers to a network flow as observed or captured by an NMC. NMCs may capture network traffic from observed network flows. Accordingly, capture flows correspond to observed network flows. The distinction between network flows and capture flows is that NMCs do not directly participate in the connection or session associated with the network traffic of network flows. Rather, capture flows represent network traffic captured or observed from one or more network flows.

As used herein, the term "monitoring resources," or "network monitoring resources" refer to actual NMCs, monitoring agents, capture agents, or the like used to monitor network activity. Also, they may refer different operations, actions, filters, or the like directed to monitor activity or interactions associated with various entities in a monitored network. Monitoring resources may be allocated to different entities based on various criteria described below.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the innovations disclosed herein to provide a basic understanding of some aspects of these innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to ranking entity importance using network monitoring. In one or more of the various embodiments, one or more monitoring resources may be allocated to obtain a graph of a network based on a first portion of a plurality of metrics associated with the network such that each node of the graph corresponds to an entity in the network and each edge in the graph corresponds to a relationship between two or more entities.

In one or more of the various embodiments, one or more clusters in the graph may be obtained based on one or more traversals of the graph.

In one or more of the various embodiments, a primary node for each cluster in the graph may be collected based on one or more characteristics of the cluster.

In one or more of the various embodiments, one or more other monitoring resources may be allocated to obtain a second portion of the plurality of metrics associated with each primary node in the graph. In one or more of the various embodiments, a user interface that includes one or more display panels for content that includes information associated with the monitoring of network traffic may be obtained such that the content may be dynamically transformed or arranged for display to a user based on one or more of user interaction telemetry, user feedback telemetry metrics, or the like.

In one or more of the various embodiments, obtaining the one or more clusters may include, employing the one or more traversals of the graph to visit each cluster in the graph to perform further actions, including: collecting one or more candidate clusters that may be adjacent to the visited cluster based on the one or more traversals; obtaining a combined candidate cluster that includes each node in the visited cluster and each node in the one or more adjacent clusters such that a clustering score may be obtained for the combined candidate cluster; converting the combined candidate cluster to a new cluster based on the clustering score exceeding a threshold value such that the one or more candidate clusters and the visited cluster may be combined in the new cluster; or the like.

In one or more of the various embodiments, one or more baseline cluster configurations for the network may be obtained based on one or more previous time periods. In some embodiments, one or more deviation metrics may be obtained based on comparing the one or more clusters to the one or more baseline cluster configurations. In some embodiments, one or more anomaly indicators associated with the one or more deviation metrics that exceed one or more threshold values may be obtained.

In one or more of the various embodiments, one or more subsequent clusters in the graph may be obtained based on one or more additional traversals of the graph at a later time period. In some embodiments, one or more differences between the one or more clusters and the one or more subsequent clusters may be collected. In some embodiments, one or more alerts associated with the one or more differences that exceed one or more threshold values may be obtained.

In one or more of the various embodiments, obtaining the one or more clusters may include using one or more of a Louvain clustering algorithm, a Leiden clustering algorithm, a Girvan-Newman clustering algorithm, a modularity-based clustering algorithm, or the like to partition the graph into the one or more clusters.

In one or more of the various embodiments, collecting the primary node for each cluster may include: obtaining one or more centrality scores for each node in the cluster based on one or more characteristics of the node within the cluster; ranking each node in the cluster based on the one or more centrality scores; collecting the primary node based on the node associated with a highest centrality score in the cluster; or the like.

In one or more of the various embodiments, one or more secondary nodes in each cluster may be obtained based on one or more centrality scores that may be lower than a centrality score of the primary node. In some embodiments, intermediate monitoring resources may be allocated to the one or more secondary nodes such that the intermediate monitoring resources may include fewer monitoring resources than the other monitoring resources allocated to the primary node.

In one or more of the various embodiments, plurality of metrics may include one or more of a connection count between entities, a data volume exchanged between entities, a communication frequency pattern between entities, a protocol usage pattern between entities, a session duration between entities, an edge weight representing a relationship strength between entities, or the like.

In one or more of the various embodiments, one or more inter-cluster metrics that measure interactions between entities in different clusters may be obtained. In some embodiments, one or more anomalous interaction patterns may be obtained based on the one or more inter-cluster metrics exceeding one or more threshold values. In some embodiments, one or more events associated with one or more entities involved in the one or more anomalous interaction patterns may be obtained.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)-(network) 110, wireless network 108, client computers 102-105, telephony services 106, application server computer 116, network monitoring computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, network monitoring computer 118, or other computers.

Client computers 102-105 may further be configured to include a client application that enables an end-user to log into an end-user account that may be managed by another computer, such as application server computer 116, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to network monitoring computer 118. Also, client computers may be arranged to enable users to display reports, interactive user-interfaces, results provided by network monitor computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Telephony services 106 may represent various telephony systems that may be in use in organizations. Telephony services 106 may include conventional POTS, digital telephony systems, Voice-Over-Internet Protocol (VOIP) telephony services, or the like.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. One embodiment of network monitoring computer 118 is described in more detail below in conjunction with FIG. 3. Although FIG. 1 illustrates application server computer 116, and network monitoring computer 118, each as a single computer, the innovations or embodiments are not so limited. For example, one or more functions of application server computer 116, network monitoring computer 118, or the like, may be distributed across one or more distinct network computers. Moreover, in one or more embodiments, network monitoring computer 118 may be implemented using a plurality of network computers. Further, in one or more of the various embodiments, application server computer 116, or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
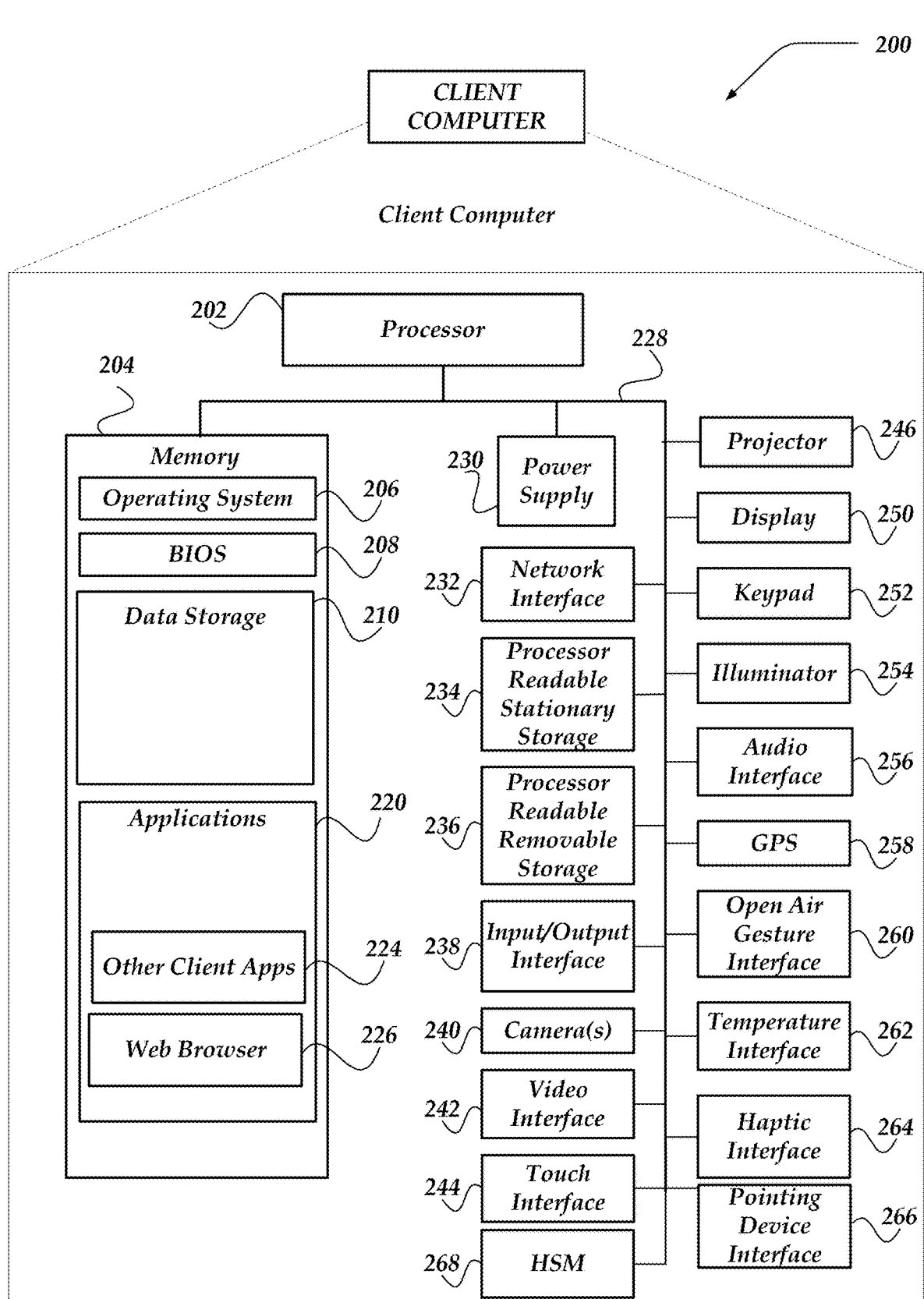
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like. Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like.

Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client's computer browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers or network monitoring computers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the micro-controllers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300. In some embodiments, processor-readable stationary storage device 334 or processor-readable removable storage device 336 may be considered a processor or computer readable non-transitory storage media that includes instructions configured such that execution of the instructions by one or more processors on one or more network computers performs actions described herein.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, network monitoring engine 322, telemetry engine 326, web services 329, or the like, may be arranged to employ geo-location information to select one or more localization features, such as, time zones, languages, currencies, calendar formatting, or the like. Also, localization features may be used when interpreting network traffic, monitoring application protocols, user-interfaces, generating reports, monitoring networks in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, protocol information 316, or the like. Protocol information 316 may store various rules or configuration information related to one or more network communication protocols, including application protocols, secure communication protocols, client-server protocols, peer-to-peer protocols, shared file system protocols, protocol state machines, or the like, that may be employed for protocol analysis, entity auto-discovery, anomaly detections, or the like, in a monitored network environment.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, telemetry engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, network monitoring engine 322, telemetry engine 326, web services 329, or the like, may be operative in a cloud-based computing environment. In one or more of the various embodiments, these applications, and others, that comprise a network monitoring computer may be executing within virtual machines or virtual servers that may be managed in a cloud-based based computing environment. In one or more of the various embodiments, in this context the applications may flow from one physical network computer within cloud-based environment to another depending on performance and scaling considerations automatically managed by the cloud computing environment. Likewise, in one or more of the various embodiments, virtual machines or virtual servers dedicated to network monitoring engine 322, telemetry engine 326, web services 329, or the like, may be provisioned and de-commissioned automatically.

Also, in one or more of the various embodiments, network monitoring engine 322, telemetry engine 326, web services 329, or the like, may be located in virtual servers running in a cloud-based computing environment rather than being tied to one or more specific physical network computers. Likewise, in some embodiments, one or more of network monitoring engine 322 telemetry engine 326, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
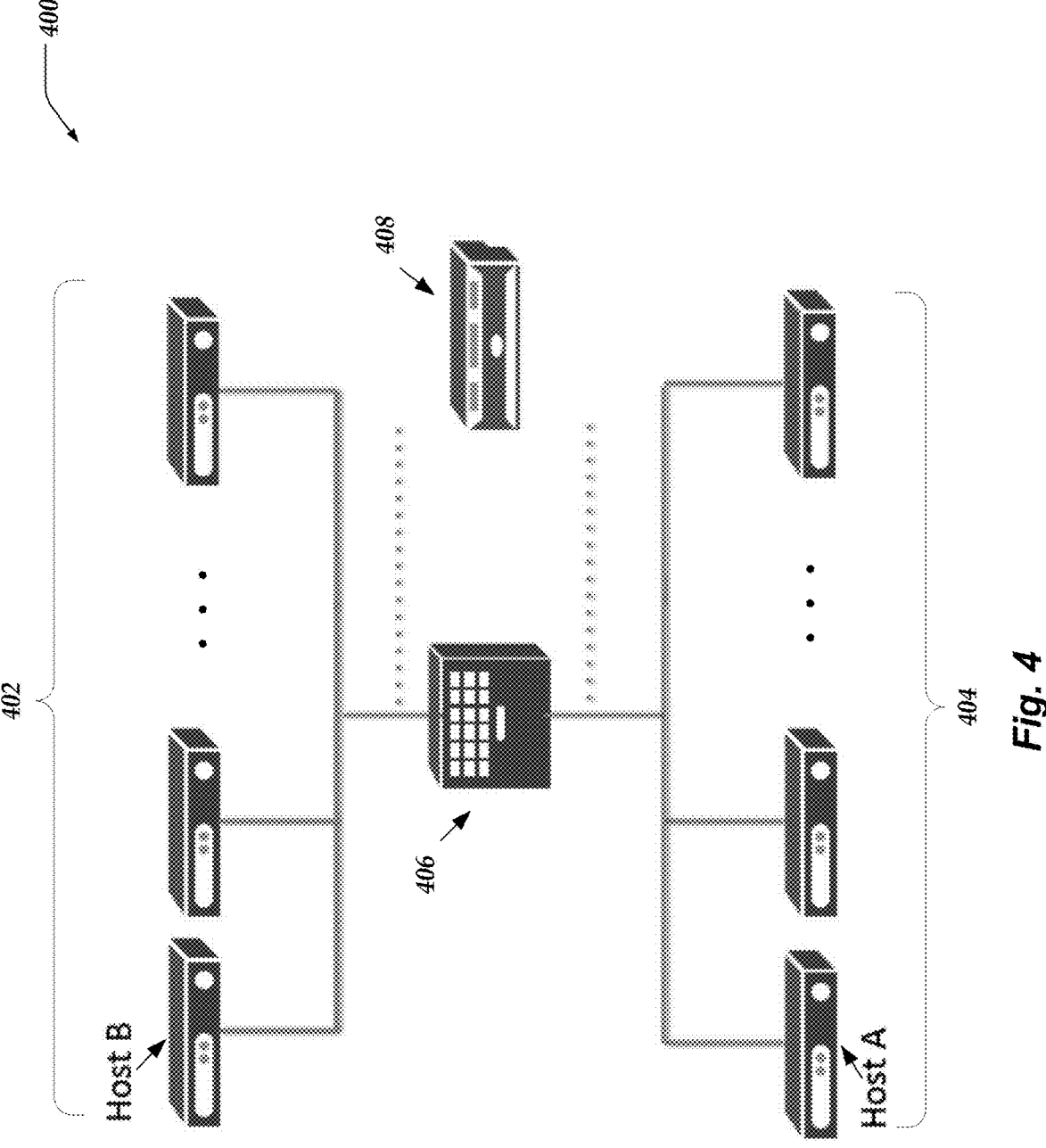
FIG. 4 illustrates a logical architecture of a system for ranking entity importance via network monitoring in accordance with one or more of the various embodiments.

FIG. 4 illustrates a logical architecture of system 400 for ranking entity importance via network monitoring in accordance with one or more of the various embodiments. System 400 may be arranged to include a plurality of network devices or network computers on first network 402 and a plurality of network devices or network computers on second network 404. In this example. communication between the first network and the second network is managed by switch 406. Also, NMC 408 may be arranged to passively monitor or record packets (network traffic) that are communicated in network flows between network devices or network computers on first network 402 and second network 404. For example, the communication of flows of packets between the Host B network computer and the Host A network computer are managed by switch 406 and NMC 408 may be passively monitoring or recording some or all of the network traffic comprising these flows.

NMC 408 may be arranged to receive network communication for monitoring through a variety of means including network taps, wireless receivers, port mirrors or directed tunnels from network switches, clients or servers including the endpoints themselves, virtual machine, cloud computing instances, other network infrastructure devices, or the like, or combination thereof. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. For example, in some embodiments, NMCs may be arranged to receive electronic signals over or via a physical hardware sensor that passively receives taps into the electronic signals that travel over the physical wires of one or more networks.

In one or more of the various embodiments, NMCs, such as, NMC 408 may be arranged to generate or collect various metrics associated with monitored network traffic. Also, in one or more of the various embodiments, NMCs, such as, NMC 408 may be arranged to analyze some or all of the monitored network traffic to determine metrics or other characteristics associated with applications, services, endpoints, or the like, that may be associated with the monitored network traffic.

In some embodiments, network monitoring engine may be arranged to enable the scope or definition of what may be considered an entity. In some embodiments, network monitoring engines may be configured to define entities to include virtual computers, physical computers, storage systems, various network devices, cloud compute instances, cloud storage endpoints, or the like. Also, in some embodiments, network monitoring engines may be configured to define entities to represent particular applications or services as well. In some embodiments, entities may be defined to represent devices, computers, applications, services, or the like such that an entity such as physical server may host one or more other entities such as applications.

In some embodiments, network monitoring engines may be arranged to provide more than one level or tier of monitoring such that different tiers may be allocated different levels of monitoring resources. For brevity and clarity, monitoring tiers may be described as hierarchical with respect to depth or detail of monitoring such that more in-depth monitoring that is associated with a tier, the more monitoring resources may be allocated to the that tier. For example, a highest tier of monitoring may be considered to have the most in-depth or complete monitoring such that is also take the most monitoring resources. Accordingly, one of ordinary skill in the art will appreciate the organizations may arbitrarily rank tiers based on different features, such as the type of monitoring (e.g., passive monitoring, proxy-based monitoring, or the like), amount of network traffic that may be captured, rate of sampling or data capture, type of sampling, type of protocols, number of protocols being monitored, or the like. Thus, herein for brevity and clarity, a tier of monitoring described as being higher or greater than another tier of monitoring may be assumed to represent a monitoring configuration that consumes more monitoring resources than another monitoring configuration. Further, in some cases, higher tiers of monitoring may be referred to as enhanced monitoring, advanced monitoring, or the like.

In some embodiments, network monitoring engines may be arranged to evaluate network activity in a network to collect one or more metrics that may be used for determining relationships between entities in the monitored network. In some embodiments, network monitoring engines may be arranged to employ one or more of these metrics to 1) establish a relationship graph of one or more entities in the monitored network; and 2) determine two or more clusters in the graph based on the one or more metrics (relationships).

In some embodiments, network monitoring engine may be configured to use lightweight or low resource monitoring methods to collect metrics for establishing the network graph. In some embodiments, network monitoring engine may be configured to use a particular metric based on local circumstances or local requirements. Accordingly, in some embodiments, network monitoring engine may be arranged to determine the metrics or monitoring methods for establishing the network graph based on configuration information. However, it may be assumed that nodes in the network may be associated with one or more entities and edges may be associated with one or more relationships based on metrics collected by network monitoring engines.

Figure 5:
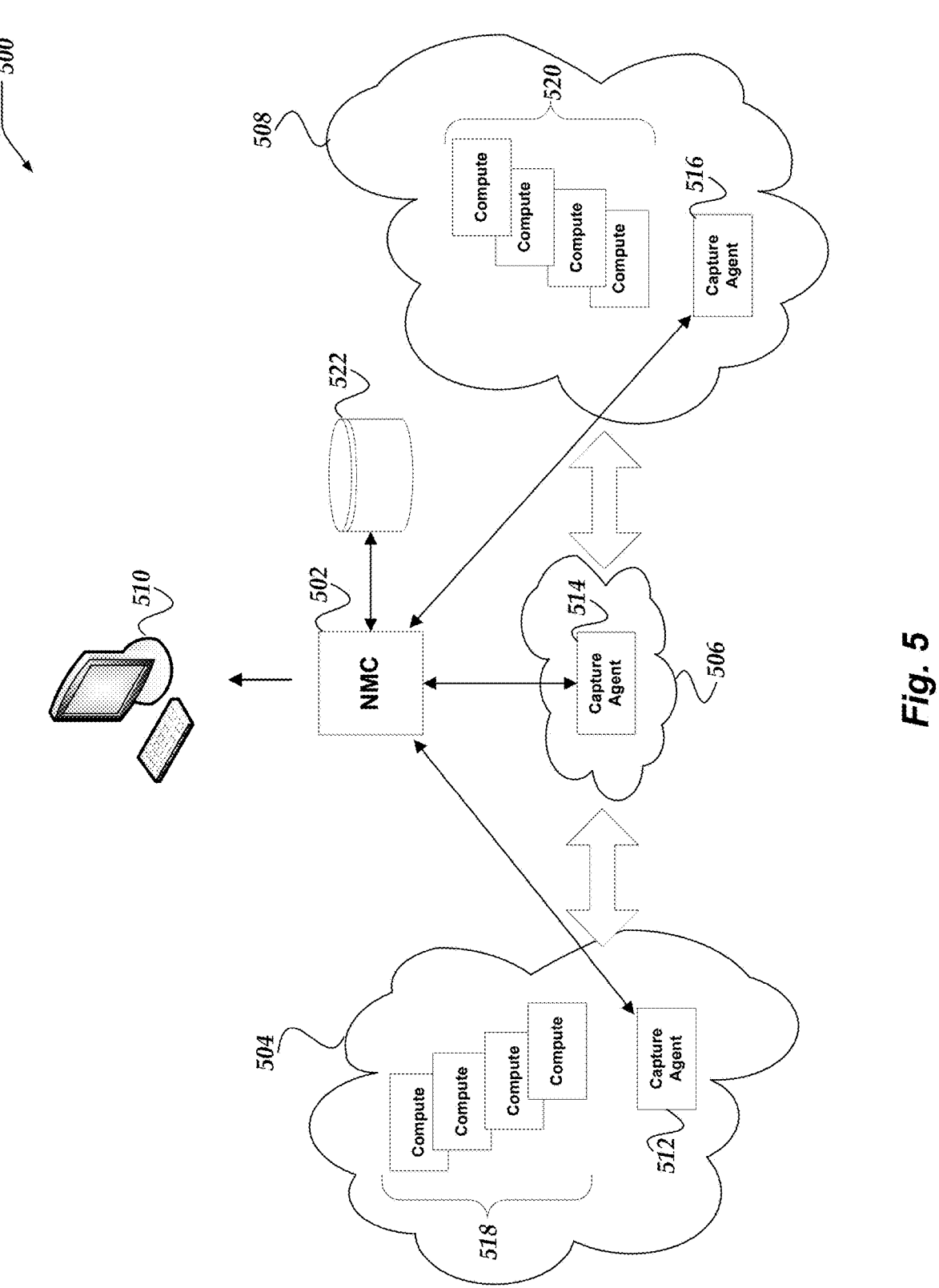
FIG. 5 illustrates a logical schematic of a system for ranking entity importance via network monitoring in accordance with one or more of the various embodiments.

FIG. 5 illustrates a logical schematic of system 500 for ranking entity importance via network monitoring in accordance with one or more of the various embodiments. In one or more of the various embodiments, an NMC, such as NMC 502 may be arranged to monitor network traffic in one or more networks, such as, network 504, network 506, or network 508. In this example, network 504, network 506, or network 508 may be considered similar to network 108 or network 110. Also, in some embodiments, one or more of network 504, network 506, or network 508 may be considered cloud computing environments. Likewise, in some embodiments, one or more of network 504, network 506, or network 508 may be considered remote data centers, local data centers, co-location computing environments, or the like, or combination thereof.

In one or more of the various embodiments, NMCs, such as NMC 502 may be arranged to communicate with one or more capture agents, such as, capture agent 512, capture agent 514, or capture agent 516. In some embodiments, capture agents may be arranged to selectively capture network traffic or collect network traffic metrics that may be provided to NMC 502 for additional analysis.

In one or more of the various embodiments, capture agents may be NMCs that may be distributed in various networks or cloud environments. For example, in some embodiments, a simplified system may include one or more NMCs that also provide capture agent services. In some embodiments, capture agents may be NMCs arranged to instantiate one or more capture engines to perform one or more capture or collection actions. Similarly, in one or more of the various embodiments, one or more capture agents may be instantiated or hosted separately from one or more NMCs.

In one or more of the various embodiments, capture agents may be selectively installed such that they may capture metrics for selected portions of the monitored networks. Also, in some embodiments, in networks that have groups or clusters of the same or similar entities, capture agents may be selectively installed on one or more entities that may be representative of entire groups or clusters of similar entities. Thus, in some embodiments, capture agents on the representative entities may collect metrics or traffic that may be used to infer the metrics or activity associated with similarly situated entities that do not include a capture agent.

Likewise, in one or more of the various embodiments, one or more capture agents may be installed or activated for a limited time period to collect information that may be used to infer activity information about the monitored networks. Accordingly, in one or more of the various embodiments, these one or more capture agents may be removed or de-activated if sufficient activity information or network traffic has been collected.

In one or more of the various embodiments, system 500 may include one or more network entities, such as, entities 518, entities 520, or the like, that communicate in or over one or more of the monitored networks. Entities 518 and entities 520 are illustrated here as cloud environment compute instances (e.g., virtual machines), or the like. However, one of ordinary skill in the art will appreciate that entities may be considered to be various network computers, network appliances, routers, switches, applications, services, containers, or the like, subject to network monitoring by one or more NMCs. (See, FIG. 4, as well).

In this example, for one or more of the various embodiments, capture agents, such as capture agent 512 may be to arranged capture network traffic or network traffic metrics associated with one or more entities, such as, entities 518. Accordingly, in some embodiments, some or all of the information captured by capture agents may be provided to one or more NMCs, such as, NMC 502 for additional analysis. Also, in one or more of the various embodiments, capture agents or NMCs may be arranged to selectively store network traffic in a captured data store, such as, captured data store 522. In one or more of the various embodiments, NMCs may be arranged to employ rules, pattern matching, machine learning models, instructions, parameter settings, threshold/trigger values, or the like, provided via configuration information for monitoring or capturing network traffic.

Further, in one or more of the various embodiments, one or more capture agents may be installed or hosted locally on one or more entities (not shown) rather than being installed or operated separately from the entities. Also, in some embodiments, one or more capture agents or portions thereof may be built-in to one or more entities such that the entity itself may be configured to capture network traffic or monitor network activity. Likewise, in some embodiments, NMC or portions thereof may be installed or hosted on entities. For example, a computer or compute instance may host a network monitoring engine rather than requiring a separate NMC.

Figure 6:
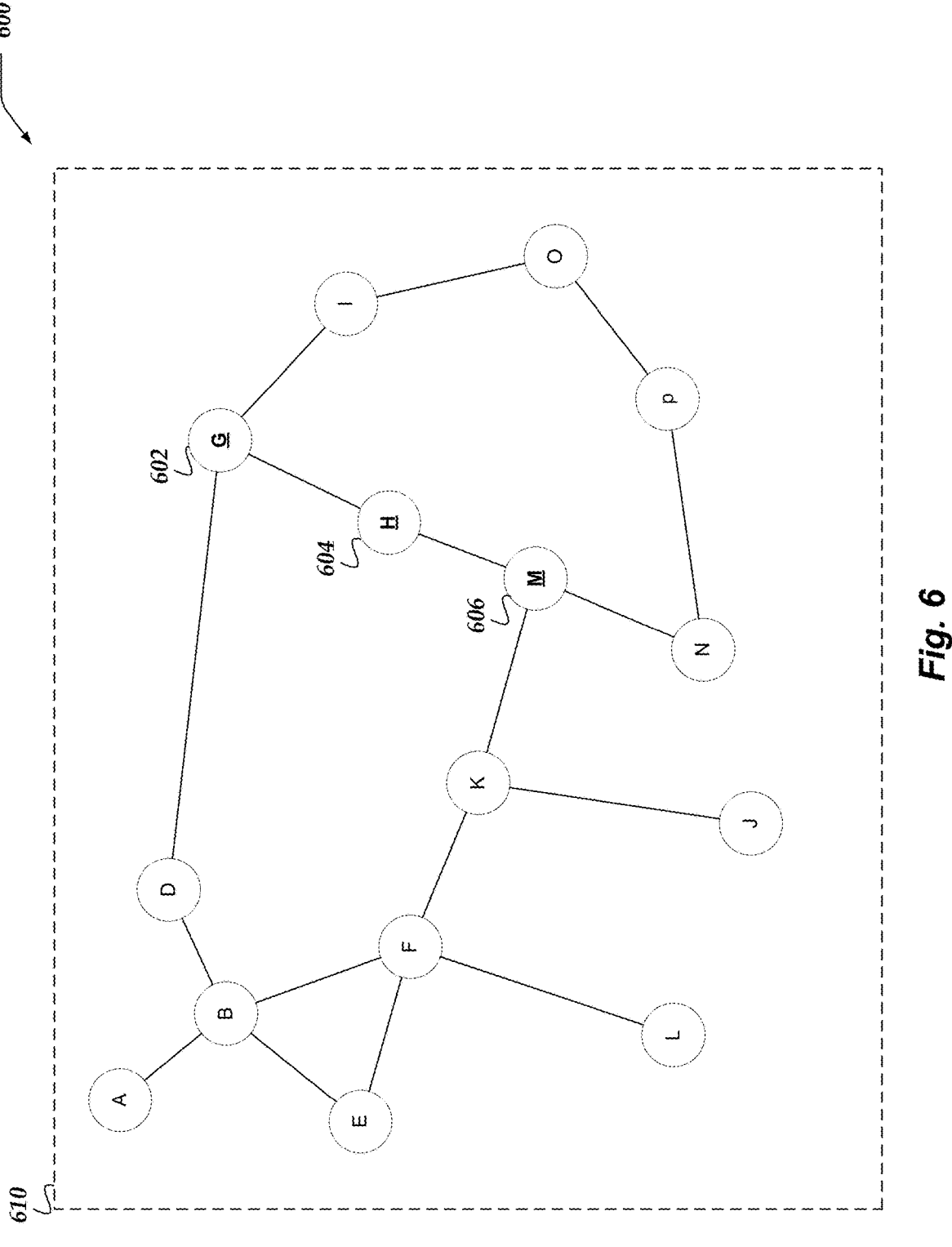
FIG. 6 illustrates a logical representation of a network for ranking entity importance via network monitoring in accordance with one or more of the various embodiments.

FIG. 6 illustrates a logical schematic of system 600 for ranking entity importance via network monitoring in accordance with one or more of the various embodiments.

For some embodiments, system 600 may represent a networking environment, such as network 610 that may be monitored by one or more NMCs. In this example, for some embodiments, system 600 may be represented as a graph, such that nodes in the graph represent entities in the monitored network environment the edges of the graph may represent one or more connectivity relationships between or among the entities in the network. For example, nodes, such as node 602, node 604, node 606, or the like may be considered to represent various entities in the network, such as web servers, authentication servers, database servers, firewalls, user workstations, file servers, directory services servers, point-of-sale computers, industrial machines, robots, or the like. Generally, in some embodiments, if an entity may have access to the network, it may be represented as a node in the graph.

Accordingly, in this example, for some embodiments, network 610 may be considered to represent a conventional or physical layout map of a network. One of ordinary skill in the art will appreciate that actual enterprise or production networks may include more or fewer entities than shown here. Further, in this example, for at least brevity and clarity networking components, such as routers, switches, firewalls, bridges, interfaces, or the like are omitted from the figure. Likewise, for brevity or clarity LANs, WANs, VLANs, sub-networks, or the like are omitted here. However, one of ordinary skill in the art will appreciate that system 600 as represented here is at least sufficient for disclosing and enabling innovations for ranking entity importance via network monitoring described herein.

In some embodiments, as described above, organizations may deploy one or more NMCs (not shown here) to monitor network activity to identify threats, anomalies, or the like. In an ideal situation each entity in the monitored network environment may be maximally monitored. However, in practice, network monitoring requires resources, including compute resources, network capacity, or the like to evaluate activity, assess threats, or identify anomalies. Accordingly, in some embodiments, in practice network monitoring may be a scarce resource that needs to be intentionally allocated within the monitored network environment.

Further, in some embodiments, NMCs may be arranged to support tiered or leveled monitoring such that particular entities or activities in a monitored network may be allocated more monitoring resources than others. For example, critical edge entities, such as high capacity access switches, internet gateways, or the like may be designated to be allocated maximum monitoring resources while individual user workstations inside the protected network may be allocated fewer monitoring resources. Likewise, in some embodiments, NMCs may be configured to allocate more or fewer monitoring resources depending on the type of applications or services provided by (or hosted on) given entities. For example, in some embodiments, an NMC may be configured to allocate more monitoring resources to active corporate database servers than file archives, user workstations, or the like. Further, in some embodiments, NMCs may be configured allocate monitoring resources based on protocols, number of connections, amount of network traffic, user types, user roles, or many other metrics that NMCs may be arranged to monitor.

In some embodiments, conventionally, NMCs or other services may be configured to use one or more ad hoc criteria for allocating network monitoring resources. In this example, for some embodiments, node 602, node 604, and node 606 may be considered to represent entities in network 610 that have been designated for advanced monitoring. In some embodiments, ad hoc criteria may include type of application, user preferences, prior history, or various other metrics. While these metrics or ad hoc criteria may correlate to identifying high value entities they may result in disadvantageous allocation of monitoring resources in the network as a whole. As in this example, for some embodiments, ad hoc allocation of monitoring resources may result in one or more geographic, physical, or logical portions of the network being provided less than desirable monitoring while monitoring resources may be concentrated or localized in a few portions of the network. In this example, for some embodiments, the advanced monitoring or additional monitoring resources may be concentrated in one part of network 610 while the remainder of network 610 may be allocated none or fewer advanced monitoring resources. Note, even though the entities associated with node 602, node 604, and node 606 may objectively be the most "important" entities in network 610, it may be undesirable to concentrate network monitoring resources in one portion of network 610. Likewise, in some cases, for some embodiments, smaller or less mature organizations may not have the in-house expertise to select the optimal allocation of the monitoring resources.

Figure 7:
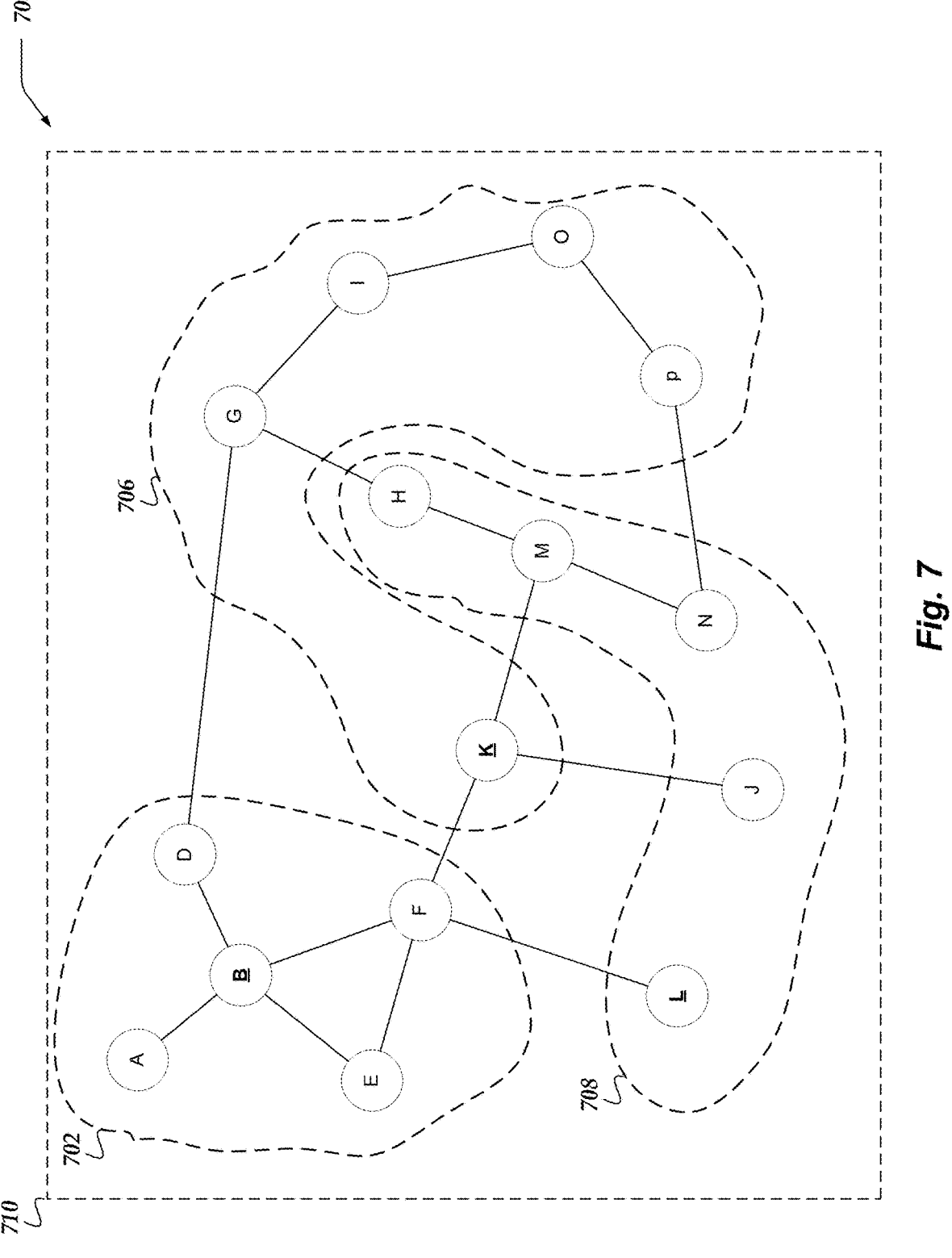
FIG. 7 illustrates a logical representation of entity clusters in a network for ranking entity importance via network monitoring in accordance with one or more of the various embodiments.

FIG. 7 illustrates a logical schematic of system 700 for ranking entity importance via network monitoring in accordance with one or more of the various embodiments.

In this example, for some embodiments, network 710 may be considered to be the same or similar network as network 610 described above. However, in this example, network monitoring engines (not shown) may have grouped or clustered one or more entities in network 710 based on one or more monitored network activity metrics.

In some embodiments, network monitoring engines may be arranged to survey or sample one or more metrics in a monitored to generate or obtain a logical graph that represents the entities in the monitored network and the relationships between or among those entities. Accordingly, in some embodiments, network monitoring engines may be arranged to assign or associate nodes in the graph with entities while the edges in the graph may represent one or more relationships between the entities.

In some embodiments, network monitoring engine may be configured to use lightweight or low resource monitoring methods to collect metrics for establishing a network graph based on the collected metrics. In some embodiments, network monitoring engines may be configured to use one or more particular metrics based on local circumstances or local requirements. Accordingly, in some embodiments, network monitoring engines may be arranged to determine the metrics or monitoring methods for establishing the network graph based on configuration information. However, it may be assumed that nodes in the network may be associated with one or more entities and edges may be associated with one or more relationships based on metrics collected by network monitoring engines.

Accordingly, in some embodiments, if a network graph has been determined, network monitoring engines may be arranged to execute one or more operations to determine one or more logical clusters in the network graph. Generally, for some embodiments, network monitoring engine may be configured to base the clustering on the same metrics used to establish the network graph. However, in some embodiments, network monitoring engines may be configured to use different metrics for determining clusters in the network graph. In some cases, for some embodiments, one or more metrics may be combined into hybrid metrics that may be used for determining clusters. Likewise, in some embodiments, one or more metrics may be employed for initial clustering with other metrics used as tie breakers, or the like.

In this example, the entities (nodes) in network 710 may be considered to be grouped based one or more metrics associated with monitored network activity. For example, the one or more metrics may include number of connections between neighbors, amount of data exchanged between entities, amount of activity for particular protocols, number of authentication requests, or the like. Further, in some embodiments, network monitoring engines may be arranged to enable metrics for clustering to be computed using heuristics, functions, rules, or the like such that the clustering/grouping may be driven by a hybrid metric based on the one or more heuristics, functions, rules, or the like. For example, such rules of heuristics may include weighting values for different types of applications that may be hosted on various entities, particular organization policies, or the like. Similarly, other rules such as requiring at least one group/cluster in each physical subnetwork, geographic location, organization department, or the like may be enforced as well. However, for brevity or clarity grouping or clustering may be described as being based on one or more metrics.

Also, in some embodiments, one or more metrics used for clustering may be viewed or accumulated in a defined time window. For example, for some embodiments, if the number of connections to other entities is used as a graph or clustering metrics, a time window such as 1 minute, 1 hour, 1 day, or the like may be used to "count" the number of connections. Network monitoring engines may be arranged to enable the particular time windows, metrics, metric weights, or the like to be determined based on configuration information to account for local circumstances or local requirements.

Accordingly, in this example, for some embodiments, group 702, group 704, group 706, group 708, or the like may be considered to represent collections of entities that have been grouped or clustered based on ranking entity importance via network monitoring. Notably, in this example, the groupings may not appear to be intuitive because they may be considered to be based on object clustering rules and monitored network metrics. In this example, the grouping or clustering are deliberately selected to illustrate how grouping based on metrics may deviate from what may be considered obvious or otherwise conventional.

Figure 8:
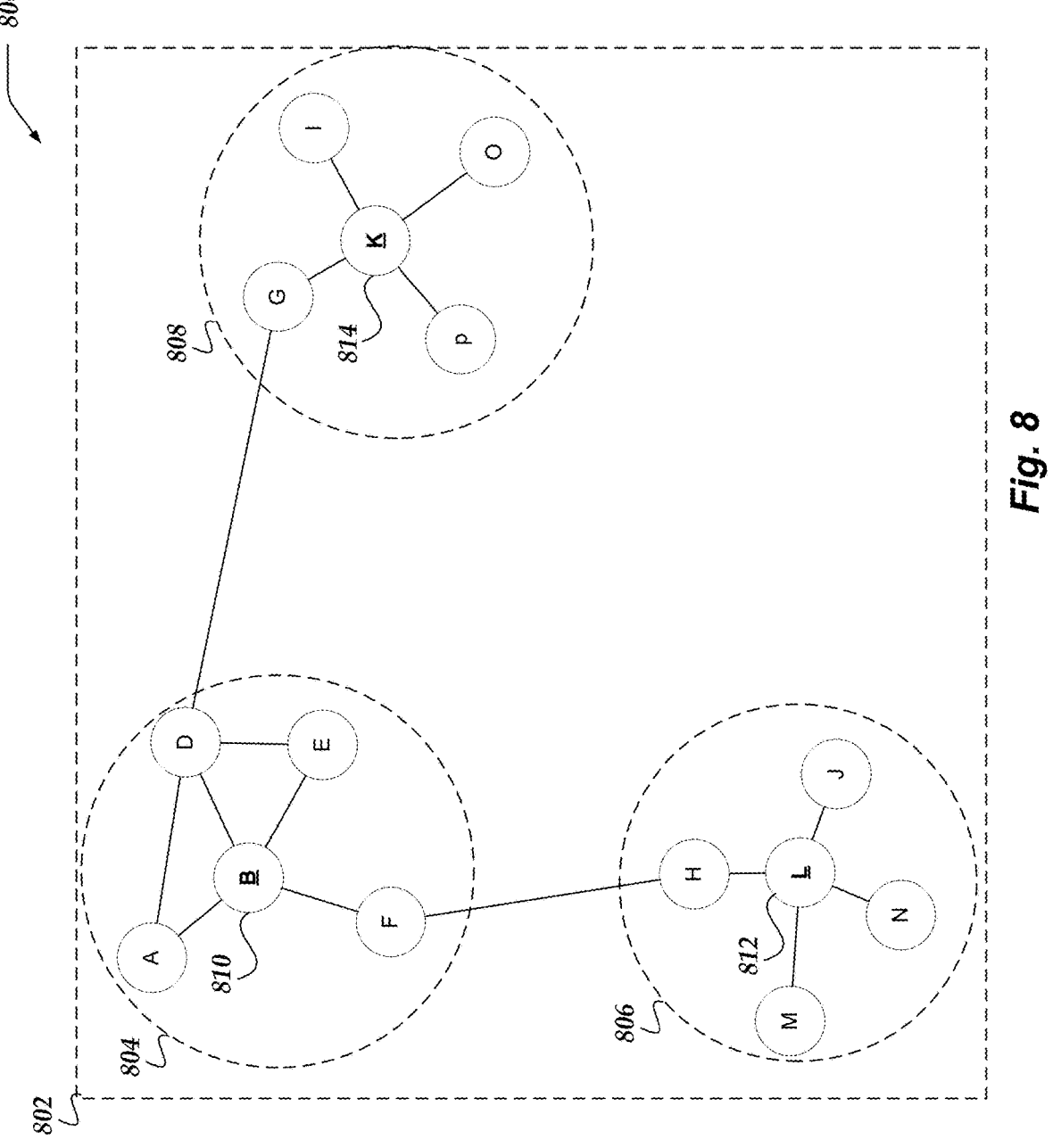
FIG. 8 illustrates a logical representation of a network graph with entity clusters for ranking entity importance via network monitoring in accordance with one or more of the various embodiments.

FIG. 8 illustrates a logical schematic of system 800 for ranking entity importance via network monitoring in accordance with one or more of the various embodiments.

In this example, network graph 802 has been organized based on the clusters of entities corresponding to the groupings described above in FIG. 7.

In some embodiment, network monitoring engines may be arranged to identify the primary node for each cluster based on the clustering rules and the associated metrics. In this example, network graph 802 includes cluster 804, cluster 806, cluster 808, or the like.

Further, in some embodiments, network monitoring engines may be arranged to designate one or more entities within each cluster as the central node. In this example, for some embodiments, central nodes may include: entity node 810 representing a primary node for cluster 804; entity node 812 representing the primary node for cluster 806; entity node 814 representing the primary node for cluster 808; or the like.

Accordingly, in some embodiments, network monitoring engines may be configured allocate additional monitoring resources to the primary node in each cluster. Accordingly, in some embodiments, the enhanced or advanced monitoring may be distributed fairly within the network based on the clustering metrics.

In some embodiments, the primary nodes in a given cluster may have a lower ranking than one or more non-primary nodes in another cluster. Accordingly, in some embodiments, ranking entity importance via network monitoring enables monitoring resources to be allocated fairly throughout the entire network. In contrast, if the allocation of monitoring resources may be strictly assigned to entities without such considerations, it may be likely that monitoring resources may be concentrated or isolated in particular areas of the network. This may result in the disadvantageous situation of entire swathes of the network being excluded from the benefits of advanced monitoring.

Notably, for example, if the monitoring resources may be naively allocated based on number of connections per hour, one of ordinary skill in the art will appreciate that certain entities or areas of a network may be allocated significant monitoring resources while others may be starved of monitoring resources.

Note, in some embodiments, if network monitoring engines may be configured to use different clustering mechanisms or base the clustering on different metrics, the selection of the clusters or the primary nodes may vary. However, in some embodiments, network monitoring engines may be arranged to provide one or more user interfaces that may be used to display interactive reports that show how different clustering rules or clustering metrics may impact the allocation of monitoring resources.

For example, in some embodiments, network monitoring engines may be arranged to select devices for advanced analysis, increased monitoring, fine-grained packet inspection, or the like that may represent the "skeleton" of a monitored network that may be intended to ensure that no region of the network is excluded from advanced monitoring. Accordingly, in some embodiments, network monitoring engines may be arranged to employ one or more graph clustering algorithms, such as Louvain clustering, Leiden clustering, Girvan-Newman clustering, or the like to determine entity clusters in the network. Further, in some embodiments, network monitoring engines may be arranged to rank entities in the clusters by importance within their clusters using degree centrality or other methods for evaluating centrality, such as betweenness centrality, closeness centrality, eigenvector centrality, or the like. In some embodiments, the particular centrality determination methods may be determined or indicated using configuration information to account for local requirements or local preferences. In some embodiments, network monitoring engines may be arranged to allocate monitoring resource to entities in order of priority based on this ranking. In some embodiments, if there may be priority ties between entity of the same rank, network monitoring engines may be configured to break these ties by selecting the most recently discovered device. Note, in some embodiments, other tie breaker rules may be provided via configuration information to account for local circumstances or local preferences.

Generally, in some embodiments, network monitoring engines may be arranged to execute one or more operations to assign importance scores to each entity within a cluster via score formulas that may be based on one or more features of the network graph, the cluster, or individual entities. For example, degree centrality may be employed establishing importance scores or topological scores with a cluster. Likewise, relationships between or among clusters may be employed to assign importance scores or topological scores to clusters. For example, in some embodiments, network monitoring engines may be configured to compute a degree centrality score for individual entities within a given cluster. Likewise, for example, network monitoring engines may be arranged to compute degree centrality scores on a cluster by cluster basis by evaluating or counting the number of relationships between or among clusters in the network graph.

In some embodiments, ranking entity importance via network monitoring using network graphs and clustering may be referred to as ranking entities in the network based on topological importance.

In one or more of the various embodiments, network monitoring engines may be configured generate more than one clustered network graph where each uses different criteria for identifying clusters of entities. Accordingly, in some embodiments, network monitoring engines may be arranged to provide user interfaces that display the different clusters/network topology for different metrics, scenarios, or the like. For example, in some embodiments, network monitoring engines may be configured to generate a first clustered graph based on user login/authentication traffic in the network and second clustered graph based on all TCP/IP traffic in the monitored network, or the like.

Also, in some embodiments, network monitoring engines may be arranged to enable users employ the clustering scores (e.g., topological importance scores) as an entity property to include in rules for allocation monitoring resources, detection rules, incident triage, or the like.

Further, in some embodiments, network monitoring engines may be arranged to use the clustering/importance scores to recommend the order in which use customers should triage detection events. For example, in some embodiments, users could review a particular entity cluster to evaluate if the important entities may be experiencing concerning detection events before evaluating other clusters of entities, and so on.

Also, in some embodiments, network monitoring engines may be arranged to enable importance scores to be used for identifying entities whose degradation may cause a performance bottlenecks such that investigation on those entities may be prioritized.

In some embodiments, network monitoring engines may be arranged to use clustering and importance scoring to identifying important users based on monitoring the activity metrics associated with user activity.

Further, in some embodiments, network graphs and entity clusters may provide a baseline for evaluating entity behavior in terms of which other entities an entity may be interacting with. For example, in some embodiments, network monitoring engines may be configured to generate events or alerts if an entity unexpectedly moves from one cluster to another. Likewise, in some embodiments, network monitoring engines may be configured generate events or alerts if one or more entities unexpectedly begin to have anomalous interactions with entities outside their cluster.

Also, in some embodiments, network monitoring engines may be configured to generate alerts if the network graph/topology experiences unexpected changes, such as changes to the number of clusters, changes to the composition of those clusters, or the like.

Further, in some embodiments, network monitoring engines may be arranged to identify secondary nodes, tertiary nodes, or the like within a cluster of entities. Accordingly, in some embodiments, network monitoring engines may be configured to direct monitoring resources to secondary nodes, or the like rather than exclusively directing additional resources just to the primary node. In some embodiments, network monitoring engines may be arranged to employ the same or similar criteria or methods to identify secondary nodes, or the like used for identifying primary nodes.

Figure 9A:
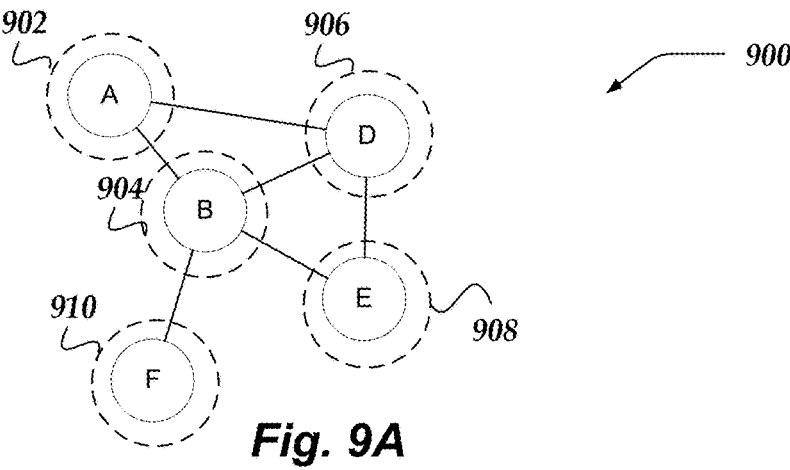
FIG. 9A illustrates a logical representation of initial cluster assignments for ranking entity importance via network monitoring in accordance with one or more of the various embodiments.
Figure 9B:
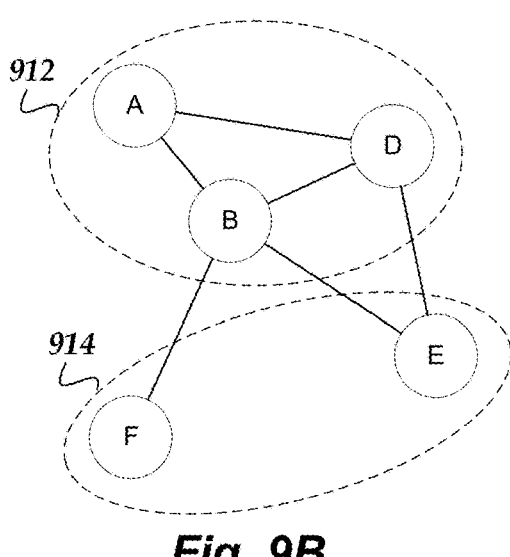
FIG. 9B illustrates a logical representation of intermediate cluster merging for ranking entity importance via network monitoring in accordance with one or more of the various embodiments.
Figure 9C:
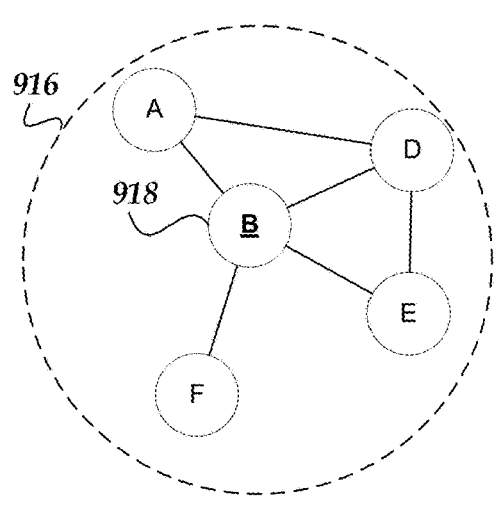
FIG. 9C illustrates a logical representation of final cluster configuration for ranking entity importance via network monitoring in accordance with one or more of the various embodiments.

FIGS. 9A-9C illustrates the logical progression of determining clusters in a portion of monitored network 900 for ranking entity importance via network monitoring in accordance with one or more of the various embodiments.

FIG. 9A illustrates a logical schematic of a portion of managed network 900 being evaluated by network monitoring engines to determine clusters for ranking entity importance via network monitoring in accordance with one or more of the various embodiments.

This example, for some embodiments, represents the initial operations performed by network monitoring engines for identify clusters in a network. Accordingly, in some embodiments, network monitoring engines may be configured to initially consider each entity in the network as its own community. Accordingly, in some embodiments, network monitoring engines may be configured to initialize cluster 902, cluster 904, cluster 906, cluster 908, cluster 910, or the like.

FIG. 9B illustrates a logical schematic of a portion of managed network 900 undergoing evaluation by network monitoring engines to determine clusters for ranking entity importance via network monitoring in accordance with one or more of the various embodiments.

In some embodiments, network monitoring engines may be arranged to evaluate each cluster to determine if they may be merged together into a larger community. Accordingly, in this example, for some embodiments, cluster 912 and cluster 914 may be partial/intermediate results of this evaluation. In some embodiments, network monitoring engines may be configured with a cost function or scoring function that evaluates if one cluster should be combined with another. Thus, in some embodiments, if merging one cluster with another increases the clustering quality score, the network monitoring engine may be arranged to merge the two clusters. In some embodiments, network monitoring engine may be arranged to execute the intermediate evaluations and clustering one or more times until the score changes associated with candidate cluster mergers fall below a threshold value. Also, in some embodiments, network monitoring engines may be configured to use a defined maximum limit of the number of intermediate evaluations.

In some embodiments, the scoring function used for evaluating if clusters should be merged may be based on one or more network activity metrics, such as connections, connections accepted, amount of network traffic, or the like. Further, in some embodiments, different scoring functions may be applied in different local circumstances or local requirements. Likewise, in some embodiments, one or more connection types (e.g., connections to particular applications or applications) may be weighted or de-weighted.

FIG. 9C illustrates a logical schematic of a portion of managed network 900 having completed the evaluation by network monitoring engines to determine clusters for ranking entity importance via network monitoring in accordance with one or more of the various embodiments.

In this example, for some embodiments, cluster 916 represents a final cluster of entities for a portion of monitored network 900. Note, in this example, for brevity or clarity other clusters are omitted.

In some embodiments, if the clusters may be determined, the individual entities within each cluster may be evaluated to determine the "most" important entity within each cluster. In some embodiments, network monitoring engines may be arranged to employ one or more rules, instructions, or the like provided via configuration information to determine the entity in each cluster with the highest importance. For example, in some embodiments, network monitoring engines may be arranged to identify the entity of highest importance based on the entity/node with greatest degree centrality within a cluster. In this example, for some embodiments, entity node 918 has four connections to other entity nodes in the same clusters.

Figure 10:
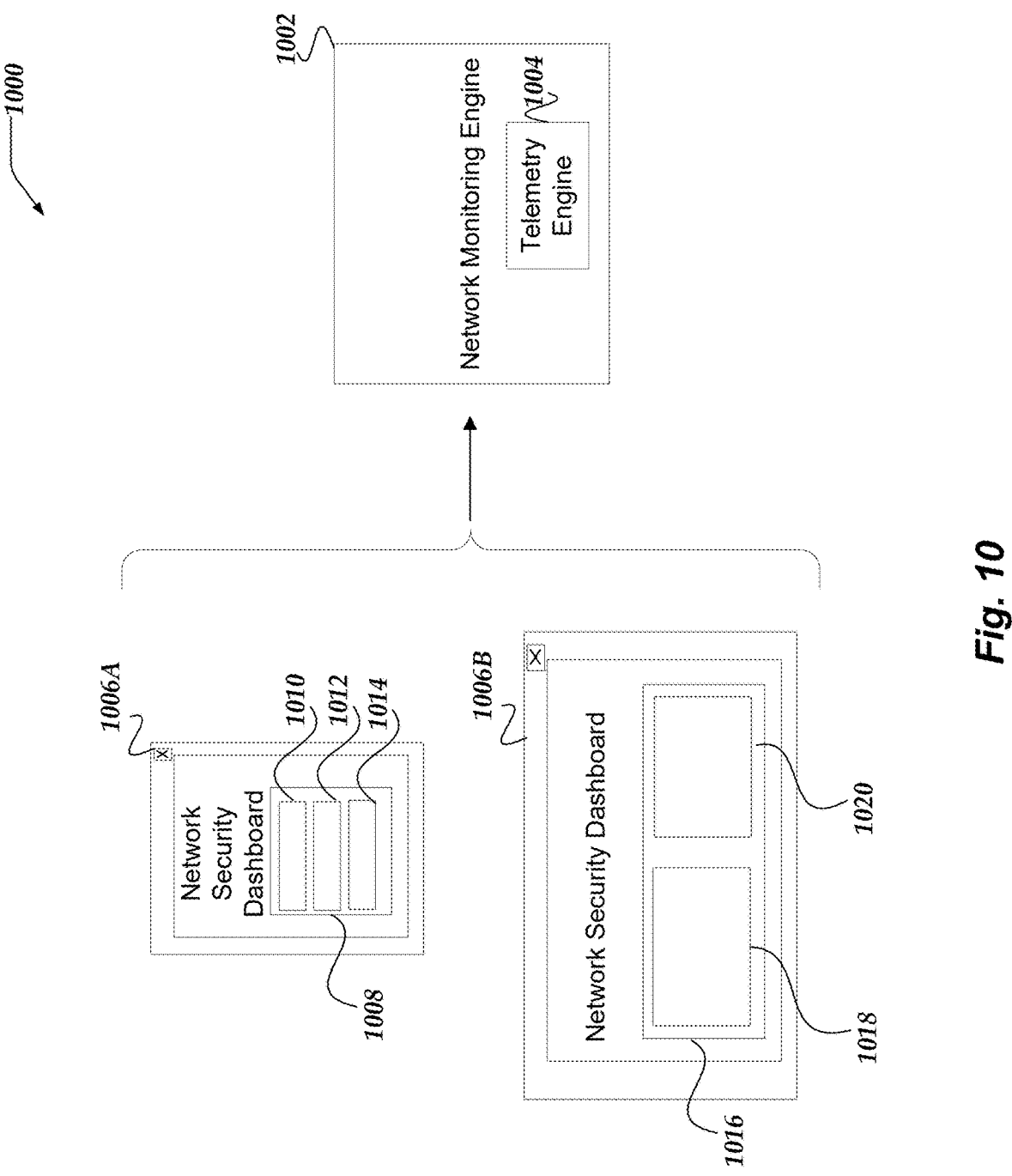
FIG. 10 illustrates a logical schematic of a system for collecting and applying telemetry information and telemetry metrics for ranking entity importance via network monitoring in accordance with one or more of the various embodiments.

FIG. 10 illustrates a logical schematic of system 1000 for collecting and applying telemetry information and telemetry metrics for ranking entity importance via network monitoring in accordance with one or more of the various embodiments. System 1000 may comprise various constituents, including: network monitoring engine 1002; telemetry engine 1004; one or more client user interfaces, such as user interface 1006A or user interface 1006B; or the like.

In some embodiments, network monitoring engines, such as network monitoring engine 1002 may be arranged to perform actions to support the operation, organization, or management of ranking entity importance via network monitoring in monitored networks.

In some embodiments, systems, such as system 1000 may include one or more telemetry engines, such as telemetry engine 1004. In some embodiments, telemetry engines may be arranged to monitor or evaluate interactions with applications or user interfaces such as user interface 1006A, user interface 1006B, or the like. In some embodiments, this may include monitoring how users or other applications may interact with user interfaces, interactive reports, various applications, or one or more system features. In some embodiments, user interface 1006A may represent the presentation or display of a user interface in a first adapted arrangement while user interface 1006B may represent the presentation or display of the same user interface having a second adapted arrangement. In some embodiments, user interface 1006A may be the user interface displayed in portrait mode while the user interface 1006B may be considered to be the user interface in landscape mode after a hardware display has been rotated.

In some embodiments, user interfaces, such as user interface 1006A or user interface 1006B may include various windows, controls, or other user interface features. In some embodiments, user interfaces may include various user interface panels, such as panel 1008, panel 1016, or the like. In some embodiments, panel 1008, or the like may represent a user interface that enables users, such as security administrators, to administer or manage ranking entity importance via network monitoring information or perform network monitoring administration displayed in a portrait (vertical) orientation while user interface 1006B may represent ranking entity importance via network monitoring information displayed in a landscape (horizontal) orientation. In some embodiments, element 1010, element 1012, element 1014, element 1018, element 1020, or the like may be considered to represent various user interface elements, controls, buttons, list items, report features, user interface components, displayed content, formatted content, or the like that may be included in user interfaces.

In some embodiments, user interface 1006A or 1006B may be considered a user interface that enables administrative users to work with ranking entity importance via network monitoring, network monitoring configurations, or the like. In some embodiments, panel 1008 may be used to select, generate, or modify entity ranking rules, network monitoring coverage, allocation of network monitoring resources, change logs, detection parameters, or the like. In some embodiments, panels such as panel 1008 may be used to display entity ranking, network monitoring coverage, allocation of network monitoring resources, display reports regarding ranking entity importance via network monitoring records and their relevance to network monitoring coverage, threat analysis, threat prevention, or the like.

In some embodiments, network monitoring engines, such as network monitoring engine 1002 (as well as telemetry engines, or the like) may be arranged to generate or display user interfaces, such as user interface 1006A or user interface 1006B to users using one or more of video interface 242, projector 246, display 250, or the like, of a client computer, such as client computer 200. In some embodiments, network monitoring engine 1002, or the like may be arranged to generate or display user interface 1006A, user interface 1006B, or the like to users using a one or more of input/output interface 338, display 350, audio interface 356, or the like, of a network computer, such as network computer 300.

In some embodiments, network monitoring engines, such as network monitoring engine 1002 (as well as telemetry engines, or the like) may be arranged to collect various telemetry or other metrics associated with user interactions with user interfaces. In some embodiments, telemetry may include tracking or monitoring if users may be in agreement with entity ranking, threat detection results, network monitoring coverage, allocation of monitoring resources, report arrangement/organization, or the like. In some embodiments, network monitoring engines, or the like may be enabled to employ telemetry information or telemetry metrics collected or determined by telemetry engines, such as telemetry engine 1004. In some embodiments, telemetry engines may be separate from network monitoring engines, or the like as shown in FIG. 10. In some embodiments, telemetry engines may be part of or otherwise embedded in network monitoring engines, or the like.

In one or more embodiments, various types of collected user telemetry may include a user's selection or non-selection of one or more particular elements or content in a display panel, pointing device (mouse) hover time over particular content or elements in a display panel, user dwell time between actions in a display panel, dwell time for viewing a display panel by a user, and the like.

In one or more of the various embodiments, network monitoring engines, or the like may be arranged to monitor telemetry information associated with one or more users.

Accordingly, in some embodiments, network monitoring engines, or the like may be arranged to provide one or more user interface facilities to collect direct feedback from one or more of the users that may interact with information displayed in the one or more user interfaces. In some embodiments, user interfaces may include controls that enable authorized users to grade one or more entity ranking reports, network monitoring resource allocations, threat assessment results, or the like.

In some embodiments, grades or scores may be binary (e.g., like/dislike), discrete (e.g., one-four stars, letter grades), continuous values, or the like.

In one or more of the various embodiments, network monitoring engines, or the like may be arranged to provide user interfaces that monitor how users interact with entity ranking, network monitoring allocations, or the like. In some embodiments, telemetry information employed to monitor user preferences may be based on monitoring user interactions as well as direct feedback. Accordingly, in some embodiments, entity ranking recommendations, or the like, that may appear valid or reasonable but are ignored or discarded by users may be inferred to be poorly received. In some embodiments, if the top ranked results provided in response to user actions, user queries, or the like, are ignored or lower ranked results are favored by users, it may be inferred that there may be a problem with the data or the display of the data.

In some embodiments, network monitoring engines, or the like may be arranged to receive telemetry information from other services or applications. Accordingly, in one or more of the various embodiments, network monitoring engines, or the like may not be required to directly monitor activity associated with the entity ranking, network monitoring resource allocation, threat reports, or the like. In some embodiments, user interfaces, such as user interface 1006A or user interface 1006B may be displayed to users via desktop computer applications, mobile applications, web-based applications, or the like. In some embodiments, such applications may collect the telemetry information and provide some or all it to network monitoring engines, or the like rather than requiring the network monitoring engines, or the like to include monitoring facilities on user-facing applications.

Accordingly, in some embodiments, network monitoring engine 1002, or the like may be arranged to collect metrics or telemetry associated with user interactions with user interface 1006A or user interface 1006B using a one or more of input/output interface 238, cameras 240, touch interface 244, keypad 252, audio interface 256, GPS, 258, open air gesture interface 260, haptic interface 264, pointing device interface 266, or the like, of a client computer, such as client computer 200. In some embodiments, network monitoring engine 1002, or the like may be arranged to collect metrics or telemetry associated with user interactions with user interface 1006A, or user interface 1006B using a one or more of input/output interface 338, GPS 340, keyboard 352, audio interface 356, pointing device interface 358, or the like, of a network computer, such as network computer 300.

In some embodiments, network monitoring engines, or the like may be arranged to track mouse movement, eye movement, keystrokes, or the like, to determine how users may interact with information (e.g., entity ranking results, allocation of network monitoring resources, or the like) displayed in user interfaces. Accordingly, in some embodiments, network monitoring engines, or the like may be arranged to evaluate at least the quality of various network monitoring recommendations, entity rankings, detection report characteristics, or the like based on how users interact with them via the user interfaces. In some embodiments, if users consistently select or otherwise favor interacting with displayed items, entity ranking, or monitoring resource allocation recommendations, that may be ranked or listed lower than others, it may indicate that one or more systems performing the entity ranking or resource allocation may be experiencing diminished or diminishing effectiveness. In some embodiments, users may reject or ignore report results, entity ranking, monitoring resource allocations, or the like which may indicate that one or more associated systems may be experiencing diminished or diminishing effectiveness.

In some embodiments, network monitoring engines, or the like may be arranged to associate a performance score with user interfaces used in the system based on the user interaction metrics or telemetry. Accordingly, in some embodiments, if the performance score associated with a user interface or user interface element falls below a defined threshold value, network monitoring engines, or the like may be arranged to suspend those user interfaces (or portions thereof) from operation. In some embodiments, network monitoring engines, or the like may be arranged to automatically modify the deficient user interfaces.

In some embodiments, telemetry engines may be arranged to collect or determine telemetry information that includes user telemetry, user feedback, or telemetry metrics that may be used to dynamically transform user interfaces, display panels, and the like. In some embodiments, the dynamic transformation may include arrangement, re-arrangement, elimination, addition, or adaptation of content and visual elements in user interfaces and display panels based on at least the collected telemetry information.

In some embodiments, telemetry engines may collect metrics associated with the one or more user interactions with the system including content within the user interfaces and display panels. In some embodiments, user profiles may be configured to dynamically include user interface preferences based on collected user telemetry metrics and user feedback. Accordingly, in some embodiments, network monitoring engines, or the like may dynamically change the visual appearance of the user interfaces to improve the efficiency and effectiveness of the system or its user interfaces for the user.

In some embodiments, network monitoring engines, or the like may be arranged to dynamically select, position, size, shape, remove, hide, inactivate, disable, highlight, or style one or more visual user interface components such as display panels, controls, elements or content based on one or more of user telemetry metrics and user feedback. In some embodiments, if user interactions with the user interface are tracked focusing on or navigating to particular user interface views, components or user interface panels, system components, such as network monitoring engines, or the like may be arranged to dynamically highlight or size the preferred user interface elements and/or display panels. In some embodiments, if users are determined to rarely interact with a user interface element, such as element 1014, network monitoring engines, or the like may be arranged to dynamically reduce the size, diminish the shape, disable its controls, or re-position element 1014 by displaying a smaller sized greyed out version of element 1014 in its display panel.

In some embodiments, network monitoring engines, or the like may be arranged to adapt user interfaces based on the size/type of display, input methods, user status, or the like. In some embodiments, if a user is determined to be operating using a mobile device, one or more user interface elements may be dynamically positioned differently. In some cases, depending on the display type or display size, one or more user interface elements may be hidden from view. In some embodiments, a network monitoring engine may be arranged to dynamically modify or re-arrange user interface 1006A to obtain user interface 1006B based on telemetry associated with the display or associated user interactions. Accordingly, in this example, display panel 1016 may be considered to be dynamically modified or rearranged to accommodate the modified physical orientation of the display. In this example, user interface 1006B now may be considered to display two elements (element 1018 and element 1020) rather than three elements as were displayed in user interface 1006A. Thus, in this example, network monitoring engine 1002 may display two elements for the landscape (horizontal) orientation instead of the three elements displayed in the portrait (vertical) orientation based on one or more telemetry metrics.

Thus, in some embodiments, network monitoring engines, or the like may be arranged to tangibly modify user interfaces, display panels, interactive reports, input collection, input selection, input data representation, entity ranking reports, networking monitoring resource allocation reports, or the like, based on the efficient and effective performance of processes and/or activities associated with various types input information, ranking entity importance via network monitoring, or the like as determined by telemetry information, or the like.

Generalized Operations

FIGS. 11-14 represent generalized operations for ranking entity importance via network monitoring in accordance with one or more of the various embodiments. In one or more of the various embodiments, processes 1100, 1200, 1300, and 1400 described in conjunction with FIGS. 11-14 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 11-14 may be used for ranking entity importance via network monitoring in accordance with at least one of the various embodiments or architectures such as those described in conjunction with FIGS. 4-10. Further, in one or more of the various embodiments, some or all of the actions performed by processes 1100, 1200, 1300, and 1400 may be executed in part by network monitoring engine 322, telemetry engine 326, or the like, running on one or more processors of one or more network computers.

FIG. 11 illustrates an overview flowchart of process 1100 for ranking entity importance via network monitoring in accordance with one or more of the various embodiments. At block 1102, in one or more of the various embodiments, network monitoring engines may be arranged to monitor network activity to collect one or more metrics.

In some embodiments, network monitoring engines may be arranged to actively or passively monitor network traffic exchanged between one or more entities in one or more monitored networks. In some embodiments, network monitoring engines may be configured to capture network packets, network flows, connection records, or the like from observation ports, network taps, port mirrors, or the like distributed throughout the monitored networks. In some embodiments, network monitoring engines may be arranged to observe network traffic without directly participating in communication protocols or disrupting network operations.

In some embodiments, network monitoring engines may be arranged to collect one or more metrics that represent relationships between one or more entities in the monitored networks. Accordingly, in some embodiments, the one or more metrics may include connection counts between one or more entities, data volume exchanged between one or more entities, communication frequency patterns, protocol usage patterns, session durations, or the like. In some embodiments, network monitoring engines may be configured to aggregate the one or more metrics over one or more defined time windows to establish baseline communication patterns for one or more entities in the monitored networks.

In some embodiments, network monitoring engines may be arranged to employ lightweight monitoring methods that minimize computational overhead or network impact while collecting sufficient information to characterize relationships between one or more entities. Accordingly, in some embodiments, network monitoring engines may be configured to focus on connection-level information rather than deep packet inspection to reduce processing requirements. In some embodiments, network monitoring engines may be arranged to track which entities communicate with which other entities without necessarily analyzing the content of each communication.

In some embodiments, network monitoring engines may be arranged to employ configuration information to determine which metrics to collect, which time windows to employ for metric aggregation, which protocols to monitor, or the like. Accordingly, in some embodiments, network monitoring engines may be configured to adapt metric collection strategies based on local network characteristics, organizational requirements, available monitoring resources, or the like.

At block 1104, in one or more of the various embodiments, network monitoring engines may be arranged to generate one or more network graphs of the monitored network based on the one or more metrics.

In some embodiments, network monitoring engines may be arranged to construct one or more graph data structures where nodes in the one or more graphs represent one or more entities in the monitored networks. Accordingly, in some embodiments, edges in the one or more graphs may represent relationships between one or more entities based on one or more of the collected metrics. In some embodiments, each node in a network graph may correspond to an entity, such as a network device, a server application, a client computer, a service endpoint, or the like.

In some embodiments, network monitoring engines may be arranged to establish edges between nodes based on observed communication patterns between the corresponding entities. Accordingly, in some embodiments, if a first entity initiates connections to a second entity, network monitoring engines may be configured to create a directed edge from the node representing the first entity to the node representing the second entity. In some embodiments, network monitoring engines may be arranged to assign weights to edges based on communication frequency, data volume, connection duration, or the like to represent the strength of relationships between one or more entities.

In some embodiments, network monitoring engines may be arranged to generate the one or more network graphs to capture the topological (logical) structure of the monitored networks. Accordingly, in some embodiments, the one or more network graphs may represent which entities communicate with which other entities rather than physical network topology or geographic layout. In some embodiments, network monitoring engines may be configured to focus on logical connectivity patterns that reflect how entities interact operationally within the monitored networks.

In some embodiments, network monitoring engines may be arranged to maintain the one or more network graphs in memory using data structures that support rapid traversal, analysis, or modification operations. Accordingly, in some embodiments, network monitoring engines may be configured to update the one or more network graphs periodically as new metrics are collected to reflect current network conditions.

At block 1106, in one or more of the various embodiments, network monitoring engines may be arranged to obtain or determine one or more entity clusters based on the one or more metrics and the one or more network graphs.

In some embodiments, network monitoring engines may be arranged to execute one or more graph clustering algorithms to partition the one or more network graphs into logical communities of related entities. Accordingly, in some embodiments, network monitoring engines may be configured to employ clustering algorithms such as Louvain clustering, Leiden clustering, Girvan-Newman clustering, or the like to identify groups of entities that interact more frequently with each other than with entities outside their group.

In some embodiments, the one or more entity clusters may represent logical regions or neighborhoods within the monitored networks where entities exhibit strong mutual interaction patterns. Accordingly, in some embodiments, entities within the same cluster may share functional relationships, application dependencies, user communities, or the like that cause them to interact frequently. In some embodiments, the one or more entity clusters may not correspond to physical network segments, VLANs, subnets, or the like, but instead may reflect operational groupings based on actual communication/interaction behavior.

In some embodiments, network monitoring engines may be arranged to employ configuration information to select clustering algorithms, set clustering parameters, define convergence criteria, specify minimum or maximum cluster sizes, or the like based on characteristics of the monitored networks.

At block 1108, in one or more of the various embodiments, network monitoring engines may be arranged to determine primary entity for each entity cluster.

In some embodiments, network monitoring engines may be arranged to evaluate one or more entities within each cluster to identify which entity has the highest topological importance within that cluster. Accordingly, in some embodiments, network monitoring engines may be configured to compute importance scores for one or more entities based on centrality metrics that measure how connected each entity is to other entities within the same cluster. In some embodiments, network monitoring engines may be arranged to employ degree centrality, betweenness centrality, closeness centrality, eigenvector centrality, or the like to quantify the structural significance of one or more entities within their respective clusters.

In some embodiments, network monitoring engines may be arranged to identify primary entities based on degree centrality, which measures the number of direct network graph connections an entity has to other entities within its cluster. Accordingly, in some embodiments, entities with higher degree centrality values may be considered more central or important to their cluster because they communicate/interact with more neighboring entities. In some embodiments, the primary entity in a cluster may serve as a representative node that characterizes the communication patterns of that entire cluster.

In some embodiments, network monitoring engines may be arranged to normalize importance scores within each cluster such that entities are ranked relative to other entities in the same cluster rather than compared globally across all clusters. Accordingly, in some embodiments, an entity with relatively few connections in a small cluster may be designated as the primary entity for that cluster even if entities in other clusters have substantially more connections overall. In some embodiments, this cluster-relative ranking approach may ensure that monitoring resources are distributed fairly across all regions of the monitored networks rather than concentrated in high-traffic areas.

In some embodiments, network monitoring engines may be arranged to employ tie-breaking criteria if multiple entities within a cluster have identical importance scores. Accordingly, in some embodiments, network monitoring engines may be configured to select the most recently discovered entity, the entity with the highest traffic volume, the entity with particular application types, or the like to resolve importance score ties.

At block 1110, in one or more of the various embodiments, network monitoring engines may be arranged to allocate monitoring resources to entities in the monitored network based on the one or more clusters and the primary entities in each cluster.

In some embodiments, network monitoring engines may be arranged to assign one or more entities to different tiers of monitoring depth based on their importance rankings within their respective clusters. Accordingly, in some embodiments, primary entities from each cluster may be allocated to the highest tier of monitoring, which provides the most comprehensive analysis, metric collection, protocol inspection, or the like. In some embodiments, secondary entities within each cluster may be allocated to intermediate monitoring tiers, while less important entities may receive baseline monitoring with reduced resource consumption.

In some embodiments, network monitoring engines may be arranged to distribute monitoring resources fairly across all clusters to ensure representative coverage of the entire monitored network. Accordingly, in some embodiments, network monitoring engines may be configured to allocate at least one entity from each cluster to advanced monitoring tiers before allocating additional entities from any single cluster. In some embodiments, this stratified allocation approach may prevent monitoring resources from being concentrated in one geographic or logical region of the network while leaving other regions with insufficient monitoring coverage.

In some embodiments, network monitoring engines may be arranged to adjust monitoring resource allocations dynamically as network conditions change, new entities join the network, existing entities are decommissioned, communication patterns evolve, or the like. Accordingly, in some embodiments, network monitoring engines may be configured to periodically recompute entity clusters, recalculate importance rankings, reallocate monitoring tiers, or the like to maintain optimal monitoring coverage as the monitored networks evolve over time.

Thus, in some embodiments, network monitoring engines may be arranged to employ configuration information to define the number of monitoring tiers, specify resource constraints for each tier, set allocation policies, determine reallocation schedules, or the like based on available monitoring infrastructure or organizational priorities.

At block 1112, in one or more of the various embodiments, network monitoring engines may be arranged to monitor the network activity in the network based on the allocated monitoring resources.

In some embodiments, network monitoring engines may be arranged to apply the allocated monitoring tiers to entities in the monitored networks by activating appropriate monitoring configurations for each entity. Accordingly, in some embodiments, entities assigned to advanced monitoring tiers may have comprehensive packet capture enabled, detailed protocol analysis activated, enhanced metric collection configured, deep inspection capabilities employed, or the like. In some embodiments, entities assigned to standard monitoring tiers may receive baseline traffic monitoring, connection tracking, summary statistics collection, or the like with reduced computational overhead.

In some embodiments, network monitoring engines may be arranged to leverage the topologically distributed monitoring coverage to improve threat detection capabilities across the monitored networks. Accordingly, in some embodiments, by ensuring that at least one entity in each cluster receives advanced monitoring, network monitoring engines may be configured to detect anomalous activities, security threats, performance issues, or the like regardless of which logical region of the network experiences the incident. In some embodiments, monitoring engines may be arranged to correlate activities across one or more monitored entities to identify coordinated threats or distributed attack patterns.

In some embodiments, network monitoring engines may be arranged to track the effectiveness of the monitoring resource allocation by measuring detection coverage, incident response times, false positive rates, resource utilization efficiency, or the like. Accordingly, in some embodiments, network monitoring engines may be configured to collect telemetry about which entities were involved in detected incidents to evaluate whether the importance-based allocation strategy successfully prioritized monitoring for entities most likely to be involved in significant network events.

In some embodiments, network monitoring engines may be arranged to provide one or more user interfaces that display the current monitoring tier assignments, cluster compositions, importance rankings, monitoring coverage statistics, or the like to enable administrators to review or adjust the monitoring configuration. Accordingly, in some embodiments, network monitoring engines may be configured to enable manual overrides of importance rankings, custom tier assignments for specific entities, exclusion of certain entities from clustering, or the like based on organizational knowledge or specific security requirements.

Next, in one or more of the various embodiments, control may be returned to a calling process.

Figure 12:
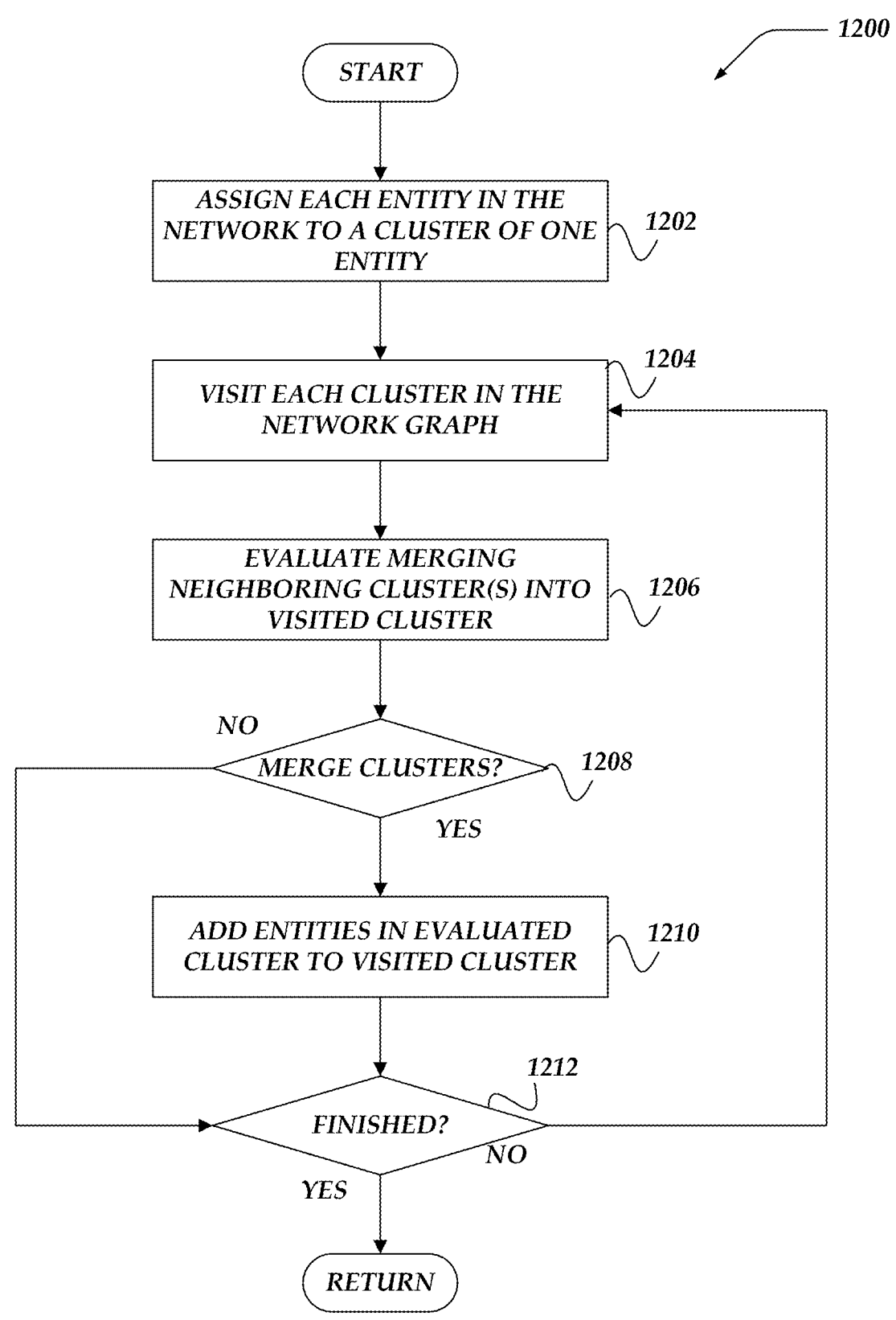
FIG. 12 illustrates a flowchart of a process for determining entity clusters for ranking entity importance via network monitoring in accordance with one or more of the various embodiments.

FIG. 12 illustrates a flowchart of process 1200 for ranking entity importance via network monitoring in accordance with one or more of the various embodiments. At block 1202, in one or more of the various embodiments, network monitoring engines may be arranged to initialize a clustering operation by assigning each entity in the monitored network to its own individual cluster.

In some embodiments, network monitoring engines may be arranged to begin the clustering process by treating each node in the network graph as a separate community or cluster. Accordingly, in some embodiments, if a network graph includes N entities, the initial clustering configuration may include N clusters where each cluster contains exactly one entity. In some embodiments, this initialization strategy may provide a starting point for iterative clustering algorithms that progressively merge related entities into larger communities based on their communication patterns or relationship metrics.

In some embodiments, network monitoring engines may be arranged to create cluster data structures that maintain membership information for each entity. Accordingly, in some embodiments, network monitoring engines may be configured to associate each entity with a unique cluster identifier that enables tracking which entities belong to which clusters as the clustering algorithm progresses. In some embodiments, the cluster data structures may include cluster membership lists, entity-to-cluster mapping tables, cluster metric accumulators, or the like that support rapid cluster membership updates or metric recalculations during the clustering process.

At block 1204, in one or more of the various embodiments, network monitoring engines may be arranged to systematically visit each cluster in the network graph to evaluate potential cluster merge operations.

In some embodiments, network monitoring engines may be arranged to iterate through the collection of clusters in a defined traversal order to ensure that each cluster receives consideration for potential merge operations. Accordingly, in some embodiments, network monitoring engines may be configured to visit clusters sequentially based on cluster identifiers, randomly to avoid systematic biases, in order of cluster size, in order of cluster connectivity, or the like.

In some embodiments, network monitoring engines may be arranged to identify neighboring clusters that have one or more connections to the visited cluster based on the network graph edge information. Accordingly, in some embodiments, network monitoring engines may be configured to examine edges originating from entities in the visited cluster to determine which other clusters those edges connect to. In some embodiments, neighboring clusters may be identified based on entity in the neighboring cluster. In some embodiments, the number of edges connecting two clusters, the total edge weight between clusters, the communication volume between clusters, or the like may characterize the strength of the connection between the visited cluster or its neighbors.

At block 1206, in one or more of the various embodiments, network monitoring engines may be arranged to evaluate if merging one or more neighboring clusters with the visited cluster would improve the clustering quality metrics.

In some embodiments, network monitoring engines may be arranged to consider each neighboring cluster as a candidate for merger with the visited cluster. Accordingly, in some embodiments, network monitoring engines may be configured to identify which neighboring clusters have sufficient connectivity to the visited cluster to warrant merge consideration. In some embodiments, neighboring clusters with only weak connections to the visited cluster may be excluded from merge evaluation to reduce computational overhead. In some embodiments, network monitoring engines may be arranged to prioritize merge evaluations for neighboring clusters with stronger connection weights, higher edge counts, greater communication volumes, or the like.

In some embodiments, network monitoring engines may be arranged to compute a clustering quality score that would result from merging a neighboring cluster with the visited cluster. Accordingly, in some embodiments, network monitoring engines may be configured to employ modularity metrics, clustering coefficient calculations, community detection quality functions, or the like to quantify how well a proposed merged cluster groups related entities compared to keeping the clusters separate.

In some embodiments, network monitoring engines may be arranged to calculate the change in clustering quality that would result from a proposed cluster merge. Accordingly, in some embodiments, network monitoring engines may be configured to compute the difference between the clustering quality score for the merged configuration versus the clustering quality score for the current separate cluster's configuration. In some embodiments, positive quality score changes may indicate that merging the clusters would improve how well the clustering groups related entities together. In some embodiments, negative quality score changes may indicate that merging the clusters would degrade the clustering quality by combining entities that have weak relationships with each other.

In some embodiments, network monitoring engines may be arranged to evaluate merge candidates sequentially until identifying a neighboring cluster that would produce a positive quality score change if merged. Accordingly, in some embodiments, network monitoring engines may be configured to select the first neighboring cluster that improves clustering quality rather than exhaustively evaluating all neighboring clusters to find the optimal merge partner. In some embodiments, this greedy merge selection strategy may reduce computational complexity while still enabling effective clustering. In some embodiments, network monitoring engines may be arranged to evaluate neighboring clusters to identify the merge candidate that produces the largest quality score improvement before making a merge decision.

In some embodiments, network monitoring engines may be arranged to employ configuration information to determine which clustering quality metrics to employ, which merge evaluation strategies to use, which quality score thresholds to apply, or the like. Accordingly, in some embodiments, different clustering quality functions may emphasize different aspects of cluster cohesion, cluster separation, cluster balance, or the like based on characteristics of the monitored networks or organizational priorities.

At decision block 1208, in one or more of the various embodiments, if one or more neighboring clusters should be merged with the visited cluster, control may flow to block 1210; otherwise, control may flow to decision block 1212.

In some embodiments, network monitoring engines may be arranged to determine if merging a neighboring cluster with the visited cluster would improve the overall clustering quality based on the merge evaluations performed at block 1206. Accordingly, in some embodiments, if network monitoring engines identify at least one neighboring cluster that produces a positive quality score change when merged with the visited cluster, the merge operation may proceed. In some embodiments, if no neighboring clusters produce positive quality score changes when evaluated for merging with the visited cluster, network monitoring engines may be configured to leave the visited cluster unchanged or proceed to evaluate the next cluster in the traversal sequence.

In some embodiments, network monitoring engines may be arranged to apply quality score threshold criteria to determine if a proposed cluster merge should proceed. Accordingly, in some embodiments, network monitoring engines may be configured to require that the quality score improvement exceeds a minimum threshold value before authorizing a merge operation. In some embodiments, small positive quality score changes may not justify the computational cost of performing merge operations or may not produce meaningfully better clustering configurations. In some embodiments, requiring quality score improvements to exceed threshold values may prevent unnecessary merge operations that provide negligible clustering quality benefits.

In some embodiments, network monitoring engines may be arranged to employ configuration information to determine quality score thresholds, merge cost limits, merge authorization criteria, or the like based on available computational resources, desired clustering convergence speed, clustering quality requirements, or the like.

At block 1210, in one or more of the various embodiments, network monitoring engines may be arranged to add the entities from the evaluated neighboring cluster into the visited cluster.

In some embodiments, network monitoring engines may be arranged to execute the cluster merge operation by updating cluster membership information to reflect that entities previously belonging to the neighboring cluster now belong to the visited cluster. Accordingly, in some embodiments, network monitoring engines may be configured to modify entity-to-cluster mapping tables, update cluster membership lists, adjust cluster size counters, or the like to incorporate the entities from the merged neighboring cluster into the visited cluster. In some embodiments, the neighboring cluster identifier may be retired or marked as inactive after its entities have been transferred to the visited cluster.

In some embodiments, network monitoring engines may be arranged to update cluster-level metrics to reflect the changed composition of the visited cluster after absorbing entities from the neighboring cluster. Accordingly, in some embodiments, network monitoring engines may be configured to recalculate internal edge counts representing connections between entities within the newly merged cluster, update external edge counts representing connections from the merged cluster to other remaining clusters, adjust cluster cohesion metrics, recalculate cluster centrality values, or the like. In some embodiments, updated cluster metrics may be necessary for subsequent merge evaluations because the connectivity patterns of the enlarged visited cluster may differ from its previous configuration.

In some embodiments, network monitoring engines may be arranged to update the list of neighboring clusters that remain eligible for future merge operations with the visited cluster. Accordingly, in some embodiments, after merging a neighboring cluster into the visited cluster, network monitoring engines may be configured to identify clusters that were neighbors of the merged neighboring cluster but not previously neighbors of the visited cluster. In some embodiments, these newly reachable clusters may become merge candidates for subsequent iterations because the enlarged visited cluster may now have connections to clusters that were previously too distant to be considered direct neighbors.

In some embodiments, network monitoring engines may be arranged to record merge operations in a clustering history log to enable analysis of how the clustering configuration evolved during the clustering process. Accordingly, in some embodiments, the merge history information may include which clusters were merged, what clustering quality improvements resulted, how many iterations were required, or the like. Thus, in some embodiments, merge history logs may support debugging clustering algorithm behavior, tuning clustering parameters, or evaluating alternative clustering strategies.

At decision block 1212, in one or more of the various embodiments, if the clustering operation may be complete, control may be returned to a calling process; otherwise, control may loop back to block 1204.

In some embodiments, network monitoring engines may be arranged to determine if the clustering process has converged to a stable configuration where no additional cluster merges can improve the clustering quality metrics. Accordingly, in some embodiments, if a complete traversal of all clusters fails to identify any merge operations that would improve clustering quality, network monitoring engines may be configured to conclude that the clustering algorithm has reached a local optimum or convergence point. In some embodiments, clustering convergence may indicate that the current clustering configuration effectively groups related entities together based on their communication patterns or relationship metrics captured in the network graph.

Also, in some embodiments, network monitoring engines may be arranged to apply iteration count limits to prevent clustering operations from consuming excessive computational resources. Accordingly, in some embodiments, network monitoring engines may be configured to halt the clustering process after a maximum number of cluster traversal iterations have been completed regardless of whether additional merge operations might improve clustering quality. In some embodiments, iteration limits may provide computational guarantees that clustering operations will complete within bounded time periods even for large complex network graphs where optimal clustering configurations may be difficult to identify.

In some embodiments, network monitoring engines may be arranged to evaluate clustering quality improvement rates to determine if continuing the clustering process would produce meaningful benefits. Accordingly, in some embodiments, if the clustering quality score improvements observed during recent iterations fall below a convergence threshold, network monitoring engines may be configured to terminate the clustering process even if small additional improvements might be possible. In some embodiments, diminishing quality score improvements may indicate that the clustering algorithm may be approaching an optimal configuration where further merge operations produce negligible benefits.

In some embodiments, if the clustering process has not yet converged or reached termination criteria, network monitoring engines may be arranged to continue iterating through the cluster collection to evaluate additional merge opportunities. Accordingly, in some embodiments, control may return to block 1204 to visit the next cluster in the traversal sequence. In some embodiments, subsequent clustering iterations may identify merge opportunities that were not apparent in earlier iterations because previous merge operations may have changed the connectivity patterns between clusters in ways that create new opportunities for quality-improving merges.

In some embodiments, network monitoring engines may be arranged to employ configuration information to determine convergence criteria, iteration limits, quality improvement thresholds, resource consumption limits, or the like based on characteristics of the monitored networks, available computational resources, or organizational requirements for clustering precision versus computational efficiency.

Figure 13:
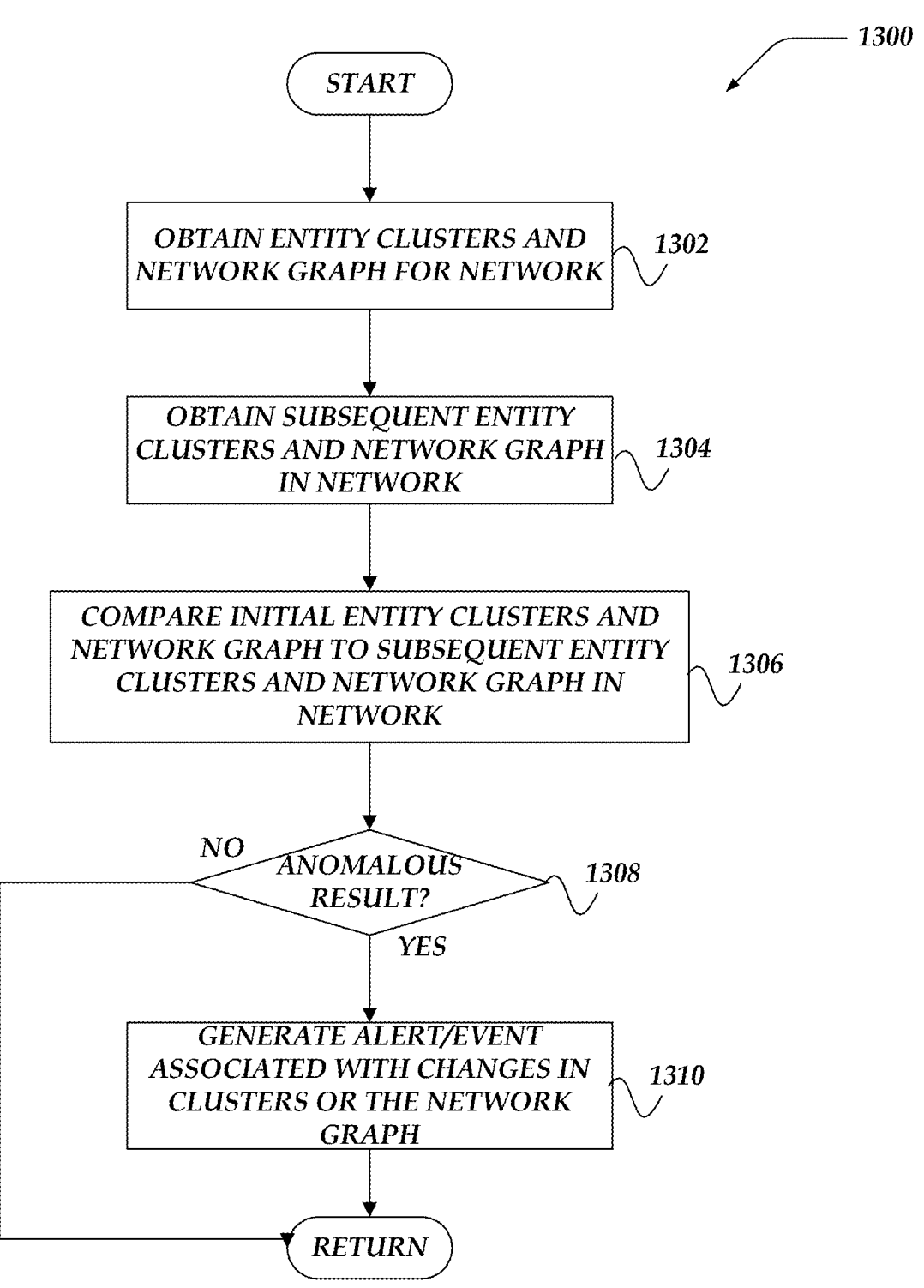
FIG. 13 illustrates a flowchart of a process for detecting anomalous network topology changes for ranking entity importance via network monitoring in accordance with one or more of the various embodiments.

FIG. 13 illustrates a flowchart of process 1300 for ranking entity importance via network monitoring in accordance with one or more of the various embodiments. At block 1302, in one or more of the various embodiments, network monitoring engines may be arranged to obtain one or more entity clusters and one or more network graphs for a monitored network.

In some embodiments, network monitoring engines may be arranged to retrieve one or more baseline entity clusters that represent the current logical grouping of one or more entities in the monitored network based on their communication patterns or relationship metrics. Accordingly, in some embodiments, the one or more baseline entity clusters may represent a snapshot of how one or more entities in the monitored network are organized into clusters based on their observed interactions at a particular point in time. In some embodiments, each entity cluster may include one or more entities that communicate or interact more frequently with each other than with entities outside their cluster.

In some embodiments, network monitoring engines may be arranged to store the one or more baseline entity clusters or the one or more baseline network graphs in memory or persistent storage to enable subsequent comparison operations. Accordingly, in some embodiments, network monitoring engines may be configured to maintain historical records of cluster configurations, entity membership lists, network graph structures, edge weights, or the like that characterize the network topology at one or more previous time periods. In some embodiments, the baseline information may serve as a reference point for detecting changes in network structure or entity behavior patterns over time.

In some embodiments, network monitoring engines may be arranged to employ configuration information to determine how frequently baseline entity clusters should be captured, how long baseline information should be retained, which baseline metrics should be tracked, or the like based on characteristics of the monitored network or organizational change management practices.

At block 1304, in one or more of the various embodiments, network monitoring engines may be arranged to obtain one or more subsequent entity clusters or network graphs for the same network.

In some embodiments, network monitoring engines may be arranged to generate one or more updated entity clusters by reanalyzing current network activity metrics or reapplying clustering algorithms to the current state of the monitored network. Accordingly, in some embodiments, the one or more subsequent entity clusters may represent how one or more entities are currently grouped based on their recent communication patterns. In some embodiments, network monitoring engines may be configured to compute the one or more subsequent entity clusters using the same clustering algorithms, the same metrics, the same time windows, or the like that were employed to establish the baseline entity clusters to ensure valid comparison results.

In some embodiments, network monitoring engines may be arranged to construct one or more updated network graphs that represent the current topological structure of the monitored network. Accordingly, in some embodiments, the one or more subsequent network graphs may include nodes representing the current set of entities in the monitored network or edges representing the current relationships between those entities based on recently observed network activity. In some embodiments, the one or more subsequent network graphs may reflect changes in the monitored network such as new entities being added, existing entities being removed, new communication paths being established, existing communication paths becoming inactive, or the like.

In some embodiments, network monitoring engines may be arranged to generate the one or more subsequent entity clusters or the one or more subsequent network graphs at regular intervals to enable periodic monitoring of network topology changes. Accordingly, in some embodiments, network monitoring engines may be configured to recompute entity clusters or network graphs hourly, daily, weekly, or the like based on organizational requirements for change detection responsiveness versus computational resource availability. In some embodiments, more frequent updates may enable faster detection of anomalous topology changes while less frequent updates may reduce monitoring overhead for stable network environments.

In some embodiments, network monitoring engines may be arranged to trigger generation of the one or more subsequent entity clusters or the one or more subsequent network graphs in response to one or more events such as detection of unusual traffic patterns, significant changes in connection counts, deviations from baseline metrics, or the like. Accordingly, in some embodiments, event-triggered clustering or network graph generation may enable rapid evaluation of network topology in response to potential anomalies rather than waiting for the next scheduled periodic update. In some embodiments, network monitoring engines may be configured to employ adaptive update schedules that increase clustering frequency if preliminary indicators suggest network topology may be changing abnormally.

In some embodiments, network monitoring engines may be arranged to ensure that the one or more subsequent entity clusters or the one or more subsequent network graphs may be generated using consistent methodology with the baseline representations to enable meaningful comparison. Accordingly, in some embodiments, network monitoring engines may be configured to apply the same clustering parameters, the same metric definitions, the same normalization procedures, the same edge weight calculations, or the like to both baseline or subsequent representations.

At block 1306, in one or more of the various embodiments, network monitoring engines may be arranged to compare the initial entity clusters and the initial network graph to the subsequent entity clusters and the subsequent network graphs.

In some embodiments, network monitoring engines may be arranged to evaluate cluster membership changes by determining which entities have moved from one cluster to another between the baseline configuration or the subsequent configuration. Accordingly, in some embodiments, network monitoring engines may be configured to identify one or more entities that belonged to a first cluster in the baseline entity clusters but belong to a different cluster in the subsequent entity clusters. In some embodiments, entity migration between clusters may indicate that the communication/interaction patterns of those entities have changed significantly such that they now interact more frequently with a different community of entities than they previously did.

In some embodiments, network monitoring engines may be arranged to detect changes in the number of clusters between the baseline configuration or the subsequent configuration. Accordingly, in some embodiments, network monitoring engines may be configured to identify if the subsequent entity clusters include more clusters than the baseline entity clusters, which may indicate that the monitored network has become more segmented or partitioned. In some embodiments, network monitoring engines may be configured to identify if the subsequent entity clusters include fewer clusters than the baseline entity clusters, which may indicate that previously separate communities have merged or consolidated. In some embodiments, significant changes in cluster count may suggest major reorganization of network communication/interaction patterns.

In some embodiments, network monitoring engines may be arranged to evaluate changes in cluster composition by comparing the set of entities in each cluster between baseline or subsequent configurations. Accordingly, in some embodiments, network monitoring engines may be configured to compute cluster similarity metrics that measure how much overlap exists between a baseline cluster or its corresponding subsequent cluster. In some embodiments, low similarity scores may indicate that cluster membership has been substantially reshuffled even if individual entities have not moved between named clusters. In some embodiments, network monitoring engines may be arranged to identify clusters that have gained or lost significant numbers of entities.

In some embodiments, network monitoring engines may be arranged to detect changes in network graph topology by comparing edge sets between the baseline network graph or the subsequent network graph. Accordingly, in some embodiments, network monitoring engines may be configured to identify new edges representing newly established communication paths between entities, removed edges representing communication paths that have become inactive, or changed edge weights representing increased or decreased communication volume between entities. In some embodiments, topology changes may reveal shifts in application dependencies, user access patterns, service availability, or the like.

In some embodiments, network monitoring engines may be arranged to evaluate whether one or more entities have begun interacting heavily with entities outside their assigned cluster. Accordingly, in some embodiments, network monitoring engines may be configured to compute inter-cluster communication metrics that measure how much network traffic flows between entities in different clusters. In some embodiments, entities that previously communicated primarily within their cluster but now communicate extensively with entities in other clusters may indicate anomalous behavior such as lateral movement in security incidents, misconfigured services, compromised credentials, or the like.

In some embodiments, network monitoring engines may be arranged to identify changes in primary entity designations within clusters. Accordingly, in some embodiments, network monitoring engines may be configured to determine if entities that were designated as central nodes or primary entities in baseline clusters have been replaced by different entities in subsequent clusters. In some embodiments, changes in cluster centrality scores that change which node may be central nodes or primary entities may indicate one or more shifts in application architecture, load balancing changes, failover events, or the like that may warrant investigation.

In some embodiments, network monitoring engines may be arranged to compute change magnitude metrics that quantify the extent of differences between baseline or subsequent configurations. Accordingly, in some embodiments, network monitoring engines may be configured to calculate the percentage of entities that changed clusters, the number of edges added or removed, the change in average cluster size, the change in cluster modularity scores, or the like. In some embodiments, magnitude metrics may enable network monitoring engines to distinguish between minor evolutionary changes or major disruptive changes in network topology.

In some embodiments, network monitoring engines may be arranged to employ configuration information to determine which types of changes to evaluate, which similarity metrics to compute, which change thresholds to apply, which comparison algorithms to employ, or the like based on characteristics of the monitored network or organizational change detection requirements.

At decision block 1308, in one or more of the various embodiments, if there may be an anomalous result, control may flow to block 1310; otherwise, control may be returned to a calling process.

In some embodiments, network monitoring engines may be arranged to determine if the comparison results indicate anomalous changes in network topology or entity clustering that warrant generating alerts or events. Accordingly, in some embodiments, network monitoring engines may be configured to evaluate whether the detected changes exceed one or more threshold values that distinguish normal operational evolution from potentially problematic topology changes. In some embodiments, small gradual changes in cluster membership or network graph structure may represent expected network dynamics that do not require notification, while large sudden changes may indicate incidents that require investigation.

In some embodiments, network monitoring engines may be arranged to apply threshold criteria to cluster membership changes to determine if entity migration patterns are anomalous. Accordingly, in some embodiments, network monitoring engines may be configured to compare the number of entities that changed clusters against a maximum acceptable migration threshold. In some embodiments, if more than a defined percentage of entities have moved to different clusters, network monitoring engines may classify the topology change as anomalous because widespread cluster migration suggests fundamental changes in network communication patterns that may indicate security incidents, infrastructure failures, configuration errors, or the like.

In some embodiments, network monitoring engines may be arranged to evaluate if individual entities have moved clusters in ways that may be inconsistent with their expected behavior patterns. Accordingly, in some embodiments, network monitoring engines may be configured to maintain entity profiles that characterize normal clustering behavior for specific entities based on historical observations. In some embodiments, if an entity that has consistently remained in the same cluster suddenly migrates to a different cluster, network monitoring engines may classify this as anomalous even if overall cluster migration rates are within normal ranges. In some embodiments, anomalous entity-specific cluster migration may indicate one or more of compromised systems, insider threats, application misconfigurations, or the like.

In some embodiments, network monitoring engines may be arranged to determine if changes in cluster count exceed acceptable variation ranges. Accordingly, in some embodiments, network monitoring engines may be configured to establish baseline cluster count ranges that represent expected cluster count variation based on historical network topology observations. In some embodiments, if the number of clusters in the subsequent configuration falls outside the baseline range, network monitoring engines may classify this as anomalous. In some embodiments, sudden cluster count increases may indicate network segmentation, service disruptions, or partitioning events while sudden cluster count decreases may indicate configuration changes, consolidation activities, or loss of network diversity.

In some embodiments, network monitoring engines may be arranged to evaluate if changes in cluster composition exceed acceptable thresholds. Accordingly, in some embodiments, network monitoring engines may be configured to compute cluster stability metrics that measure how much each cluster's membership has changed between baseline or subsequent configurations. In some embodiments, if cluster stability scores fall below minimum threshold values, network monitoring engines may classify the topology as experiencing anomalous churn where cluster membership is changing too rapidly to represent normal operational patterns.

In some embodiments, network monitoring engines may be arranged to determine if entities have begun interacting heavily outside their normal clusters in anomalous patterns. Accordingly, in some embodiments, network monitoring engines may be configured to detect if inter-cluster communication volumes have increased beyond expected levels. In some embodiments, entities that suddenly establish numerous connections to entities in different clusters may indicate probing/reconnaissance activities, lateral movement, data exfiltration attempts, or the like associated with security incidents. In some embodiments, network monitoring engines may be arranged to distinguish between legitimate inter-cluster communication such as routine service dependencies versus anomalous inter-cluster communication that deviates from historical patterns.

In some embodiments, network monitoring engines may be arranged to apply rate-of-change criteria to determine if topology changes occurred too rapidly to represent normal evolution. Accordingly, in some embodiments, network monitoring engines may be configured to compare the time interval between baseline or subsequent measurements against the magnitude of detected changes. In some embodiments, large topology changes that occur within short time periods may be classified as anomalous because gradual operational changes typically produce incremental topology evolution while sudden infrastructure changes, security incidents, or configuration errors produce rapid topology disruption.

In some embodiments, network monitoring engines may be arranged to employ machine learning models trained on historical network topology change patterns to classify whether current changes are anomalous. Accordingly, in some embodiments, network monitoring engines may be configured to provide topology change features to anomaly detection models that have learned normal change patterns from historical data. In some embodiments, machine learning models may identify subtle combinations of topology changes that appear individually benign but collectively indicate anomalous conditions.

In some embodiments, network monitoring engines may be arranged to correlate topology changes with other monitoring data such as security detection events, performance alerts, configuration change records, or the like to determine if topology changes align with expected causes. Accordingly, in some embodiments, if topology changes cannot be explained by known operational activities such as scheduled maintenance, approved infrastructure changes, expected traffic pattern shifts, or the like, network monitoring engines may classify the changes as anomalous. In some embodiments, unexplained topology changes may indicate unauthorized activities, infrastructure failures, or emergent issues that require investigation.

In some embodiments, network monitoring engines may be arranged to employ configuration information to determine anomaly threshold values, anomaly classification rules, acceptable change rate limits, machine learning model parameters, or the like based on organizational risk tolerance, historical change patterns, or network monitoring objectives.

At block 1310, in one or more of the various embodiments, network monitoring engines may be arranged to generate one or more alerts or one or more events associated with the changes in the one or more entity clusters or the network graphs.

In some embodiments, network monitoring engines may be arranged to create one or more alert records that describe the detected anomalous topology changes or notify one or more security personnel, network administrators, or monitoring systems about the potential issues. Accordingly, in some embodiments, the one or more alert records may include detailed information about which entities changed clusters, how cluster counts changed, which cluster compositions changed, how network graph topology changed, or the like. In some embodiments, alert records may provide sufficient context for incident responders to understand the nature of the topology changes or initiate appropriate investigation or remediation activities.

In some embodiments, network monitoring engines may be arranged to include comparison visualizations in the one or more alerts that show how the baseline network topology differs from the subsequent network topology. Accordingly, in some embodiments, network monitoring engines may be configured to generate side-by-side cluster diagrams, network graph overlays, entity migration flow charts, cluster membership diff reports, or the like that visually highlight the detected changes. In some embodiments, visual representations may enable administrators to rapidly understand complex topology changes that would be difficult to comprehend from textual descriptions alone.

In some embodiments, network monitoring engines may be arranged to identify which entities are most affected by the topology changes or highlight those entities in the one or more alerts. Accordingly, in some embodiments, network monitoring engines may be configured to list entities that changed clusters, entities that now have unusual inter-cluster communication patterns, entities whose centrality scores changed significantly, entities that appeared or disappeared from the network graph, or the like. In some embodiments, highlighting affected entities may focus investigation efforts on the specific systems or services that may require immediate attention rather than requiring administrators to analyze the entire network topology.

In some embodiments, network monitoring engines may be arranged to correlate topology change alerts with other security detections, performance alerts, configuration change events, or the like to provide comprehensive incident context. Accordingly, in some embodiments, network monitoring engines may be configured to cross-reference the time of topology changes with security event timelines, scheduled maintenance windows, deployment records, or the like to help determine if topology changes have legitimate explanations. In some embodiments, correlation analysis may reveal that topology changes align with known security incidents, suggesting that the topology anomalies are consequences of active threats rather than independent issues.

In some embodiments, network monitoring engines may be arranged to generate one or more events that trigger automated response actions in addition to notifying human operators. Accordingly, in some embodiments, network monitoring engines may be configured to create events that cause entities involved in anomalous cluster migrations to be automatically escalated to higher monitoring tiers, trigger additional security scanning of affected entities, initiate network flow collection for suspicious inter-cluster communications, or the like. In some embodiments, automated responses may accelerate incident containment or evidence collection while human incident responders are evaluating the alerts or planning comprehensive response strategies.

In some embodiments, network monitoring engines may be arranged to update alert records with follow-up information as continued monitoring reveals whether topology anomalies persist, resolve naturally, worsen, or the like. Accordingly, in some embodiments, network monitoring engines may be configured to append status updates to existing alerts rather than generating duplicate alerts for ongoing topology issues. In some embodiments, progressive alert updates may provide incident responders with complete incident timelines that show how topology anomalies evolved over time.

In some embodiments, network monitoring engines may be arranged to employ configuration information to determine alert formatting requirements, severity classification criteria, alert distribution lists, automated response triggers, recommended action libraries, or the like based on organizational incident response procedures or notification preferences.

Next, in one or more of the various embodiments, control may be returned to a calling process.

Figure 14:
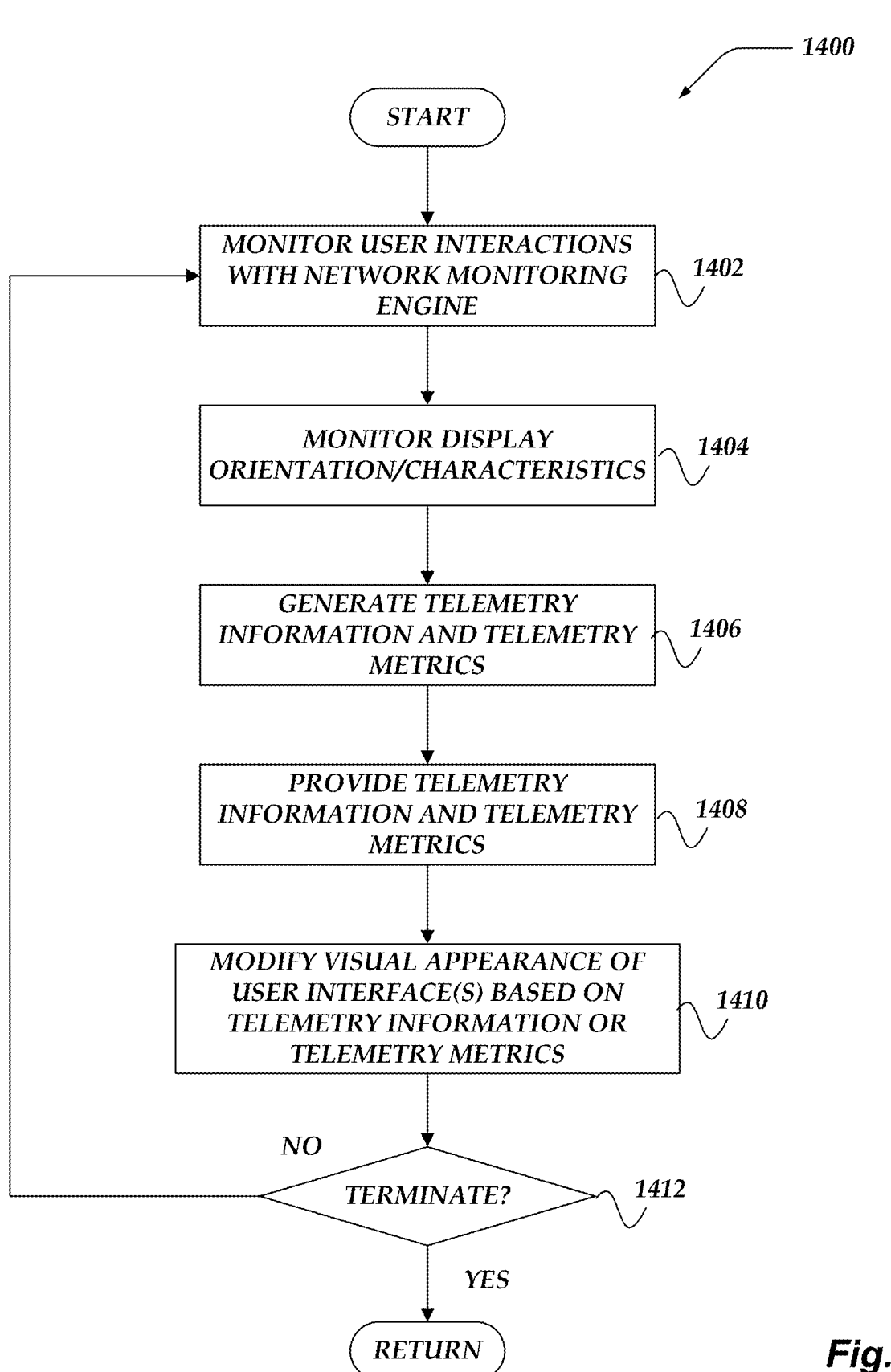
FIG. 14 illustrates a flowchart of a process for collecting and applying telemetry information and telemetry metrics for ranking entity importance via network monitoring in accordance with one or more of the various embodiments.

FIG. 14 illustrates a flowchart of process 1400 for collecting and applying telemetry information and telemetry metrics for ranking entity importance via network monitoring in accordance with one or more of the various embodiments. After a start block, at block 1402, in one or more of the various embodiments, telemetry engines may be arranged to monitor one or more user interactions with one or more applications. As described above, telemetry engines may be arranged to monitor or track how users may physically interact with one or more user interfaces associated with the one or more applications. In some embodiments, user interactions may include active interactions associated with user activity or passive interactions associated with user inactivity. Also, in one or more embodiments, various types of collected user telemetry may be based on a user's selection or non-selection of one or more particular elements or content in a display panel, pointing device (mouse) hover time over particular content or elements in a display panel, user dwell time between actions in a display panel, dwell time for viewing a display panel by a user, and the like. Also, in some embodiments, telemetry engines may be arranged to track mouse movement, eye movement, keystrokes, or the like, to determine how users may interact with information displayed in user interfaces. See, description for FIG. 10 for additional details.

At block 1404, in one or more of the various embodiments, telemetry engines may be arranged to monitor one or more display characteristics or display orientation characteristics.

As described above, in some embodiments, telemetry engines may be arranged to monitor various display characteristics employed for displaying the user interfaces, including the size/type of display, screen resolution, screen orientation, number of active displays, screen brightness, refresh rate, aspect ratio, color dynamic range, windowed or full screen modes, or the like. In some embodiments, screens, monitors, or operating systems may provide interfaces or APIs that enable telemetry engines to obtain information about the current state or status of the display screen. In some cases, for some embodiments, operating systems or other services may be configured to actively notify telemetry engines if one or more screen characteristics may change.

At block 1406, in one or more of the various embodiments, telemetry engines may be arranged to generate telemetry information or one or more telemetry metrics. In some embodiments, the monitored interactions or display characteristics may be represented as telemetry information or telemetry metrics. The particular format of the telemetry information or telemetry metrics may vary depending on the type of interactions or characteristics being represented. Accordingly, in some embodiments, telemetry information or telemetry metrics may be included in one or more data structures that may be communicated to other applications or services. For example, in some embodiments, telemetry information or telemetry metrics may be represented using key-value pair data structures that include a key field representing the label or type of metric and a value field that represents the value of the metric.

At block 1408, in one or more of the various embodiments, telemetry engines may be arranged to provide the telemetry information and telemetry metrics to a runtime engine, such as network monitoring engines, or the like.

In some embodiments, telemetry engines may be arranged to provide one or more interfaces or APIs that enable other applications or services, such as network monitoring engines, or the like, to gain access to the telemetry information or telemetry metrics. In some embodiments, telemetry engines may be configured to push some or all of the telemetry information or telemetry metrics to one or more subscribing application or services. Also, in some embodiments, telemetry engines may be configured to enable other application or services to poll or otherwise request-on-demand some or all of the telemetry information or telemetry metrics.

At block 1410, in one or more of the various embodiments, network monitoring engines, or the like may be arranged to modify the visual appearance of one or more user interfaces based on the telemetry information or telemetry metrics.

Accordingly, in some embodiments, network monitoring engines, or the like may be arranged to dynamically change the visual appearance of the one or more user interfaces to improve the efficiency and effectiveness of the user interfaces based on some or all of the telemetry information or telemetry metrics. For example, network monitoring engines, or the like may be arranged to dynamically select, position, size, shape, remove, hide, inactivate, disable, highlight, or style one or more visual user interface components such as display panels, controls, elements, or content based on, among other things, one or more telemetry metrics. For example, if telemetry information or telemetry metrics indicate that users are focusing on or navigating to particular user interface views, components or user interface panels, network monitoring engines, or the like may be arranged to highlight or size the preferred user interface elements or display panels. For example, if users are determined to rarely interact with a particular display panel, network monitoring engines, or the like may be arranged to reduce the size, diminish the shape, disable its controls, and reposition that display panel to improve the efficiency of display screen usage. See, also FIG. 10 and its description.

In some embodiments, network monitoring engines or telemetry engines may be arranged to employ configuration information to determine user interface adaptation criteria, including display optimization parameters, interaction pattern analysis thresholds, visual element prioritization rules, or dynamic layout modification specifications to account for local user interface preferences or organizational usability requirements.

At decision block 1412, in one or more of the various embodiments, if the telemetry engine, network monitoring engines, or the like may be terminated, control may be returned to a calling process; otherwise, control may loop back to block 1402. In some embodiments, telemetry engines may be arranged to continuously or periodically provide updated/current telemetry information or telemetry metrics to enable network monitoring engines, or the like to dynamically change the visual appearance of the one or more user interfaces. Accordingly, in some embodiments, process 1400 may continue operation until it may be explicitly terminated or the operation of the associated network monitoring engines, or the like may be terminated.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of these innovations.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of these innovations.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for monitoring network traffic in a computing environment using one or more processors to execute instructions that are configured to cause actions, comprising:
    allocating one or more monitoring resources to obtain a graph of a network based on a first portion of a plurality of metrics associated with the network, wherein each node of the graph corresponds to an entity in the network and each edge in the graph corresponds to a relationship between two or more entities;
    obtaining one or more clusters in the graph based on one or more traversals of the graph;
    collecting a primary node for each cluster in the graph based on one or more characteristics of the cluster;
    allocating one or more other monitoring resources to obtain a second portion of the plurality of metrics associated with each primary node in the graph; and
    obtaining a user interface that includes one or more display panels for content that includes information associated with the monitoring of network traffic, wherein the content is dynamically transformed and arranged for display to a user based on one or more of user interaction telemetry, user feedback or telemetry metrics.

2. The method of claim 1, wherein obtaining the one or more clusters, further comprises:
    employing the one or more traversals of the graph to visit each cluster in the graph to perform further actions, including:
        collecting one or more candidate clusters that are adjacent to the visited cluster based on the one or more traversals;
        obtaining a combined candidate cluster that includes each node in the visited cluster and each node in the one or more adjacent clusters, wherein a clustering score is obtained for the combined candidate cluster;
        converting the combined candidate cluster to a new cluster based on the clustering score exceeding a threshold value, wherein the one or more candidate clusters and the visited cluster are combined in the new cluster.

3. The method of claim 1, further comprising:
collecting one or more baseline cluster configurations for the network based on one or more previous time periods;
obtaining one or more deviation metrics based on comparing the one or more clusters to the one or more baseline cluster configurations; and
obtaining one or more anomaly indicators associated with the one or more deviation metrics that exceed one or more threshold values.

4. The method of claim 1, further comprising:
obtaining one or more subsequent clusters in the graph based on one or more additional traversals of the graph at a later time period;
collecting one or more differences between the one or more clusters and the one or more subsequent clusters; and
obtaining one or more alerts associated with the one or more differences that exceed one or more threshold values.

5. The method of claim 1, wherein obtaining the one or more clusters, further comprises:
using one or more of a Louvain clustering algorithm, a Leiden clustering algorithm, a Girvan-Newman clustering algorithm, or a modularity-based clustering algorithm to partition the graph into the one or more clusters.

6. The method of claim 1, wherein collecting the primary node for each cluster, further comprises:
obtaining one or more centrality scores for each node in the cluster based on one or more characteristics of the node within the cluster;
ranking each node in the cluster based on the one or more centrality scores; and
collecting the primary node based on the node associated with a highest centrality score in the cluster.

7. The method of claim 1, further comprising:
obtaining one or more secondary nodes in each cluster based on one or more centrality scores that are lower than a centrality score of the primary node; and
allocating intermediate monitoring resources to the one or more secondary nodes, wherein the intermediate monitoring resources include fewer monitoring resources than the other monitoring resources allocated to the primary node.

8. The method of claim 1, wherein the plurality of metrics further comprises:
one or more of a connection count between entities, a data volume exchanged between entities, a communication frequency pattern between entities, a protocol usage pattern between entities, a session duration between entities, or an edge weight representing a relationship strength between entities.

9. The method of claim 1, further comprising:
collecting one or more inter-cluster metrics that measure interactions between entities in different clusters;
obtaining one or more anomalous interaction patterns based on the one or more inter-cluster metrics exceeding one or more threshold values; and

obtaining one or more events associated with one or more entities involved in the one or more anomalous interaction patterns.

10. A network monitoring computer (NMC) for monitoring network traffic in a computing environment, comprising:
a transceiver that communicates over the network;
a memory that stores at least instructions; and
one or more processors that are configured to execute instructions to cause actions, including:
allocating one or more monitoring resources to obtain a graph of a network based on a first portion of a plurality of metrics associated with the network, wherein each node of the graph corresponds to an entity in the network and each edge in the graph corresponds to a relationship between two or more entities;
obtaining one or more clusters in the graph based on one or more traversals of the graph;
collecting a primary node for each cluster in the graph based on one or more characteristics of the cluster;
allocating one or more other monitoring resources to obtain a second portion of the plurality of metrics associated with each primary node in the graph; and
obtaining a user interface that includes one or more display panels for content that includes information associated with the monitoring of network traffic, wherein the content is dynamically transformed and arranged for display to a user based on one or more of user interaction telemetry, user feedback or telemetry metrics.

11. The NMC of claim 10, wherein obtaining the one or more clusters further comprises:
employing the one or more traversals of the graph to visit each cluster in the graph to perform further actions, including:
collecting one or more candidate clusters that are adjacent to the visited cluster based on the one or more traversals;
obtaining a combined candidate cluster that includes each node in the visited cluster and each node in the one or more adjacent clusters, wherein a clustering score is obtained for the combined candidate cluster;
converting the combined candidate cluster to a new cluster based on the clustering score exceeding a threshold value, wherein the one or more candidate clusters and the visited cluster are combined in the new cluster.

12. The NMC of claim 10, wherein the one or more processors are configured to execute instructions to cause actions, further comprising:
collecting one or more baseline cluster configurations for the network based on one or more previous time periods;
obtaining one or more deviation metrics based on comparing the one or more clusters to the one or more baseline cluster configurations; and
obtaining one or more anomaly indicators associated with the one or more deviation metrics that exceed one or more threshold values.

13. The NMC of claim 10, wherein the one or more processors are configured to execute instructions to cause actions, further comprising:
obtaining one or more subsequent clusters in the graph based on one or more additional traversals of the graph at a later time period;

collecting one or more differences between the one or more clusters and the one or more subsequent clusters; and
obtaining one or more alerts associated with the one or more differences that exceed one or more threshold values.

14. The NMC of claim 10, wherein obtaining the one or more clusters, further comprises:
using one or more of a Louvain clustering algorithm, a Leiden clustering algorithm, a Girvan-Newman clustering algorithm, or a modularity-based clustering algorithm to partition the graph into the one or more clusters.

15. The NMC of claim 10, wherein collecting the primary node for each cluster, further comprises:
obtaining one or more centrality scores for each node in the cluster based on one or more characteristics of the node within the cluster;
ranking each node in the cluster based on the one or more centrality scores;
collecting the primary node based on the node associated with a highest centrality score in the cluster; and
collecting a secondary node for each cluster based the ranking of the one or more centrality scores, wherein, intermediate monitoring resources are allocated to the one or more secondary nodes, and wherein the intermediate monitoring resources include fewer monitoring resources than the other monitoring resources allocated to the primary node.

16. The NMC of claim 10, wherein the plurality of metrics further comprises:
one or more of a connection count between entities, a data volume exchanged between entities, a communication frequency pattern between entities, a protocol usage pattern between entities, a session duration between entities, or an edge weight representing a relationship strength between entities.

17. The NMC of claim 10, wherein the one or more processors are configured to execute instructions to cause actions, further comprising:
collecting one or more inter-cluster metrics that measure interactions between entities in different clusters;
obtaining one or more anomalous interaction patterns based on the one or more inter-cluster metrics exceeding one or more threshold values; and
obtaining one or more events associated with one or more entities involved in the one or more anomalous interaction patterns.

18. A processor readable non-transitory storage media that includes instructions for monitoring network traffic using one or more network monitoring computers, wherein execution of the instructions by the one or more networking monitoring computers perform the method comprising:
allocating one or more monitoring resources to obtain a graph of a network based on a first portion of a plurality of metrics associated with the network, wherein each node of the graph corresponds to an entity in the network and each edge in the graph corresponds to a relationship between two or more entities;
obtaining one or more clusters in the graph based on one or more traversals of the graph;
collecting a primary node for each cluster in the graph based on one or more characteristics of the cluster;
allocating one or more other monitoring resources to obtain a second portion of the plurality of metrics associated with each primary node in the graph; and obtaining a user interface that includes one or more display panels for content that includes information associated with the monitoring of network traffic, wherein the content is dynamically transformed and arranged for display to a user based on one or more of user interaction telemetry, user feedback or telemetry metrics.

19. The media of claim 18, wherein obtaining the one or more clusters, further comprises:

employing the one or more traversals of the graph to visit each cluster in the graph to perform further actions, including:

collecting one or more candidate clusters that are adjacent to the visited cluster based on the one or more traversals;

obtaining a combined candidate cluster that includes each node in the visited cluster and each node in the one or more adjacent clusters, wherein a clustering score is obtained for the combined candidate cluster;

converting the combined candidate cluster to a new cluster based on the clustering score exceeding a threshold value, wherein the one or more candidate clusters and the visited cluster are combined in the new cluster.

20. The media of claim 18, further comprising:

collecting one or more baseline cluster configurations for the network based on one or more previous time periods;

obtaining one or more deviation metrics based on comparing the one or more clusters to the one or more baseline cluster configurations; and obtaining one or more anomaly indicators associated with the one or more deviation metrics that exceed one or more threshold values.

\* \* \* \* \*